US012357116B2

(12) United States Patent
Popken et al.

(10) Patent No.: US 12,357,116 B2
(45) Date of Patent: Jul. 15, 2025

(54) STRAW MADE FROM PAPER OR PAPER-LIKE MATERIAL

(71) Applicant: Tembo Paper B.V., Kampen (NL)

(72) Inventors: Sebo Erik Popken, Nieuwleusen (NL); Erik Marcel Snijder, Enschede (NL); Barend Jorrit Achterkamp, Zwolle (NL); Oscar Slurink, Heino (NL)

(73) Assignee: Tembo Paper B.V., Kampen (NL)

( * ) Notice: Subject to any disclaimer, the term of this patent is extended or adjusted under 35 U.S.C. 154(b) by 344 days.

(21) Appl. No.: 17/797,260

(22) PCT Filed: Feb. 5, 2021

(86) PCT No.: PCT/EP2021/052850
§ 371 (c)(1),
(2) Date: Aug. 3, 2022

(87) PCT Pub. No.: WO2021/156466
PCT Pub. Date: Aug. 12, 2021

(65) Prior Publication Data

US 2023/0054885 A1 Feb. 23, 2023

(30) Foreign Application Priority Data

Feb. 6, 2020 (NL) ...................................... 2024849
Nov. 12, 2020 (NL) ...................................... 2026878

(51) Int. Cl.
*A47G 21/18* (2006.01)
*B31D 5/00* (2017.01)

(52) U.S. Cl.
CPC ......... *A47G 21/186* (2013.01); *B31D 5/0095* (2013.01)

(58) Field of Classification Search
None
See application file for complete search history.

(56) References Cited

U.S. PATENT DOCUMENTS 2,094,268 A * 9/1937 Friedman ................ B29C 53/30 215/388
2,550,797 A 5/1951 Friedman
2,631,645 A 3/1953 Friedman
(Continued)

FOREIGN PATENT DOCUMENTS

CA 823000 A 9/1969
CN 209932307 U 1/2020
WO 2020178873 A1 9/2020

OTHER PUBLICATIONS

International Search Report and Written Opinion dated Apr. 22, 2021, Application No. PCT/EP2021/052850.
(Continued)

*Primary Examiner* — Tanzim Imam
(74) *Attorney, Agent, or Firm* — Patterson + Sheridan, LLP

(57) ABSTRACT

A straw (1) made from paper or paper-like material and comprising a tubular body (3) having a circumference formed by a wall (5) surrounding a central axis and a bendable part extending axially along the central axis (6), wherein said bendable part comprises at least two corrugated profiles (8A-D) provided in the wall, and each corrugated profile comprises inward corrugations (9A-D) and outward corrugations (10A-D) being positioned one after the other in axial direction along the central axis, and a system and method to produce the straw.

7 Claims, 74 Drawing Sheets

(56) References Cited

U.S. PATENT DOCUMENTS

| | | | | |
|---|---|---|---|---|
| 2,985,077 A * | 5/1961 | Strahammer | B29C 53/30 | |
| | | | 493/463 | |
| 3,438,578 A | 4/1969 | Peterson et al. | | |
| 3,641,884 A * | 2/1972 | Jivoin | B29C 53/30 | |
| | | | 264/296 | |
| 4,613,474 A * | 9/1986 | Donati | B29C 59/021 | |
| | | | 198/803.12 | |

OTHER PUBLICATIONS

Netherland Search Report and Written Opinion dated Oct. 7, 2020, Application No. NL2024849.

EPO Office Action dated Jul. 23, 2024, for European Patent Application No. 21702525.3.

* cited by examiner

STRAW MADE FROM PAPER OR PAPER-LIKE MATERIAL

FIELD OF THE INVENTION

The invention relates to a straw made from paper or paper-like material. In practice, such a straw is often used for drinking.

BACKGROUND OF THE INVENTION

The invention is based on the insight that there is a need for a straw made from paper or paper-like material with a high bending capacity.

SUMMARY OF THE INVENTION

The invention has the objective to provide and produce an improved or alternative straw made from paper or paper-like material. The objective is achieved by a straw made from paper or paper-like material and comprising a tubular body having a circumference formed by a wall surrounding a central axis and a bendable part extending axially along the central axis, wherein:

- said bendable part comprises at least two corrugated profiles provided in the wall,
- each corrugated profile comprises inward corrugations and outward corrugations being positioned one after the other in axial direction along the central axis,
- the inward corrugations extend along only part of the circumference of the tubular body,
- the outward corrugations extend along only part of the circumference of the tubular body,
- at least one of the at least two corrugated profiles is circumferentially offset relative to at least one other of the at least two corrugated profiles,
- said at least one of the at least two corrugated profiles comprises inward corrugations which are located between two inward corrugations of said at least one other of the at least two corrugated profiles when seen in axial direction along the central axis, and
- said at least one of the at least two corrugated profiles comprises outward corrugations which are located between two outward corrugations of said at least one other of the at least two corrugated profiles when seen in axial direction along the central axis.

The structure of the bendable part allows that the straw has a high bending capacity. It may allow that the bendable part is forms a U-turn in the straw.

In an embodiment of the straw according to the invention, each of the inward corrugations extends along 50% of the circumference of the tubular body or less than 50% of the circumference of the tubular body, and each of the outward corrugations extends along 50% of the circumference of the tubular body or less than 50% of the circumference of the tubular body.

In an embodiment of the straw according to the invention, said at least one of the at least two corrugated profiles comprises multiple corrugated profiles which are circumferentially offset relative to each other, and said at least one other of the at least two corrugated profiles comprises multiple corrugated profiles which are circumferentially offset relative to each other.

In an embodiment of the straw according to the invention, the inward corrugations extend over an inward part of the circumference of the tubular body, the outward corrugations extend over an outward part of the circumference of the tubular body, and the inward part of the circumference is larger than the outward part of the circumference.

In an embodiment of the straw according to the invention, the inward corrugations of said at least one of the at least two corrugated profiles extend over a first inward part of the circumference of the tubular body, the outward corrugations of said at least one of the at least two corrugated profiles extend over a first outward part of the circumference of the tubular body, the inward corrugations of said at least one other of the at least two corrugated profiles extend over a second inward part of the circumference of the tubular body, and the outward corrugations of said at least one other of the at least two corrugated profiles extend over a second outward part of the circumference of the tubular body.

In an embodiment of the straw according to the invention, the first inward part of the circumference is larger than the first outward part of the circumference, and the second inward part of the circumference is larger than the second outward part of the circumference.

In an embodiment of the straw according to the invention, the inward corrugations of said at least one of the at least two corrugated profiles extend over a constant first inward part of the circumference of the tubular body, the outward corrugations of said at least one of the at least two corrugated profiles extend over a constant first outward part of the circumference of the tubular body, the inward corrugations of said at least one other of the at least two corrugated profiles extend over a constant second inward part of the circumference of the tubular body, and the outward corrugations of said at least one other of the at least two corrugated profiles extend over a constant second outward part of the circumference of the tubular body.

In an embodiment of the straw according to the invention, the constant first inward part of the circumference is larger than the constant first outward part of the circumference, and the constant second inward part of the circumference is larger than the constant second outward part of the circumference.

In an embodiment of the straw according to the invention, the at least two corrugated profiles have a common period, and said at least one of the at least two corrugated profiles and said at least one other of the at least two corrugated profiles have a phase difference of one half of the common period when seen in axial direction along the central axis.

In an embodiment of the straw according to the invention, said at least one of the at least two corrugated profiles comprises a first corrugated profile and a second corrugated profile, the first corrugated profile and the second corrugated profile are located at opposite sides of the circumference, said at least one other of the at least two corrugated profiles comprises a third corrugated profile and a fourth corrugated profile, and the third corrugated profile and the fourth corrugated profile are located at opposite sides of the circumference.

In an embodiment of the straw according to the invention, the first corrugated profile and the third corrugated profile are circumferentially offset over one quarter of the circumference, and the second corrugated profile and the fourth corrugated profile are circumferentially offset over one quarter of the circumference.

In an embodiment of the straw according to the invention, the first corrugated profile and the second corrugated profile have a first period and are in phase when seen in axial direction along the central axis, and the third corrugated profile and the fourth corrugated profile have a second period and are in phase when seen in axial direction along the central axis.

In an embodiment of the straw according to the invention, the first period is equal to the second period.

In an embodiment of the straw according to the invention, the at least two corrugated profiles provided in the wall only comprise the first corrugated profile, the second corrugated profile, the third corrugated profile, and the fourth corrugated profile.

In an embodiment of the straw according to the invention, said at least one of the at least two corrugated profiles comprises a first corrugated profile, a second corrugated profile and a third corrugated profile, the first corrugated profile, the second corrugated profile, and the third corrugated profile surround the central axis, said at least one other of the at least two corrugated profiles comprises a fourth corrugated profile, a fifth corrugated profile and a sixth corrugated profile, and the fourth corrugated profile, the fifth corrugated profile, and the sixth corrugated profile surround the central axis.

In an embodiment of the straw according to the invention, said at least one of the at least two corrugated profiles comprises a first corrugated profile, a second corrugated profile and a third corrugated profile, the first corrugated profile, the second corrugated profile, and the third corrugated profile define a first triangle surrounding the central axis, said at least one other of the at least two corrugated profiles comprises a fourth corrugated profile, a fifth corrugated profile and a sixth corrugated profile, and the fourth corrugated profile, the fifth corrugated profile, and the sixth corrugated profile define a second triangle surrounding the central axis.

In an embodiment of the straw according to the invention, the first triangle is a first isosceles triangle or a first equilateral triangle, and the second triangle is a second isosceles triangle or a second equilateral triangle.

In an embodiment of the straw according to the invention, the first corrugated profile and the fourth corrugated profile are circumferentially offset over one sixth of the circumference, the second corrugated profile and the fifth corrugated profile are circumferentially offset over one sixth of the circumference, and the third corrugated profile and the sixth corrugated profile are circumferentially offset over one sixth of the circumference.

In an embodiment of the straw according to the invention, the first corrugated profile, the second corrugated profile, and the third corrugated profile have a first period and are in phase when seen in axial direction along the central axis, and the fourth corrugated profile, the fifth corrugated profile, and the sixth corrugated profile have a second period and are in phase when seen in axial direction along the central axis.

In an embodiment of the straw according to the invention, the first period is equal to the second period.

In an embodiment of the straw according to the invention, the at least two corrugated profiles provided in the wall only comprise the first corrugated profile, the second corrugated profile, the third corrugated profile, the fourth corrugated profile, the fifth corrugated profile, and the sixth corrugated profile.

In an embodiment of the straw according to the invention, said at least one of the at least two corrugated profiles comprises a first corrugated profile, a second corrugated profile, a third corrugated profile, and a fourth corrugated profile, the first corrugated profile, the second corrugated profile, the third corrugated profile, and the fourth corrugated profile surround the central axis, said at least one other of the at least two corrugated profiles comprises a fifth corrugated profile, a sixth corrugated profile, a seventh corrugated profile, and eighth corrugated profile, and the fifth corrugated profile, the sixth corrugated profile, the seventh corrugated profile, and the eighth corrugated profile surround the central axis.

In an embodiment of the straw according to the invention, said at least one of the at least two corrugated profiles comprises a first corrugated profile, a second corrugated profile, a third corrugated profile, and a fourth corrugated profile, the first corrugated profile, the second corrugated profile, the third corrugated profile, and the fourth corrugated profile define a first quadrilateral surrounding the central axis, said at least one other of the at least two corrugated profiles comprises a fifth corrugated profile, a sixth corrugated profile, a seventh corrugated profile, and eighth corrugated profile, and the fifth corrugated profile, the sixth corrugated profile, the seventh corrugated profile, and the eighth corrugated profile define a second quadrilateral surrounding the central axis.

In an embodiment of the straw according to the invention, the first quadrilateral and the second quadrilateral are non-self-intersecting quadrilaterals.

In an embodiment of the straw according to the invention, the first quadrilateral is a first equilateral quadrilateral or a first equiangular quadrilateral or a first regular quadrilateral, and the second quadrilateral is a second equilateral quadrilateral or a second equiangular quadrilateral or a second regular quadrilateral.

In an embodiment of the straw according to the invention, the first corrugated profile and the fifth corrugated profile are circumferentially offset over one eighth of the circumference, the second corrugated profile and the sixth corrugated profile are circumferentially offset over one eighth of the circumference, the third corrugated profile and the seventh corrugated profile are circumferentially offset over one eighth of the circumference, and the fourth corrugated profile and the eighth corrugated profile are circumferentially offset over one eighth of the circumference.

In an embodiment of the straw according to the invention, the first corrugated profile, the second corrugated profile, the third corrugated profile, and the fourth corrugated profile have a first period and are in phase when seen in axial direction along the central axis, and the fifth corrugated profile, the sixth corrugated profile, the seventh corrugated profile, and the eight corrugated profile have a second period and are in phase when seen in axial direction along the central axis.

In an embodiment of the straw according to the invention, the first period is equal to the second period.

In an embodiment of the straw according to the invention, the at least two corrugated profiles provided in the wall only comprise the first corrugated profile, the second corrugated profile, the third corrugated profile, the fourth corrugated profile, the fifth corrugated profile, the sixth corrugated profile, the seventh corrugated profile, and the eighth corrugated profile.

In an embodiment of the straw according to the invention, said at least one of the at least two corrugated profiles comprises a first corrugated profile, a second corrugated profile, a third corrugated profile, a fourth corrugated profile, a fifth corrugated profile, and a sixth corrugated profile, the first corrugated profile, the second corrugated profile, the third corrugated profile, the fourth corrugated profile, the fifth corrugated profile, and the sixth corrugated profile surround the central axis, said at least one other of the at least two corrugated profiles comprises a seventh corrugated profile, an eighth corrugated profile, a ninth corrugated profile, a tenth corrugated profile, an eleventh corrugated profile, and a twelfth corrugated profile, and the seventh corrugated profile, the eighth corrugated profile, the ninth corrugated profile, the tenth corrugated profile, the eleventh corrugated profile, and the twelfth corrugated profile surround the central axis.

In an embodiment of the straw according to the invention, said at least one of the at least two corrugated profiles comprises a first corrugated profile, a second corrugated profile, a third corrugated profile, a fourth corrugated profile, a fifth corrugated profile, and a sixth corrugated profile, the first corrugated profile, the second corrugated profile, the third corrugated profile, the fourth corrugated profile, the fifth corrugated profile, and the sixth corrugated profile define a first hexagon surrounding the central axis, said at least one other of the at least two corrugated profiles comprises a seventh corrugated profile, an eighth corrugated profile, a ninth corrugated profile, a tenth corrugated profile, an eleventh corrugated profile, and a twelfth corrugated profile, and the seventh corrugated profile, the eighth corrugated profile, the ninth corrugated profile, the tenth corrugated profile, the eleventh corrugated profile, and the twelfth corrugated profile define a second hexagon surrounding the central axis.

In an embodiment of the straw according to the invention, the first hexagon and the second hexagon are non-self-intersecting hexagons.

In an embodiment of the straw according to the invention, the first hexagon is a first equilateral hexagon or a first equiangular hexagon or a regular second hexagon, and the second hexagon is a second equilateral hexagon or a second equiangular hexagon or a regular second hexagon.

In an embodiment of the straw according to the invention, the first corrugated profile and the seventh corrugated profile are circumferentially offset over one twelfth of the circumference, the second corrugated profile and the eighth corrugated profile are circumferentially offset over one twelfth of the circumference, the third corrugated profile and the ninth corrugated profile are circumferentially offset over one twelfth of the circumference, the fourth corrugated profile and the tenth corrugated profile are circumferentially offset over one twelfth of the circumference, the fifth corrugated profile and the eleventh corrugated profile are circumferentially offset over one twelfth of the circumference, and the sixth corrugated profile and the twelfth corrugated profile are circumferentially offset over one twelfth of the circumference.

In an embodiment of the straw according to the invention, the first corrugated profile, the second corrugated profile, the third corrugated profile, the fourth corrugated profile, the fifth corrugated profile, and the sixth corrugated profile have a first period and are in phase when seen in axial direction along the central axis, and the seventh corrugated profile, the eighth corrugated profile, the ninth corrugated profile, the tenth corrugated profile, the eleventh corrugated profile, and the twelfth corrugated profile have a second period and are in phase when seen in axial direction along the central axis.

In an embodiment of the straw according to the invention, the first period is equal to the second period.

In an embodiment of the straw according to the invention, the at least two corrugated profiles provided in the wall only comprise the first corrugated profile, the second corrugated profile, the third corrugated profile, the fourth corrugated profile, the fifth corrugated profile, the sixth corrugated profile, the seventh corrugated profile, the eighth corrugated profile, the ninth corrugated profile, the tenth corrugated profile, the eleventh corrugated profile, and the twelfth corrugated profile.

In an embodiment of the straw according to the invention, said at least one of the at least two corrugated profiles comprises a first number of N first corrugated profiles, the N first corrugated profiles surround the central axis, said at least one other of the at least two corrugated profiles comprises a second number of N second corrugated profiles, and the N second corrugated profiles surround the central axis.

In an embodiment of the straw according to the invention, said at least one of the at least two corrugated profiles comprises a first number of N first corrugated profiles, the N first corrugated profiles define a first N-sided polygon surrounding the central axis, said at least one other of the at least two corrugated profiles comprises a second number of N second corrugated profiles, and the N second corrugated profiles define a second N-sided polygon surrounding the central axis.

In an embodiment of the straw according to the invention, the first N-sided polygon and the second N-sided polygon are non-self-intersecting N-sided polygons.

In an embodiment of the straw according to the invention, the first N-sided polygon is a first equilateral N-sided polygon or a first equiangular N-sided polygon or a first regular N-sided polygon, and the second N-sided polygon is a second equilateral N-sided polygon or a second equiangular N-sided polygon or a second regular N-sided polygon.

In an embodiment of the straw according to the invention, the N first corrugated profiles and the N second corrugated profile are circumferentially offset over ½N times the circumference.

In an embodiment of the straw according to the invention, the N first corrugated profiles have a first period and are in phase when seen in axial direction along the central axis, and the N second corrugated profiles have a second period and are in phase when seen in axial direction along the central axis.

In an embodiment of the straw according to the invention, the first period is equal to the second period.

In an embodiment of the straw according to the invention, the at least two corrugated profiles provided in the wall only comprise the N first corrugated profiles and the N second corrugated profiles.

In an embodiment of the straw according to the invention, each of the at least two corrugated profiles forms a periodical profile of subsequent inward corrugations and outward corrugations when seen in axial direction along the central axis.

In an embodiment of the straw according to the invention, the inward corrugations of each of the at least two corrugated profiles form bottom sections of said corrugated profile, and the outward corrugations of each of the at least two corrugated profiles form top sections of said corrugated profile.

In an embodiment of the straw according to the invention, the bottom sections comprise circumferentially extending bottom ridges, each bottom ridge comprises a left bottom end and a right bottom end, each of the at least two corrugated profiles comprises a virtual left bottom end line extending through the left bottom ends of its bottom ridges, and each the at least two corrugated profiles comprises a virtual right bottom end line extending through the right bottom ends of its bottom ridges.

In an embodiment of the straw according to the invention, the virtual left bottom end lines and the virtual right bottom end lines extend parallel to the central axis.

In an embodiment of the straw according to the invention, the virtual left bottom end lines and the virtual right bottom end lines extend helically around at least part of the central axis.

In an embodiment of the straw according to the invention, the virtual left bottom end line of each said at least one of the at least two corrugated profiles is located between the virtual left bottom end line and the virtual right bottom end line of one of said at least one other of the at least two corrugated profiles, and the virtual right bottom end line of each said at least one of the at least two corrugated profiles is located between the virtual left bottom end line and the virtual right bottom end line of one of said at least one other of the at least two corrugated profiles.

In an embodiment of the straw according to the invention, the top sections comprise circumferentially extending top ridges, each top ridge comprises a left top end and a right top end, each of the at least two corrugated profiles comprises a virtual left top end line extending through the left top ends of its top ridges, and each the at least two corrugated profiles comprises a virtual right top end line extending through the right top ends of its top ridges.

In an embodiment of the straw according to the invention, the virtual left top end lines and the virtual right top end lines extend parallel to the central axis.

In an embodiment of the straw according to the invention, the virtual left top end lines and the virtual right top end lines extend helically around at least part of the central axis.

In an embodiment of the straw according to the invention, the virtual left top end line and the virtual right top end line of each said at least one of the at least two corrugated profiles are located between the virtual right top end line of one of said at least one other of the at least two corrugated profiles and the virtual left top end line of another of said at least one other of the at least two corrugated profiles.

In an embodiment of the straw according to the invention, each of the at least two corrugated profiles forms a zig-zag profile or a zig-zag-like profile when seen in axial direction along the central axis.

In an embodiment of the straw according to the invention, the inward corrugations of each the at least two corrugated profiles are axially aligned relative to each other and/or the outward corrugations of each of the at least two corrugated profiles are axially aligned relative to each other.

In an embodiment of the straw according to the invention, at least part of the inward corrugations of each of at least two corrugated profiles are circumferentially offset relative to each other and/or at least part of the outward corrugations of each of the at least two corrugated profiles are circumferentially offset relative to each other.

In an embodiment of the straw according to the invention, at least part of the inward corrugations of each of at least two corrugated profiles are circumferentially offset to a constant degree relative to each other and/or at least part of the outward corrugations of each of the at least two corrugated profiles are circumferentially offset to a constant degree relative to each other.

In an embodiment of the straw according to the invention, at least part of the inward corrugations of each of at least two corrugated profiles are circumferentially offset to a varying degree relative to each other and/or at least part of the outward corrugations of each of the at least two corrugated profiles are circumferentially offset to a varying degree relative to each other.

In an embodiment of the straw according to the invention, the tubular body is formed from at least one helically wound strip of paper or paper-like material.

In an embodiment of the straw according to the invention, the tubular body is formed from multiple helically wound strips of paper or paper-like material.

It will be clear to the skilled person that the features of the above defined embodiments of the straw may be combined.

The invention further relates to a system for producing a straw made from paper or paper-like material and comprising a tubular body having a circumference formed by a wall surrounding a central axis and a bendable part extending axially along the central axis, wherein the system comprises:

- a holding unit to hold the tubular body of the straw in an operation position
- a profiling device comprising at least two series of push members which are positionable along the tubular body being held in the operation position, wherein:
  - each of the at least two series of push members comprises multiple push members being spaced from each other in axial direction along the central axis of the tubular body,
  - each push member is movable from a first member position in which the push member is spaced from the circumference of the tubular body into a second member position located closer to the central axis to push a contact part of the circumference of the tubular body coming in contact with the push member towards the central axis in order to form an inward corrugation extending along only part of the circumference of the tubular body,
  - at least one of the at least two series of push members is positioned circumferentially offset in view of the tubular body relative to at least one other of the at least two series of push members,
  - said at least one of the at least two series of push members comprises push members which are located between two push members of said at least one other of the at least two series of push members when seen in axial direction along the central axis of the tubular body, and
  - the profiling device is configured to move the push members of the at least two series of push members from the first member position into the second member position to form with each series of push members inward corrugations being positioned one after the other in axial direction along the central axis and to move the inward corrugations of each of the at least two series of push members towards each other in axial direction along the central axis to form outward corrugations extending along only part of the circumference of the tubular body and between subsequent inward corrugations, thereby providing the bendable part to the tubular body, which bendable part comprises at least two corrugated profiles provided in the wall, wherein each corrugated profile comprises inward corrugations and outward corrugations being positioned one after the other in axial direction along the central axis.

In an embodiment of system according to the invention, the system is configured to produce a straw according to the invention as defined above.

In an embodiment of system according to the invention,

- the holding unit comprises a fixation member to fixate a fixated part of the tubular body such that the tubular body comprises a non-fixated part having a free end when held in the operation position,
- the profiling device is configured to position the at least two series of push members along the non-fixated part of the tubular body, and the push members moving from the first member position into the second member position also move in axial direction along the central axis towards the fixated part of the tubular body in order to form the outward corrugations.

In an embodiment of system according to the invention, the holding unit comprises a fixation member to fixate a fixated part of the tubular body such that the tubular body comprises a non-fixated part having a free end when held in the operation position, the profiling device is configured to position the at least two series of push members along the non-fixated part of the tubular body, the push members moving from the first member position into the second member position also move in axial direction along the central axis towards the fixated part of the tubular body in order to initiate the forming of the outward corrugations, and the system comprises a compression device to subsequently apply a compression force on the straw in axial direction along the central axis in order to finalise the forming of the outward corrugations.

In an embodiment of system according to the invention, the profiling device is configured to after the push members of the at least two series of push members are moved into the second member position move the push members back into the first member position except for the push members located nearest to the fixated part of the tubular body when seen in axial direction along the central axis, and the compression device is configured to apply the compression force on the straw while said push members located nearest to the fixated part of the tubular body are maintained in the second member position.

In an embodiment of system according to the invention, said push members located nearest to the fixated part of the tubular body comprise support parts which are configured to push against the tubular body when said push members are located in the second member position.

In an embodiment of system according to the invention, the compression device is configured to apply the compression force on the non-fixated part of the tubular body, preferably on the free end of the non-fixated part of tubular body, and wherein the compression device optionally comprises a mandrel located inside the straw when the compression force is applied.

In an embodiment of system according to the invention, the system comprises a compression device to apply a compression force on the straw in axial direction along the central axis in order to form the outward corrugations.

In an embodiment of system according to the invention, the holding unit comprises a fixation member to fixate a fixated part of the tubular body such that the tubular body comprises a non-fixated part having a free end when held in the operation position, the profiling device is configured to position the at least two series of push members along the non-fixated part of the tubular body, and the compression device is configured to apply the compression force on the straw after the inward corrugations are formed by the push members of the at least two series of push members.

In an embodiment of system according to the invention, the push members moving from the first member position into the second member position do not move in axial direction along the central axis.

In an embodiment of system according to the invention, the profiling device is configured to after the push members of the at least two series of push members are moved into the second member position move the push members back into the first member position except for the push members located nearest to the fixated part of the tubular body when seen in axial direction along the central axis, and the compression device is configured to apply the compression force on the straw while said push members located nearest to the fixated part of the tubular body are maintained in the second member position.

In an embodiment of system according to the invention, said push members located nearest to the fixated part of the tubular body comprise support parts which are configured to push against the tubular body when said push members are located in the second member position.

In an embodiment of system according to the invention, the compression device is configured to apply the compression force on the non-fixated part of the tubular body, preferably on the free end of the non-fixated part of tubular body.

In an embodiment of system according to the invention, the compression device comprises a mandrel located inside the straw when the compression force is applied.

In an embodiment of system according to the invention, the profiling device is configured to, when seen in axial direction along the central axis, move subsequent push members one after the other from the first member position towards the second member position and starting with the push member(s) nearest to the fixated part of the tubular body.

In an embodiment of system according to the invention, the profiling device is configured to, for each of the at least two series of push members, bringing the subsequent push members into contact with the circumference of the tubular body when or after a respective previous push member has reached the second member position.

In an embodiment of system according to the invention, the push members of each of said at least one of the at least two series of push members are located at a first axial member distance from each other in axial direction along the central axis when said push members are positioned in the first member position, the push members of each of said at least one of the at least two series of push members are located at a second axial member distance from each other in axial direction along the central axis when said push members are positioned in the second member position, the subsequent push member of each of said at least one of the at least two series of push members positioned in the first member position is located at a third axial member distance in axial direction along the central axis from the previous push member positioned in the second member position, the third axial member distance is larger than the second axial member distance, the push members of each of said at least one other of the at least two series of push members are located at a fourth axial member distance from each other in axial direction along the central axis when said push members are positioned in the first member position, the push members of each of said at least one other of the at least two series of push members are located at a fifth axial member distance from each other in axial direction along the central axis when said push members are positioned in the second member position, the subsequent push member of each of said at least one other of the at least two series of push members positioned in the first member position is located at a sixth axial member distance in axial direction along the central axis from the previous push member positioned in the second member position, the sixth axial member distance is larger than the fifth axial member distance.

In an embodiment of system according to the invention, the first axial member distance and the second axial member distance are equal to each other, the fourth axial member distance and the fifth axial member distance are equal to each other.

In an embodiment of system according to the invention, the third axial member distance and the sixth axial member distance are equal to each other.

In an embodiment of system according to the invention, said subsequent push member of each of said at least one of the at least two series of push members moved out of the first member position and into first contact with the circumference of the tubular body is located at a seventh axial member distance in axial direction along the central axis from said previous push member positioned in the second member position, the seventh axial member distance is larger than the second axial member distance, said subsequent push member of each of said at least one other of the at least two series of push members moved out of the first member position and into first contact with the circumference of the tubular body is located at an eighth axial member distance in axial direction along the central axis from said previous push member positioned in the second member position, and the eighth axial member distance is larger than the fifth axial member distance.

In an embodiment of system according to the invention, the seventh axial member distance and the eighth axial member distance are equal to each other.

In an embodiment of system according to the invention, when the push members of the at least two series of push members are positioned in the second member position, the push members of said at least one of the at least two series of push members which are located between two push members of said at least one other of the at least two series of push members are located in the middle between said two push members of said at least one other of the at least two series of push members when seen in axial direction along the central axis.

In an embodiment of system according to the invention, the push members positioned in the first member position are located at a first radial distance from the central axis, the push members positioned in the second member position are located at a second radial distance from the central axis, and the second radial distance is smaller than the first radial distance.

In an embodiment of system according to the invention, the profiling device is configured to move the push members along a trajectory extending under an angle $\alpha$ larger than 90 degrees relative to the central axis and towards the fixated part of the tubular body during the movement from the first member position into the second member position.

In an embodiment of system according to the invention, the profiling device is configured to move the push members along a curved trajectory, such as a trajectory along part of a circle, towards the fixated part of the tubular body during the movement from the first member position into the second member position.

In an embodiment of system according to the invention, the push members comprises a contact edge configured to push the contact part of the circumference of the tubular body towards the central axis in order to form the inward corrugation extending.

In an embodiment of system according to the invention, the push members are configured to push the contact parts of the circumference of the tubular body formed from at least one helically wound strip of paper or paper-like material towards the central axis in order to form the inward corrugations.

In an embodiment of system according to the invention, the push members are configured to push the contact parts of the circumference of the tubular body formed from multiple helically wound strips of paper or paper-like material towards the central axis in order to form the inward corrugations.

In an embodiment of system according to the invention, the system comprises a tubular body supply to supply the tubular body made from paper or paper-like material and having the circumference formed by the wall surrounding the central axis.

In an embodiment of system according to the invention, said at least one of the at least two series of push members comprises a first series of push members and a second series of push members, the first series of push members positioned in the second member position and the second series of push members positioned in the second member position are located at opposite sides of the circumference, said at least one other of the at least two series of push members comprises a third series of push members and a fourth series of push members, and the third series of push members positioned in the second member position and the fourth series of push members positioned in the second member position are located at opposite sides of the circumference.

In an embodiment of system according to the invention, when the push members of the at least two series of push members are positioned in the second member position:

the first series of push members and the third series of push members are circumferentially offset relative to each other over one quarter of the circumference, and the second series of push members and the fourth series of push members are circumferentially offset relative to each other over one quarter of the circumference.

In an embodiment of system according to the invention, when the push members of the at least two series of push members are positioned in the second member position:

the first series of push members and the second series of push members are located at identical axial positions when seen in axial direction along the central axis, and the third series of push members and the fourth series of push members are located at identical axial positions when seen in axial direction along the central axis.

In an embodiment of system according to the invention, the at least two series of push members only comprise the first series of push members, the second series of push members, the third series of push members, and the fourth series of push members.

In an embodiment of system according to the invention, said at least one of the at least two series of push members comprises a first series of push members, a second series of push members and a third series of push members, the first series of push members positioned in the second member position, the second series of push members positioned in the second member position, and the third series of push members positioned in the second member position surround the central axis, said at least one other of the at least two series of push members comprises a fourth series of push members, a fifth series of push members and a sixth series of push members, and the fourth series of push members positioned in the second member position, the fifth series of push members positioned in the second member position, and the sixth series of push members positioned in the second member position surround the central axis.

In an embodiment of system according to the invention, said at least one of the at least two series of push members comprises a first series of push members, a second series of push members and a third series of push members, the first series of push members positioned in the second member position, the second series of push members positioned in the second member position, and the third series of push members positioned in the second member position define a first triangle surrounding the central axis, said at least one other of the at least two series of push members comprises a fourth series of push members, a fifth series of push members and a sixth series of push members, and the fourth series of push members positioned in the second member position, the fifth series of push members positioned in the second member position, and the sixth series of push members positioned in the second member position define a second triangle surrounding the central axis.

In an embodiment of system according to the invention, the first triangle is a first isosceles triangle or a first equilateral triangle, and the second triangle is a second isosceles triangle or a second equilateral triangle.

In an embodiment of system according to the invention, when the push members of the at least two series of push members are positioned in the second member position:

the first series of push members and the fourth series of push members are circumferentially offset relative to each other over one sixth of the circumference, the second series of push members and the fifth series of push members are circumferentially offset relative to each other over one sixth of the circumference, and the third series of push members and the sixth series of push members are circumferentially offset relative to each other over one sixth of the circumference.

In an embodiment of system according to the invention, when the push members of the at least two series of push members are positioned in the second member position:

the first series of push members, the second series of push members, and the third series of push members are located at identical axial positions when seen in axial direction along the central axis, and the fourth series of push members, the fifth series of push members, and the sixth series of push members are located at identical axial positions when seen in axial direction along the central axis.

In an embodiment of system according to the invention, the at least two series of push members only comprise the first series of push members, the second series of push members, the third series of push members, the fourth series of push members, the fifth series of push members, and the sixth series of push members.

In an embodiment of system according to the invention, said at least one of the at least two series of push members comprises a first series of push members, a second series of push members, a third series of push members, and a fourth series of push members, the first series of push members positioned in the second member position, the second series of push members positioned in the second member position, the third series of push members positioned in the second member position, and the fourth series of push members positioned in the second member position surround the central axis, said at least one other of the at least two series of push members comprises a fifth series of push members, a sixth series of push members, a seventh series of push members, and eighth series of push members, and the fifth series of push members positioned in the second member position, the sixth series of push members positioned in the second member position, the seventh series of push members positioned in the second member position, and the eighth series of push members positioned in the second member position surround the central axis.

In an embodiment of system according to the invention, said at least one of the at least two series of push members comprises a first series of push members, a second series of push members, a third series of push members, and a fourth series of push members, the first series of push members positioned in the second member position, the second series of push members positioned in the second member position, the third series of push members positioned in the second member position, and the fourth series of push members positioned in the second member position define a first quadrilateral surrounding the central axis, said at least one other of the at least two series of push members comprises a fifth series of push members, a sixth series of push members, a seventh series of push members, and eighth series of push members, and the fifth series of push members positioned in the second member position, the sixth series of push members positioned in the second member position, the seventh series of push members positioned in the second member position, and the eighth series of push members positioned in the second member position define a second quadrilateral surrounding the central axis.

In an embodiment of system according to the invention, the first quadrilateral and the second quadrilateral are non-self-intersecting quadrilaterals.

In an embodiment of system according to the invention, the first quadrilateral is a first equilateral quadrilateral or a first equiangular quadrilateral or a first regular quadrilateral, and the second quadrilateral is a second equilateral quadrilateral or a second equiangular quadrilateral or a second regular quadrilateral.

In an embodiment of system according to the invention, when the push members of the at least two series of push members are positioned in the second member position:

the first series of push members and the fifth series of push members are circumferentially offset relative to each other over one eighth of the circumference, the second series of push members and the sixth series of push members are circumferentially offset relative to each other over one eighth of the circumference, the third series of push members and the seventh series of push members are circumferentially offset relative to each other over one eighth of the circumference, and the fourth series of push members and the eighth series of push members are circumferentially offset relative to each other over one eighth of the circumference.

In an embodiment of system according to the invention, when the push members of the at least two series of push members are positioned in the second member position:

the first series of push members, the second series of push members, the third series of push members, and the fourth series of push members are located at identical axial positions when seen in axial direction along the central axis, and the fifth series of push members, the sixth series of push members, the seventh series of push members, and the eight series of push members are located at identical axial positions when seen in axial direction along the central axis.

In an embodiment of system according to the invention, the at least two series of push members only comprise the first series of push members, the second series of push members, the third series of push members, the fourth series of push members, the fifth series of push members, the sixth series of push members, the seventh series of push members, and the eighth series of push members.

In an embodiment of system according to the invention, said at least one of the at least two series of push members comprises a first series of push members, a second series of push members, a third series of push members, a fourth series of push members, a fifth series of push members, and a sixth series of push members, the first series of push members positioned in the second member position, the second series of push members positioned in the second member position, the third series of push members positioned in the second member position, the fourth series of push members positioned in the second member position, the fifth series of push members positioned in the second member position, and the sixth series of push members positioned in the second member position surround the central axis, said at least one other of the at least two series of push members comprises a seventh series of push members, an eighth series of push members, a ninth series of push members, a tenth series of push members, an eleventh series of push members, and a twelfth series of push members, and the seventh series of push members positioned in the second member position, the eighth series of push members positioned in the second member position, the ninth series of push members positioned in the second member position, the tenth series of push members positioned in the second member position, the eleventh series of push members positioned in the second member position, and the twelfth series of push members positioned in the second member position surround the central axis.

In an embodiment of system according to the invention, said at least one of the at least two series of push members comprises a first series of push members, a second series of push members, a third series of push members, a fourth series of push members, a fifth series of push members, and a sixth series of push members, the first series of push members positioned in the second member position, the second series of push members positioned in the second member position, the third series of push members positioned in the second member position, the fourth series of push members positioned in the second member position, the fifth series of push members positioned in the second member position, and the sixth series of push members positioned in the second member position define a first hexagon surrounding the central axis, said at least one other of the at least two series of push members comprises a seventh series of push members, an eighth series of push members, a ninth series of push members, a tenth series of push members, an eleventh series of push members, and a twelfth series of push members, and the seventh series of push members positioned in the second member position, the eighth series of push members positioned in the second member position, the ninth series of push members positioned in the second member position, the tenth series of push members positioned in the second member position, the eleventh series of push members positioned in the second member position, and the twelfth series of push members positioned in the second member position define a second hexagon surrounding the central axis.

In an embodiment of system according to the invention, the first hexagon and the second hexagon are non-self-intersecting hexagons.

In an embodiment of system according to the invention, the first hexagon is a first equilateral hexagon or a first equiangular hexagon or a regular second hexagon, and the second hexagon is a second equilateral hexagon or a second equiangular hexagon or a regular second hexagon.

In an embodiment of system according to the invention, when the push members of the at least two series of push members are positioned in the second member position:

the first series of push members and the seventh series of push members are circumferentially offset relative to each other over one twelfth of the circumference, the second series of push members and the eighth series of push members are circumferentially offset relative to each other over one twelfth of the circumference, the third series of push members and the ninth series of push members are circumferentially offset relative to each other over one twelfth of the circumference, the fourth series of push members and the tenth series of push members are circumferentially offset relative to each other over one twelfth of the circumference, the fifth series of push members and the eleventh series of push members are circumferentially offset relative to each other over one twelfth of the circumference, and the sixth series of push members and the twelfth series of push members are circumferentially offset relative to each other over one twelfth of the circumference.

In an embodiment of system according to the invention, when the push members of the at least two series of push members are positioned in the second member position:

the first series of push members, the second series of push members, the third series of push members, the fourth series of push members, the fifth series of push members, and the sixth series of push members are located at identical axial positions when seen in axial direction along the central axis, and the seventh series of push members, the eighth series of push members, the ninth series of push members, the tenth series of push members, the eleventh series of push members, and the twelfth series of push members are located at identical axial positions when seen in axial direction along the central axis.

In an embodiment of system according to the invention, the at least two series of push members only comprise the first series of push members, the second series of push members, the third series of push members, the fourth series of push members, the fifth series of push members, the sixth series of push members, the seventh series of push members, the eighth series of push members, the ninth series of push members, the tenth series of push members, the eleventh series of push members, and the twelfth series of push members.

In an embodiment of system according to the invention,
said at least one of the at least two series of push members comprises a first number of N first series of push members,
the N first series of push members positioned in the second member position surround the central axis,
said at least one other of the at least two series of push members comprises a second number of N second series of push members, and
the N second series of push members positioned in the second member position surround the central axis.

In an embodiment of system according to the invention,
said at least one of the at least two series of push members comprises a first number of N first series of push members,
the N first series of push members positioned in the second member position define a first N-sided polygon surrounding the central axis,
said at least one other of the at least two series of push members comprises a second number of N second series of push members, and
the N second series of push members positioned in the second member position define a second N-sided polygon surrounding the central axis.

In an embodiment of system according to the invention, the first N-sided polygon and the second N-sided polygon are non-self-intersecting N-sided polygons.

In an embodiment of system according to the invention, the first N-sided polygon is a first equilateral N-sided polygon or a first equiangular N-sided polygon or a first regular N-sided polygon, and the second N-sided polygon is a second equilateral N-sided polygon or a second equiangular N-sided polygon or a second regular N-sided polygon.

In an embodiment of system according to the invention, when the push members of the at least two series of push members are positioned in the second member position:
the N first series of push members and the N second series of push members are circumferentially offset relative to each other over ½N times the circumference.

In an embodiment of system according to the invention, when the push members of the at least two series of push members are positioned in the second member position:
the push members of the N first series of push members are located at identical axial positions when seen in axial direction along the central axis, and
the N second series of push members are located at identical axial positions when seen in axial direction along the central axis.

In an embodiment of system according to the invention, the at least two series of push members only comprise the N first series of push members and the N second series of push members.

In an embodiment of system according to the invention, the push members of each the at least two series of push members are axially aligned relative to each other.

In an embodiment of system according to the invention, at least part of the push members of each of at least two series of push members are circumferentially offset relative to each other.

In an embodiment of system according to the invention, at least part of the push members of each of at least series of push members are circumferentially offset to a constant degree relative to each other.

In an embodiment of system according to the invention, at least part of the push members of each of at least two series of push members are circumferentially offset to a varying degree relative to each other.

It will be clear to the skilled person that the features of the above defined embodiments of the system may be combined.

The invention further relates to a method for producing a straw made from paper or paper-like material and comprising a tubular body having a circumference formed by a wall surrounding a central axis and a bendable part extending axially along the central axis, said method comprises:
providing the tubular body made from paper or paper-like material and having the circumference formed by the wall surrounding the central axis,
positioning at least two series of push members along the tubular body, wherein:
each of the at least two series of push member comprises multiple push members being spaced from each other in axial direction along the central axis of the tubular body,
each push member is movable from a first member position in which the push member is spaced from the circumference of the tubular body into a second member position located closer to the central axis to push a contact part of the circumference of the tubular body coming in contact with the push member towards the central axis in order to form an inward corrugation extending along only part of the circumference of the tubular body,
at least one of the at least two series of push members is positioned in view of the tubular body circumferentially offset relative to at least one other of the at least two series of push members,
said at least one of the at least two series of push members comprises push members which are located between two push members of said at least one other of the at least two series of push members when seen in axial direction along the central axis of the tubular body,
moving the push members of the at least two series of push members from the first member position into the second member position to form with each series of push members inward corrugations being positioned one after the other in axial direction along the central axis and moving the inward corrugations of each of the at least two series of push members closer to each other in axial direction along the central axis to form outward corrugations extending along only part of the circumference of the tubular body and between subsequent inward corrugations, thereby providing the bendable part to the tubular body, which bendable part comprises at least two corrugated profiles provided in the wall, wherein each corrugated profile comprises inward corrugations and outward corrugations being positioned one after the other in axial direction along the central axis.

In an embodiment of the method according to the invention, the method is used to produce a straw according to the invention as defined above.

In an embodiment of the method according to the invention, the method comprises:

fixating a fixated part of the tubular body such that the tubular body comprises a non-fixated part having a free end, positioning the at least two series of push members along the non-fixated part of the tubular body, and moving the push members being moved from the first member position into the second member position also in axial direction along the central axis towards the fixated part of the tubular body in order to form the outward corrugations.

In an embodiment of the method according to the invention, the method comprises:

fixating a fixated part of the tubular body such that the tubular body comprises a non-fixated part having a free end, positioning the at least two series of push members along the non-fixated part of the tubular body, moving the push members being moved from the first member position into the second member position also in axial direction along the central axis towards the fixated part of the tubular body in order to initiate the forming of the outward corrugations, and subsequently applying a compression force on the straw in axial direction along the central axis in order to finalise the forming of the outward corrugations.

In an embodiment of the method according to the invention, the method comprises:

after the push members of the at least two series of push members are moved into the second member position moving the push members back into the first member position except for the push members located nearest to the fixated part of the tubular body when seen in axial direction along the central axis, and applying the compression force on the straw while said push members located nearest to the fixated part of the tubular body are maintained in the second member position.

In an embodiment of the method according to the invention, the method comprises, pushing support parts of said push members located nearest to the fixated part of the tubular body against the tubular body when said push members are located in the second member position.

In an embodiment of the method according to the invention, the method comprises applying the compression force on the non-fixated part of the tubular body, preferably on the free end of the non-fixated part of tubular body, and wherein the compression device optionally comprises a mandrel located inside the straw when the compression force is applied.

In an embodiment of the method according to the invention, the method comprises applying a compression force on the straw in axial direction along the central axis in order to form the outward corrugations.

In an embodiment of the method according to the invention, the method comprises:

fixating a fixated part of the tubular body such that the tubular body comprises a non-fixated part having a free end, positioning the at least two series of push members along the non-fixated part of the tubular body, and applying the compression force on the straw after the inward corrugations are formed by the push members of the at least two series of push members.

In an embodiment of the method according to the invention, the push members moving from the first member position into the second member position do not move in axial direction along the central axis.

In an embodiment of the method according to the invention, the method comprises:

after the push members of the at least two series of push members are moved into the second member position moving the push members back into the first member position except for the push members located nearest to the fixated part of the tubular body when seen in axial direction along the central axis, and applying the compression force on the straw while said push members located nearest to the fixated part of the tubular body are maintained in the second member position.

In an embodiment of the method according to the invention, the method comprises, pushing support parts of said push members located nearest to the fixated part of the tubular body against the tubular body when said push members are located in the second member position.

In an embodiment of the method according to the invention, the method comprises applying the compression force on the non-fixated part of the tubular body, preferably on the free end of the non-fixated part of tubular body.

In an embodiment of the method according to the invention, a mandrel is located inside the straw when the compression force is applied.

In an embodiment of the method according to the invention, the method comprises, when seen in axial direction along the central axis, moving subsequent push members one after the other from the first member position towards the second member position and starting with the push member(s) nearest to the fixated part of the tubular body.

In an embodiment of the method according to the invention, the method comprises, for each of the at least two series of push members, bringing the subsequent push members into contact with the circumference of the tubular body when or after a respective previous push member has reached the second member position.

In an embodiment of the method according to the invention, the method comprises:

placing the push members of each of said at least one of the at least two series of push members at a first axial member distance from each other in axial direction along the central axis when said push members are positioned in the first member position, placing the push members of each of said at least one of the at least two series of push members at a second axial member distance from each other in axial direction along the central axis when said push members are positioned in the second member position, placing the subsequent push member of each of said at least one of the at least two series of push members positioned in the first member position at a third axial member distance in axial direction along the central axis from the previous push member positioned in the second member position, wherein the third axial member distance is larger than the second axial member distance, placing the push members of each of said at least one other of the at least two series of push members at a fourth axial member distance from each other in axial direction along the central axis when said push members are positioned in the first member position, placing the push members of each of said at least one other of the at least two series of push members at a fifth axial member distance from each other in axial direction along the central axis when said push members are positioned in the second member position, and placing the subsequent push member of each of said at least one other of the at least two series of push members positioned in the first member position at a sixth axial member distance in axial direction along the central axis from the previous push member positioned in the second member position, and wherein the sixth axial member distance is larger than the fifth axial member distance.

In an embodiment of the method according to the invention, the first axial member distance and the second axial member distance are equal to each other, and the fourth axial member distance and the fifth axial member distance are equal to each other.

In an embodiment of the method according to the invention, the third axial member distance and the sixth axial member distance are equal to each other.

In an embodiment of the method according to the invention, the method comprises:

moving said subsequent push member of each of said at least one of the at least two series of push members out of the first member position and into first contact with the circumference of the tubular body at a seventh axial member distance in axial direction along the central axis from said previous push member positioned in the second member position, wherein the seventh axial member distance is larger than the second axial member distance, and moving said subsequent push member of each of said at least one other of the at least two series of push members out of the first member position and into first contact with the circumference of the tubular body at an eighth axial member distance in axial direction along the central axis from said previous push member positioned in the second member position, wherein the eighth axial member distance is larger than the fifth axial member distance.

In an embodiment of the method according to the invention, the seventh axial member distance and the eighth axial member distance are equal to each other.

In an embodiment of the method according to the invention, the method comprises, when the push members of the at least two series of push members are positioned in the second member position, placing the push members of said at least one of the at least two series of push members which are located between two push members of said at least one other of the at least two series of push members in the middle between said two push members of said at least one other of the at least two series of push members when seen in axial direction along the central axis.

In an embodiment of the method according to the invention, the push members positioned in the first member position are located at a first radial distance from the central axis, the push members positioned in the second member position are located at a second radial distance from the central axis, and the second radial distance is smaller than the first radial distance.

In an embodiment of the method according to the invention, the method comprises moving the push members along a transverse trajectory extending under an angle α larger than 90 degrees relative to the central axis and towards the fixated part of the tubular body during the movement from the first member position into the second member position.

In an embodiment of the method according to the invention, the method comprises moving the push members along a curved trajectory, such as a trajectory along part of circle, towards the fixated part of the tubular body during the movement from the first member position into the second member position.

In an embodiment of the method according to the invention, the method comprises pushing the contact parts of the circumference of the tubular body with a contact edge of the push members towards the central axis in order to form the inward corrugations.

In an embodiment of the method according to the invention, the method comprises pushing the contact parts of the circumference of the tubular body formed from at least one helically wound strip of paper or paper-like material with the push members towards the central axis in order to form the inward corrugations.

In an embodiment of the method according to the invention, the method comprises pushing the contact parts of the circumference of the tubular body formed from multiple helically wound strips of paper or paper-like material with the push members towards the central axis in order to form the inward corrugations.

In an embodiment of the method according to the invention;

said at least one of the at least two series of push members comprises a first series of push members and a second series of push members, the first series of push members positioned in the second member position and the second series of push members positioned in the second member position are located at opposite sides of the circumference, said at least one other of the at least two series of push members comprises a third series of push members and a fourth series of push members, and the third series of push members positioned in the second member position and the fourth series of push members positioned in the second member position are located at opposite sides of the circumference.

In an embodiment of the method according to the invention, when the push members of the at least two series of push members are positioned in the second member position:

the first series of push members and the third series of push members are circumferentially offset relative to each other over one quarter of the circumference, and the second series of push members and the fourth series of push members are circumferentially offset relative to each other over one quarter of the circumference.

In an embodiment of the method according to the invention, when the push members of the at least two series of push members are positioned in the second member position:

the first series of push members and the second series of push members are located at identical axial positions when seen in axial direction along the central axis, and the third series of push members and the fourth series of push members are located at identical axial positions when seen in axial direction along the central axis.

In an embodiment of the method according to the invention, the at least two series of push members only comprise the first series of push members, the second series of push members, the third series of push members, and the fourth series of push members.

In an embodiment of the method according to the invention;

said at least one of the at least two series of push members comprises a first series of push members, a second series of push members and a third series of push members, the first series of push members positioned in the second member position, the second series of push members positioned in the second member position, and the third series of push members positioned in the second member position surround the central axis, said at least one other of the at least two series of push members comprises a fourth series of push members, a fifth series of push members and a sixth series of push members, and the fourth series of push members positioned in the second member position, the fifth series of push members positioned in the second member position, and the sixth series of push members positioned in the second member position surround the central axis.

In an embodiment of the method according to the invention;

said at least one of the at least two series of push members comprises a first series of push members, a second series of push members and a third series of push members, the first series of push members positioned in the second member position, the second series of push members positioned in the second member position, and the third series of push members positioned in the second member position define a first triangle surrounding the central axis, said at least one other of the at least two series of push members comprises a fourth series of push members, a fifth series of push members and a sixth series of push members, and the fourth series of push members positioned in the second member position, the fifth series of push members positioned in the second member position, and the sixth series of push members positioned in the second member position define a second triangle surrounding the central axis.

In an embodiment of the method according to the invention, the first triangle is a first isosceles triangle or a first equilateral triangle, and the second triangle is a second isosceles triangle or a second equilateral triangle.

In an embodiment of the method according to the invention, when the push members of the at least two series of push members are positioned in the second member position:

the first series of push members and the fourth series of push members are circumferentially offset relative to each other over one sixth of the circumference, the second series of push members and the fifth series of push members are circumferentially offset relative to each other over one sixth of the circumference, and the third series of push members and the sixth series of push members are circumferentially offset relative to each other over one sixth of the circumference.

In an embodiment of the method according to the invention, when the push members of the at least two series of push members are positioned in the second member position:

the first series of push members, the second series of push members, and the third series of push members are located at identical axial positions when seen in axial direction along the central axis, and the fourth series of push members, the fifth series of push members, and the sixth series of push members are located at identical axial positions when seen in axial direction along the central axis.

In an embodiment of the method according to the invention, the at least two series of push members only comprise the first series of push members, the second series of push members, the third series of push members, the fourth series of push members, the fifth series of push members, and the sixth series of push members.

In an embodiment of the method according to the invention;

said at least one of the at least two series of push members comprises a first series of push members, a second series of push members, a third series of push members, and a fourth series of push members, the first series of push members positioned in the second member position, the second series of push members positioned in the second member position, the third series of push members positioned in the second member position, and the fourth series of push members positioned in the second member position surround the central axis, said at least one other of the at least two series of push members comprises a fifth series of push members, a sixth series of push members, a seventh series of push members, and eighth series of push members, and the fifth series of push members positioned in the second member position, the sixth series of push members positioned in the second member position, the seventh series of push members positioned in the second member position, and the eighth series of push members positioned in the second member position surround the central axis.

In an embodiment of the method according to the invention;

said at least one of the at least two series of push members comprises a first series of push members, a second series of push members, a third series of push members, and a fourth series of push members, the first series of push members positioned in the second member position, the second series of push members positioned in the second member position, the third series of push members positioned in the second member position, and the fourth series of push members positioned in the second member position define a first quadrilateral surrounding the central axis, said at least one other of the at least two series of push members comprises a fifth series of push members, a sixth series of push members, a seventh series of push members, and eighth series of push members, and the fifth series of push members positioned in the second member position, the sixth series of push members positioned in the second member position, the seventh series of push members positioned in the second member position, and the eighth series of push members positioned in the second member position define a second quadrilateral surrounding the central axis.

In an embodiment of the method according to the invention, the first quadrilateral and the second quadrilateral are non-self-intersecting quadrilaterals.

In an embodiment of the method according to the invention, the first quadrilateral is a first equilateral quadrilateral or a first equiangular quadrilateral or a first regular quadrilateral, and the second quadrilateral is a second equilateral quadrilateral or a second equiangular quadrilateral or a second regular quadrilateral.

In an embodiment of the method according to the invention, when the push members of the at least two series of push members are positioned in the second member position:

the first series of push members and the fifth series of push members are circumferentially offset relative to each other over one eighth of the circumference, the second series of push members and the sixth series of push members are circumferentially offset relative to each other over one eighth of the circumference, the third series of push members and the seventh series of push members are circumferentially offset relative to each other over one eighth of the circumference, and the fourth series of push members and the eighth series of push members are circumferentially offset relative to each other over one eighth of the circumference.

In an embodiment of the method according to the invention, when the push members of the at least two series of push members are positioned in the second member position:

the first series of push members, the second series of push members, the third series of push members, and the fourth series of push members are located at identical axial positions when seen in axial direction along the central axis, and the fifth series of push members, the sixth series of push members, the seventh series of push members, and the eight series of push members are located at identical axial positions when seen in axial direction along the central axis.

In an embodiment of the method according to the invention, the at least two series of push members only comprise the first series of push members, the second series of push members, the third series of push members, the fourth series of push members, the fifth series of push members, the sixth series of push members, the seventh series of push members, and the eighth series of push members.

In an embodiment of the method according to the invention;

said at least one of the at least two series of push members comprises a first series of push members, a second series of push members, a third series of push members, a fourth series of push members, a fifth series of push members, and a sixth series of push members, the first series of push members positioned in the second member position, the second series of push members positioned in the second member position, the third series of push members positioned in the second member position, the fourth series of push members positioned in the second member position, the fifth series of push members positioned in the second member position, and the sixth series of push members positioned in the second member position surround the central axis, said at least one other of the at least two series of push members comprises a seventh series of push members, an eighth series of push members, a ninth series of push members, a tenth series of push members, an eleventh series of push members, and a twelfth series of push members, and the seventh series of push members positioned in the second member position, the eighth series of push members positioned in the second member position, the ninth series of push members positioned in the second member position, the tenth series of push members positioned in the second member position, the eleventh series of push members positioned in the second member position, and the twelfth series of push members positioned in the second member position surround the central axis.

In an embodiment of the method according to the invention;

said at least one of the at least two series of push members comprises a first series of push members, a second series of push members, a third series of push members, a fourth series of push members, a fifth series of push members, and a sixth series of push members, the first series of push members positioned in the second member position, the second series of push members positioned in the second member position, the third series of push members positioned in the second member position, the fourth series of push members positioned in the second member position, the fifth series of push members positioned in the second member position, and the sixth series of push members positioned in the second member position define a first hexagon surrounding the central axis, said at least one other of the at least two series of push members comprises a seventh series of push members, an eighth series of push members, a ninth series of push members, a tenth series of push members, an eleventh series of push members, and a twelfth series of push members, and the seventh series of push members positioned in the second member position, the eighth series of push members positioned in the second member position, the ninth series of push members positioned in the second member position, the tenth series of push members positioned in the second member position, the eleventh series of push members positioned in the second member position, and the twelfth series of push members positioned in the second member position define a second hexagon surrounding the central axis.

In an embodiment of the method according to the invention, the first hexagon and the second hexagon are non-self-intersecting hexagons.

In an embodiment of the method according to the invention, the first hexagon is a first equilateral hexagon or a first equiangular hexagon or a regular second hexagon, and the second hexagon is a second equilateral hexagon or a second equiangular hexagon or a regular second hexagon.

In an embodiment of the method according to the invention, when the push members of the at least two series of push members are positioned in the second member position:

the first series of push members and the seventh series of push members are circumferentially offset relative to each other over one twelfth of the circumference, the second series of push members and the eighth series of push members are circumferentially offset relative to each other over one twelfth of the circumference, the third series of push members and the ninth series of push members are circumferentially offset relative to each other over one twelfth of the circumference, the fourth series of push members and the tenth series of push members are circumferentially offset relative to each other over one twelfth of the circumference, the fifth series of push members and the eleventh series of push members are circumferentially offset relative to each other over one twelfth of the circumference, and the sixth series of push members and the twelfth series of push members are circumferentially offset relative to each other over one twelfth of the circumference.

In an embodiment of the method according to the invention, when the push members of the at least two series of push members are positioned in the second member position:

the first series of push members, the second series of push members, the third series of push members, the fourth series of push members, the fifth series of push members, and the sixth series of push members are located at identical axial positions when seen in axial direction along the central axis, and the seventh series of push members, the eighth series of push members, the ninth series of push members, the tenth series of push members, the eleventh series of push members, and the twelfth series of push members are located at identical axial positions when seen in axial direction along the central axis.

In an embodiment of the method according to the invention, the at least two series of push members only comprise the first series of push members, the second series of push members, the third series of push members, the fourth series of push members, the fifth series of push members, the sixth series of push members, the seventh series of push members, the eighth series of push members, the ninth series of push members, the tenth series of push members, the eleventh series of push members, and the twelfth series of push members.

In an embodiment of the method according to the invention;

said at least one of the at least two series of push members comprises a first number of N first series of push members, the N first series of push members positioned in the second member position surround the central axis, said at least one other of the at least two series of push members comprises a second number of N second series of push members, and the N second series of push members positioned in the second member position surround the central axis.

In an embodiment of the method according to the invention;

said at least one of the at least two series of push members comprises a first number of N first series of push members, the N first series of push members positioned in the second member position define a first N-sided polygon surrounding the central axis, said at least one other of the at least two series of push members comprises a second number of N second series of push members, and the N second series of push members positioned in the second member position define a second N-sided polygon surrounding the central axis.

In an embodiment of the method according to the invention, the first N-sided polygon and the second N-sided polygon are non-self-intersecting N-sided polygons.

In an embodiment of the method according to the invention, the first N-sided polygon is a first equilateral N-sided polygon or a first equiangular N-sided polygon or a first regular N-sided polygon, and the second N-sided polygon is a second equilateral N-sided polygon or a second equiangular N-sided polygon or a second regular N-sided polygon.

In an embodiment of the method according to the invention, when the push members of the at least two series of push members are positioned in the second member position:

the N first series of push members and the N second series of push members are circumferentially offset relative to each other over ½N times the circumference.

In an embodiment of the method according to the invention, when the push members of the at least two series of push members are positioned in the second member position:

the push members of the N first series of push members are located at identical axial positions when seen in axial direction along the central axis, and the N second series of push members are located at identical axial positions when seen in axial direction along the central axis.

In an embodiment of the method according to the invention, the at least two series of push members only comprise the N first series of push members and the N second series of push members.

It will be clear to the skilled person that the features of the above defined embodiments of the method may be combined.

BRIEF DESCRIPTION OF THE FIGURES

Embodiments of the straw according to the invention, system according to the invention and method according to the invention will be described by way of example only, with reference to the accompanying schematic drawings in which corresponding reference symbols indicate corresponding parts, and in which:

the FIGS. 1-3 schematically show views in perspective of a first embodiment of the straw according to the invention, the FIGS. 4A,B schematically show a side view of FIG. 1, the FIGS. 5A,B schematically show a side view of FIG. 2, the FIGS. 6A,B schematically show a side view of FIG. 3, the FIGS. 7A,B schematically show a view in cross-section along the central axis of the FIGS. 4A,B, FIG. 8 schematically shows a view in cross-section along the central axis of the FIGS. 5A, B, FIG. 9 schematically shows a view in cross-section along the central axis of the FIGS. 6A, B, FIG. 10 schematically shows a view in cross-section perpendicular to the central axis and along line X-X of FIG. 5B, FIG. 11 schematically shows a view in cross-section perpendicular to the central axis and along XI-XI of FIG. 5B, FIG. 12 schematically shows a side view of the straw of FIG. 1, the FIGS. 13 and 14 schematically show views in perspective of a second embodiment of the straw according to the invention, FIG. 15 schematically shows a side view of FIG. 1, FIG. 16 schematically shows a side view of FIG. 2, FIG. 17 schematically shows a view in cross-section perpendicular to the central axis and along line XVII-XVII of FIG. 16, FIG. 18 schematically shows a view in cross-section perpendicular to the central axis and along line XVII-XVII of FIG. 16, the FIGS. 19A,B schematically show a first embodiment of the method according to invention to produce the straw of FIG. 1 in the side view of the FIGS. 5A,B, the FIGS. 20A,B schematically show the first embodiment of the method in the side view of the FIGS. 6A,B, FIG. 21 schematically shows a view in cross-section perpendicular to the central axis and along line XXI-XXI of FIG. 19B, FIG. 22 schematically shows a view in cross-section perpendicular to the central axis and along line XXII-XXII of FIG. 19B, FIG. 23A schematically shows the side view of the FIGS. 19A,B and indicates the first member position and the second member position, FIG. 23B schematically shows an enlarged view of part XXIII of FIG. 23A, FIG. 24A schematically shows the side view of the FIGS. 20A,B and indicates the first member position and the second member position, FIG. 24B schematically shows an enlarged view of part XXIV of FIG. 24A, the FIGS. 25A-N schematically show further details of the first embodiment of method in the side view of the FIGS. 19A,B, FIG. 26 schematically shows a second embodiment of the method according to invention to produce the straw of FIG. 13 in the view in cross-section of FIG. 17, FIG. 27 schematically shows the second embodiment of the method of FIG. 26 in the view in cross-section of FIG. 18, FIG. 28A schematically shows a side view of a first embodiment of the system according to invention, FIG. 28B schematically shows the view of FIG. 28A in cross section along the central axis of the straw, FIG. 29A schematically shows a top view of the system of FIG. 28A, FIG. 29B schematically shows the view of FIG. 29A in cross section along the central axis of the straw, the FIGS. 30A-G show enlarged views of part XXX of FIG. 28B, the FIGS. 31A-F show enlarged views of part XXXI of FIG. 29B, and the FIGS. 32A-C, 33A-C, and 34A-C schematically show alternative embodiments of the method and system according to the invention.

DETAILED DESCRIPTION OF THE FIGURES

Figure 1:
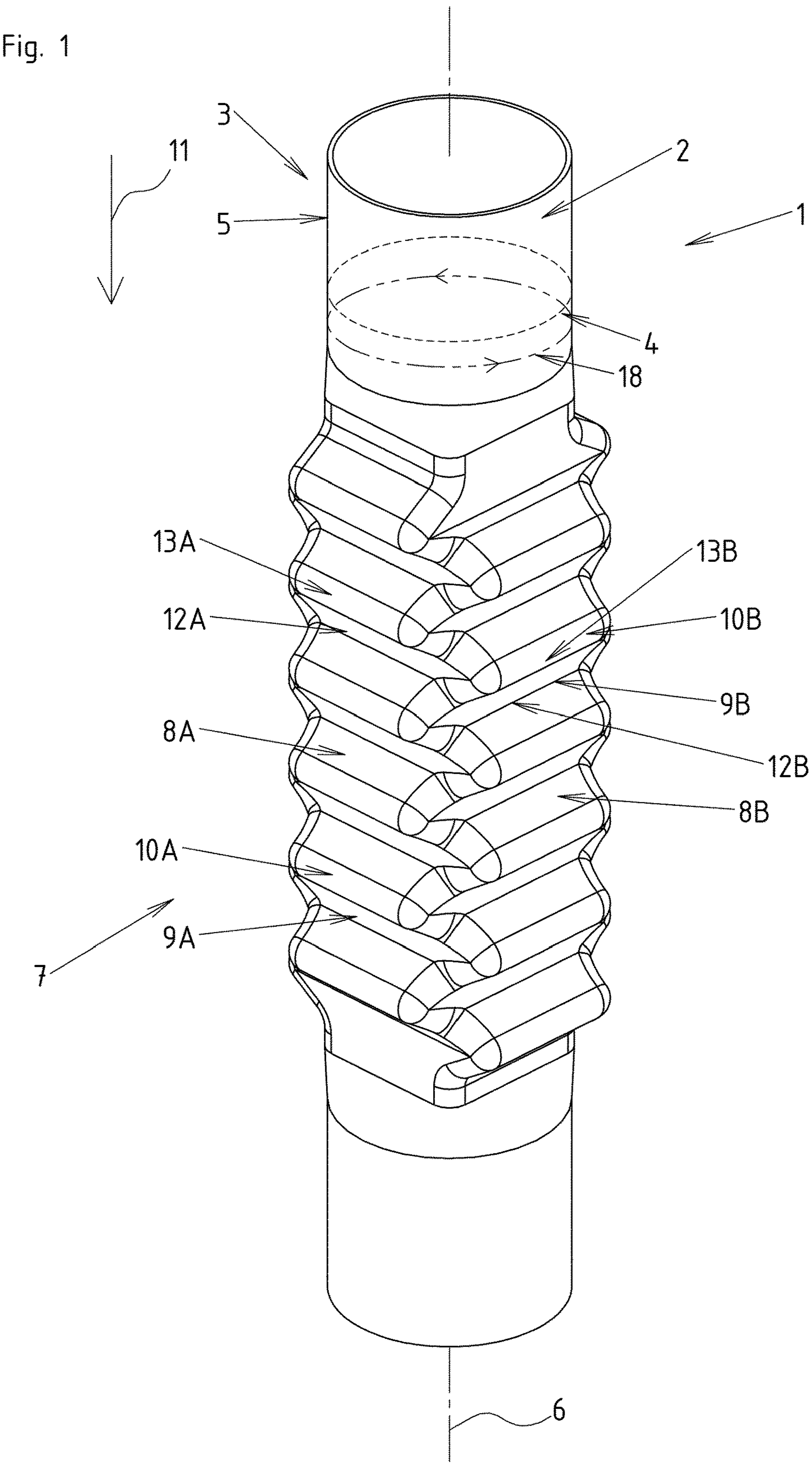
Figure 2:
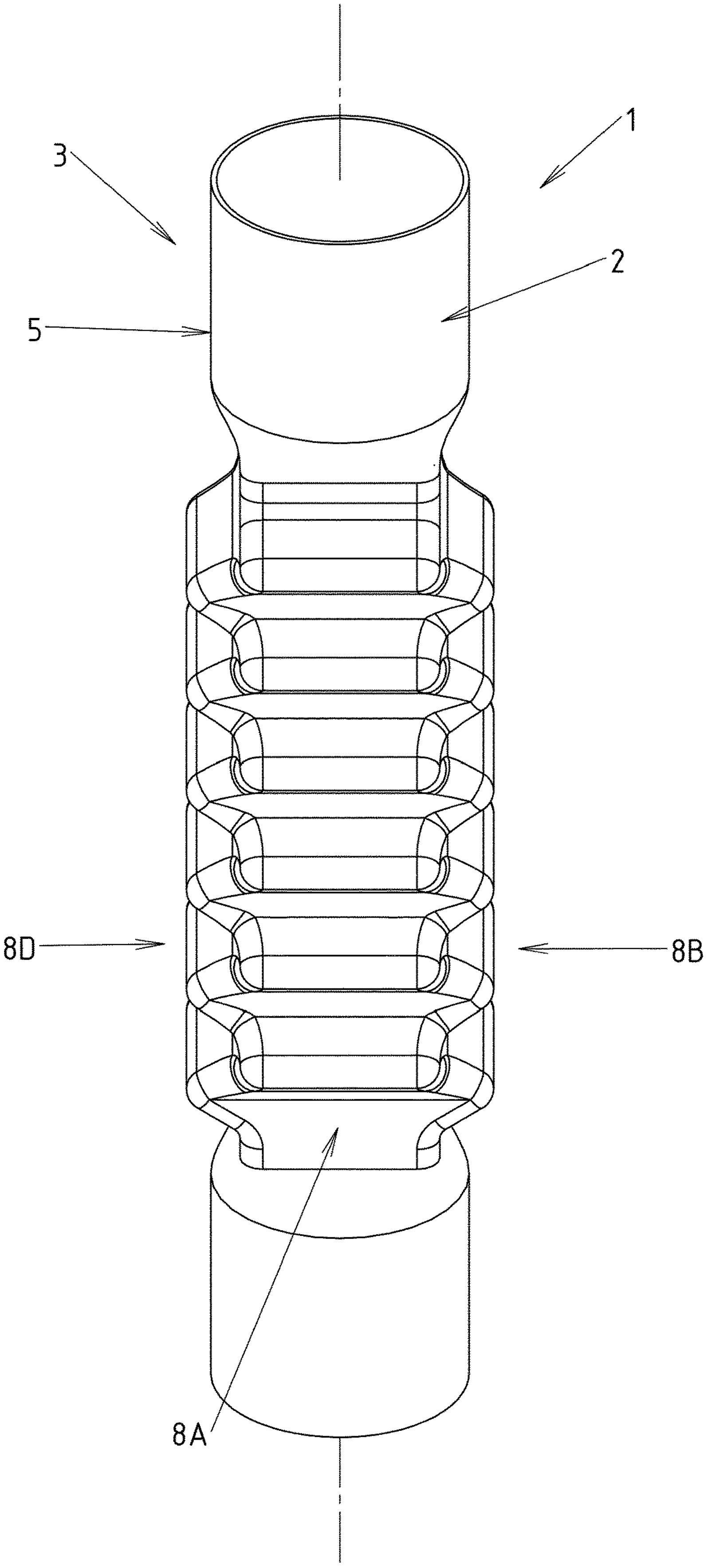
Figure 3:
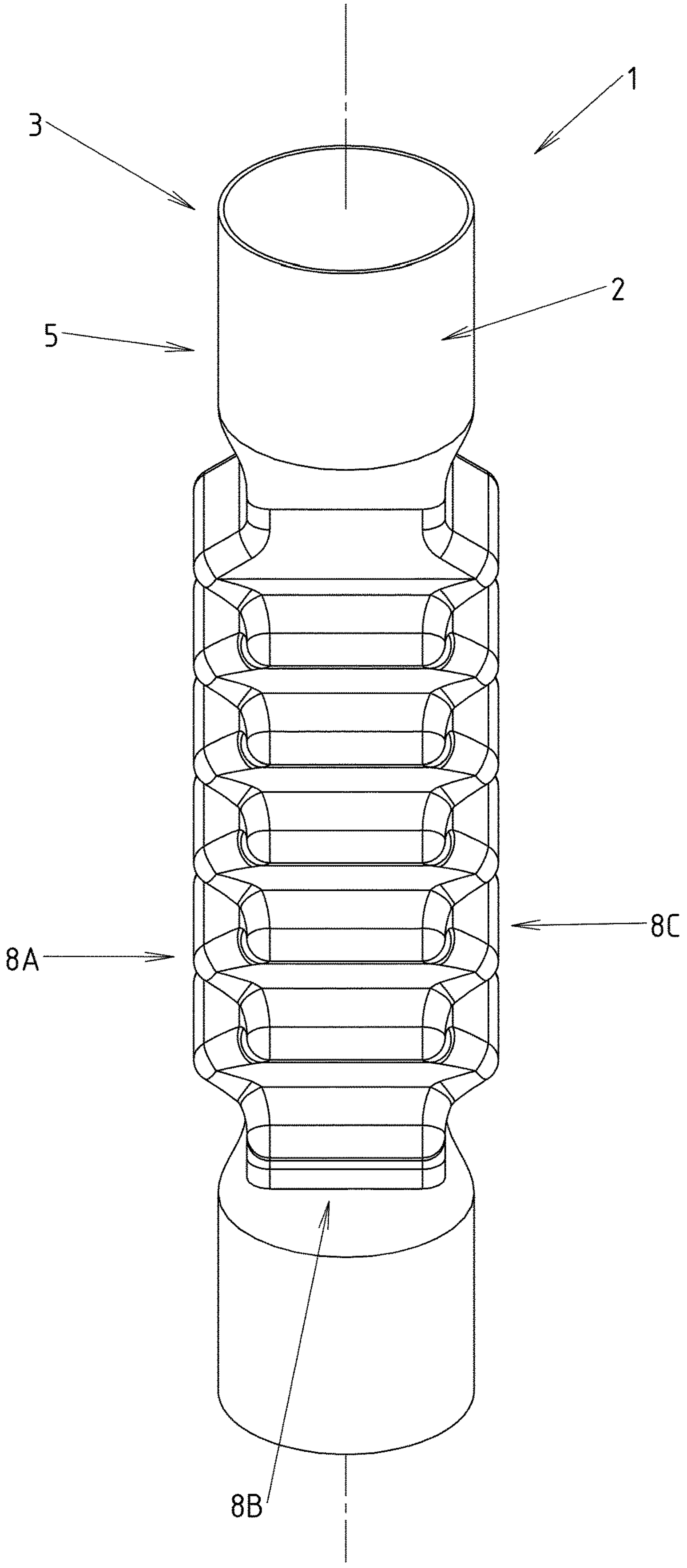
Figure 4A:
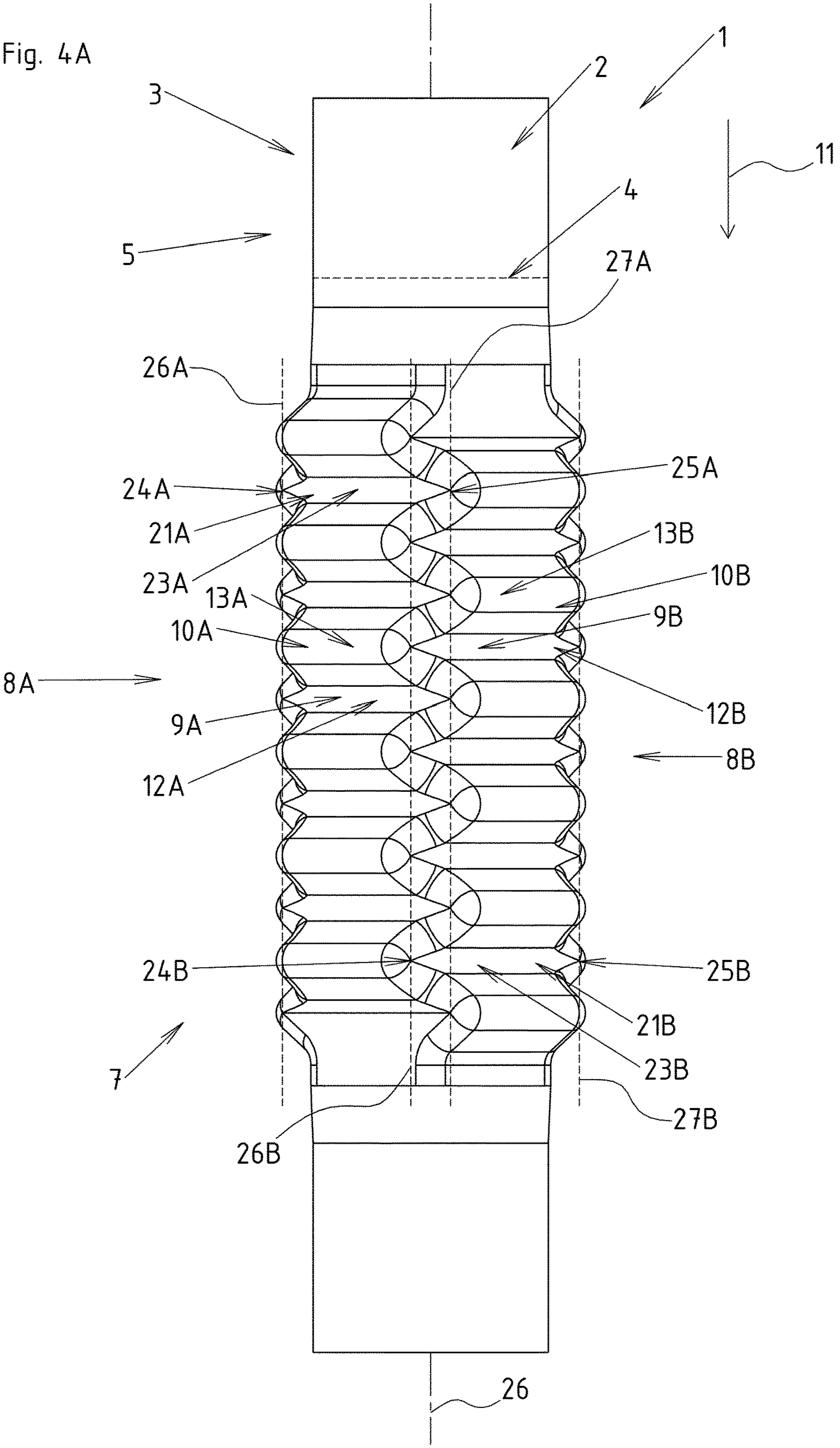
Figure 4B:
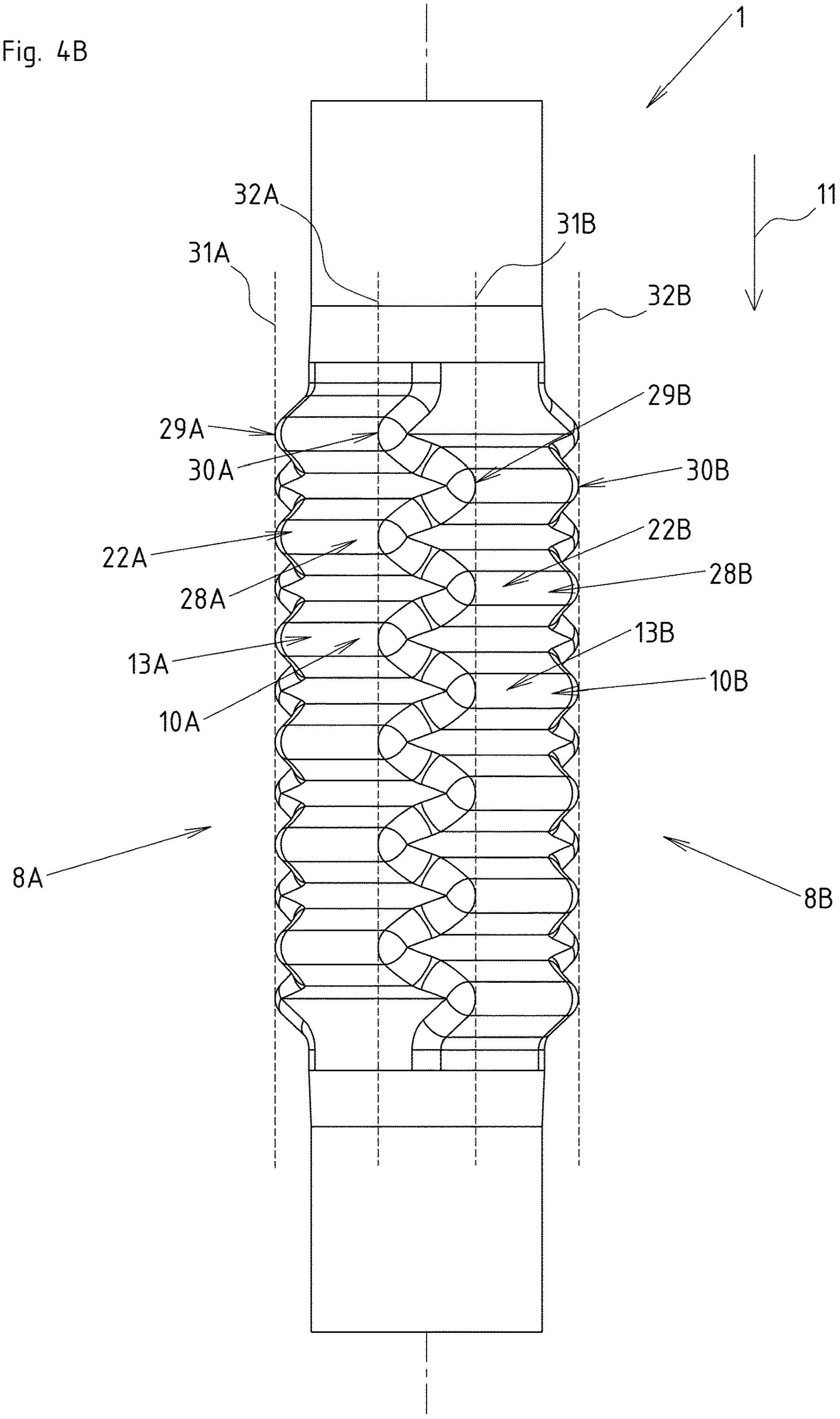

The FIGS. 1-12 show a first embodiment of the straw 1 according to the invention. The straw 1 is made from paper 2 or paper-like material. The straw 1 comprises a tubular body 3 having a circumference 4 formed by a wall 5 surrounding a central axis 6. The wall 5 has a thickness d (see FIG. 7A). The tubular body 3 is formed from multiple helically wound strips of paper 2 or paper-like material.

The straw 1 comprises a bendable part 7 extending axially along the central axis 6. The bendable part 7 comprises at least two corrugated profiles 8A-D provided in the wall 5. More specifically, the bendable part 7 comprises four corrugated profiles 8A-D provided in the wall 5. Each corrugated profile comprises inward corrugations 9A-D and outward corrugations 10A-D being positioned one after the other in axial direction 11 along the central axis 6.

Outside the bendable part 7, the tubular body 3 has a circular form in a cross section perpendicular to the central axis 6, but may have a different form such a triangular form or a quadrangular form or a pentagonal form or a hexagonal etc. The tubular body 3 has at the bendable part 7 a different form in a cross section perpendicular to the central axis 6 when compared with outside the bendable part 7.

The inward corrugations 9A-D extend along only part of the circumference 4 of the tubular body 3. The outward corrugations 10A-D extend along only part of the circumference 4 of the tubular body 3. The circumference 4 of the tubular body 3 and a circumferential direction 18 are indicated in FIG. 1. The circumference 4 and the circumferential direction 18 of the tubular body 3 can be determined at any axial position along the central axis 6, even if the cross-sectional form of the tubular body 3 changes, such as at the bendable part 7.

At least one 8A,C of the at least two corrugated profiles 8A-D is circumferentially offset relative to at least one other 8B,D of the at least two corrugated profiles 8A-D. More specifically, the corrugated profiles 8A,C are relative to the corrugated profiles 8B,D offset in the circumferential direction 18.

Said at least one 8A,C of the at least two corrugated profiles 8A-D comprises inward corrugations 9A,C which are located between two inward corrugations 9B,D of said at least one other 8B,D of the at least two corrugated profiles 8A-D when seen in axial direction 11 along the central axis 6. Said at least one 8A,C of the at least two corrugated profiles 8A-D comprises outward corrugations 10A,C which are located between two outward corrugations 10B,D of said at least one other 8B,D of the at least two corrugated profiles 8A-D when seen in axial direction 11 along the central axis 6.

Said at least one 8A,C of the at least two corrugated profiles 8A-D comprises multiple corrugated profiles 8A,C which are circumferentially offset relative to each other. Said at least one other 8B,D of the at least two corrugated profiles 8A-D comprises multiple corrugated profiles 8B,D which are circumferentially offset relative to each other. More specifically, the first corrugated profile 8A is offset in the circumferential direction 18 relative to the second corrugated profile 8C, and the third corrugated profile 8B is offset in the circumferential direction 18 relative to the fourth corrugated profile 8D.

Each of the inward corrugations 9A-D extends along less than 50% of the circumference 4 of the tubular body 3, and each of the outward corrugations 10A-D extends along less than 50% of the circumference 4 of the tubular body 3.

In other embodiments of the straw 1 according to the invention, each of the inward corrugations 9A-D may extend along 50% of the circumference 4 of the tubular body 3, and each of the outward corrugations 10A-D may extend along 50% of the circumference 4 of the tubular body 3.

The inward corrugations 9A,C of said at least one 8A,C of the at least two corrugated profiles 8A-D extend over a first inward part 12A,C of the circumference 4 of the tubular body 3. The outward corrugations 10A,C of said at least one 8A,C of the at least two corrugated profiles 8A-D extend over a first outward part 13A,C of the circumference 4 of the tubular body 3. The inward corrugations 9B,D of said at least one other 8B,D of the at least two corrugated profiles 8A-D extend over a second inward part 12B,D of the circumference 4 of the tubular body 3. The outward corrugations 10B,D of said at least one other 8B,D of the at least two corrugated profiles 8A-D extend over a second outward part 13B,D of the circumference 4 of the tubular body 3.

The first inward part 12A,C of the circumference 4 is larger than the first outward part 13A,C of the circumference 4. The second inward part 12B,D of the circumference 4 is larger than the second outward part 13B,D of the circumference 4.

The first inward parts 12A,C, the first outward parts 13A,C, the second inward parts 12B,D, and the second outward parts 13B,D are all constant.

In other embodiments of the straw 1 according to the invention, the first inward parts 12A,C, the first outward parts 13A,C, the second inward parts 12B,D, and the second outward parts 13B,D may vary.

Figure 8:
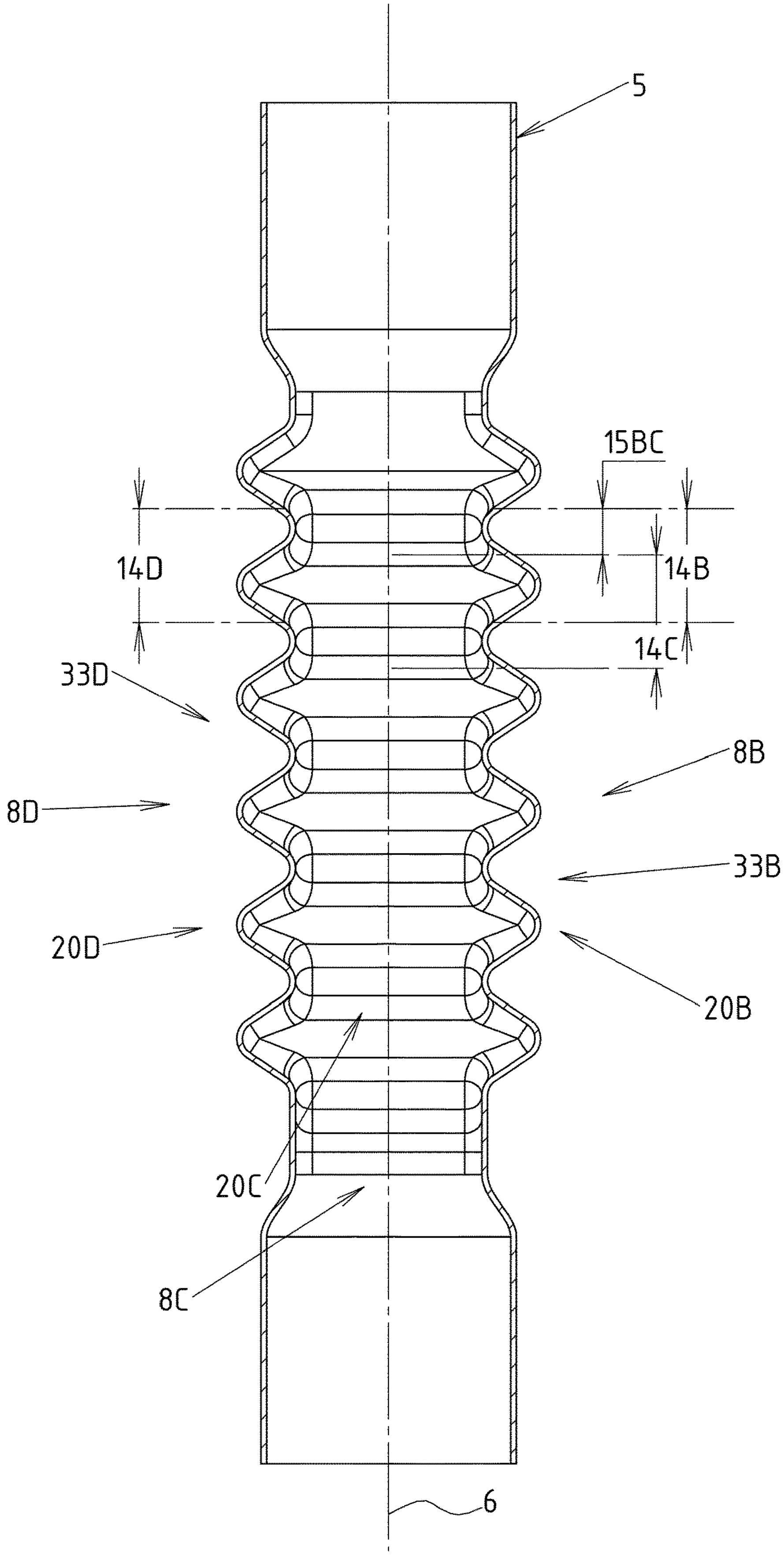
Figure 9:
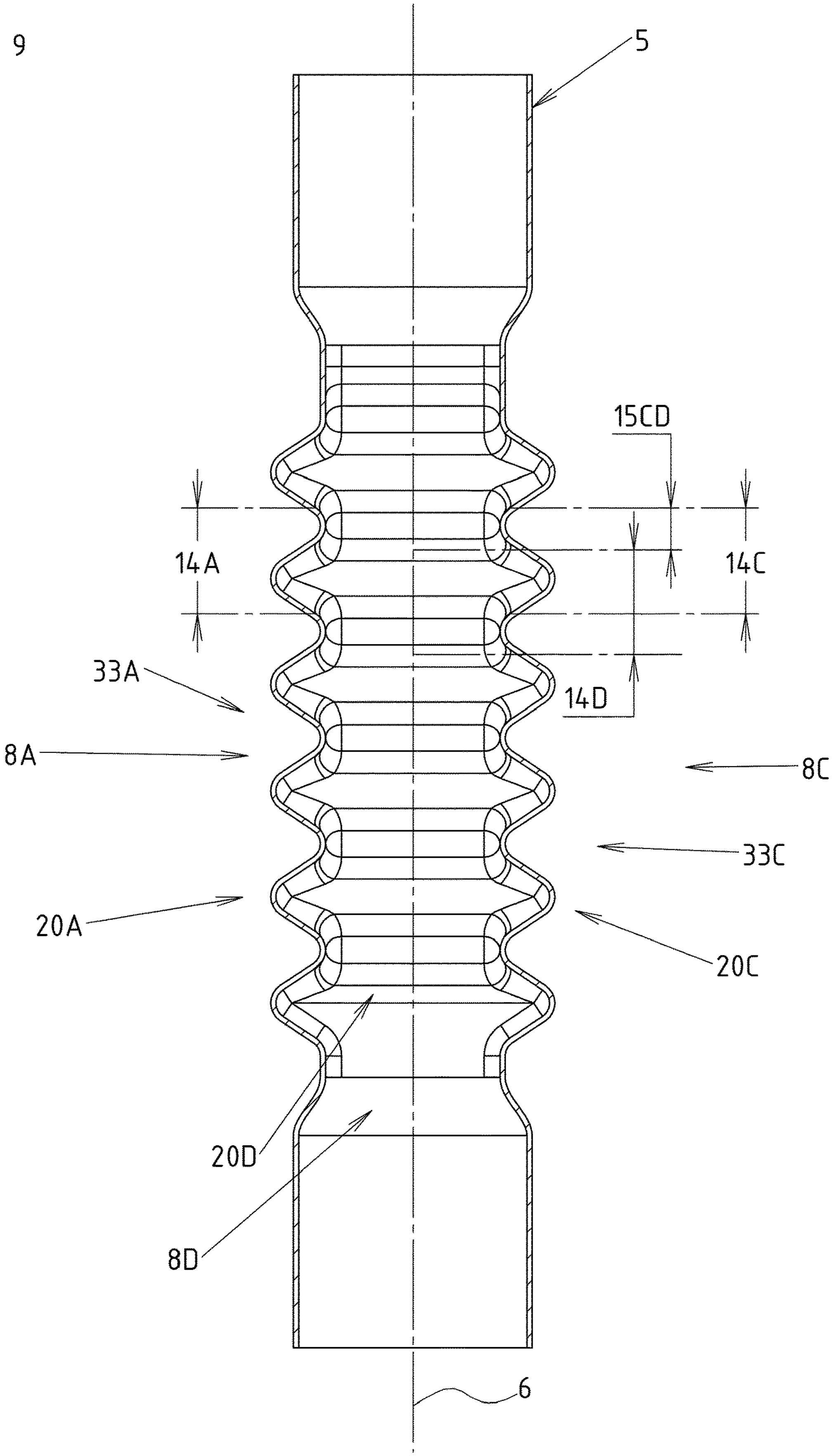
Figure 10:
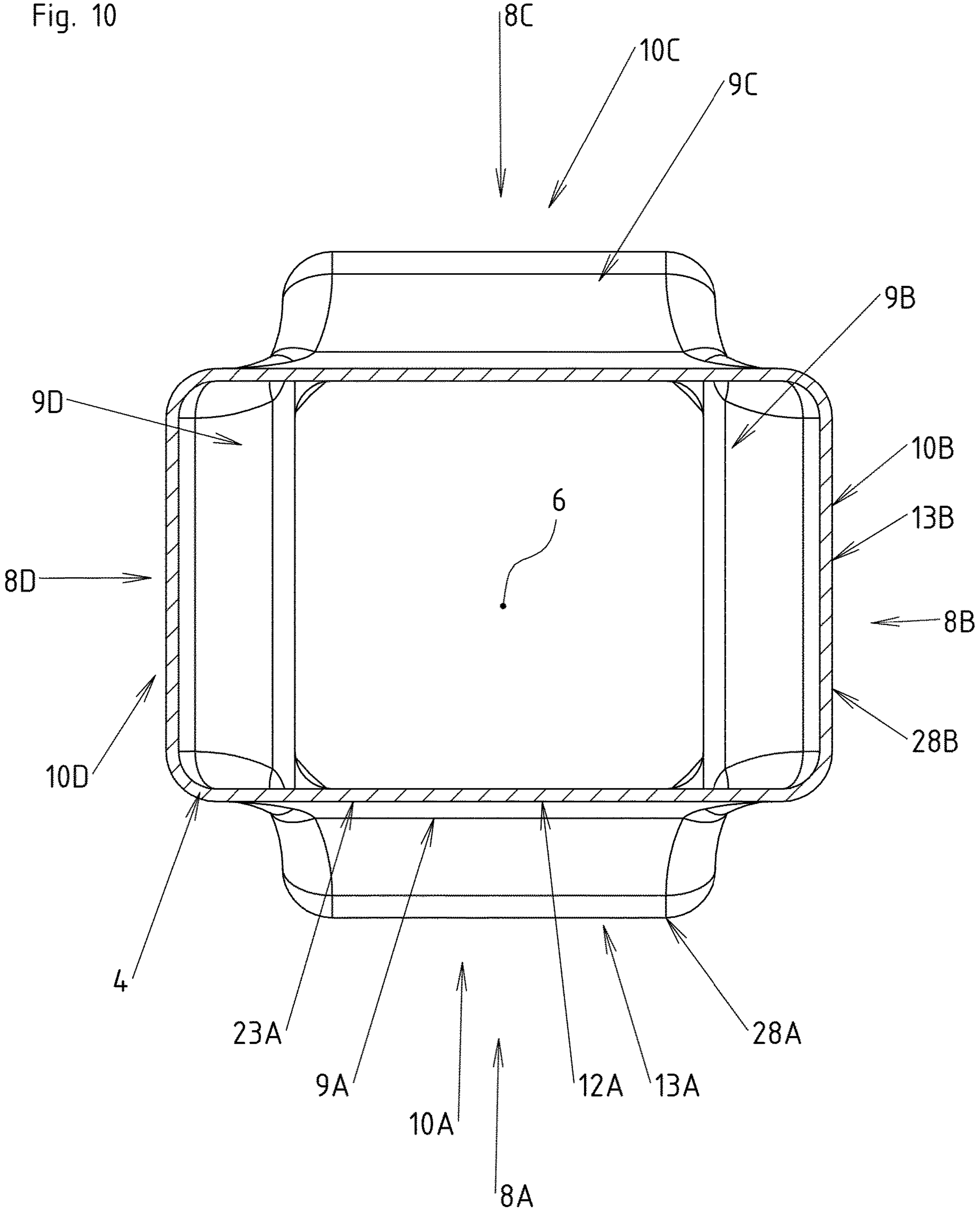
Figure 11:
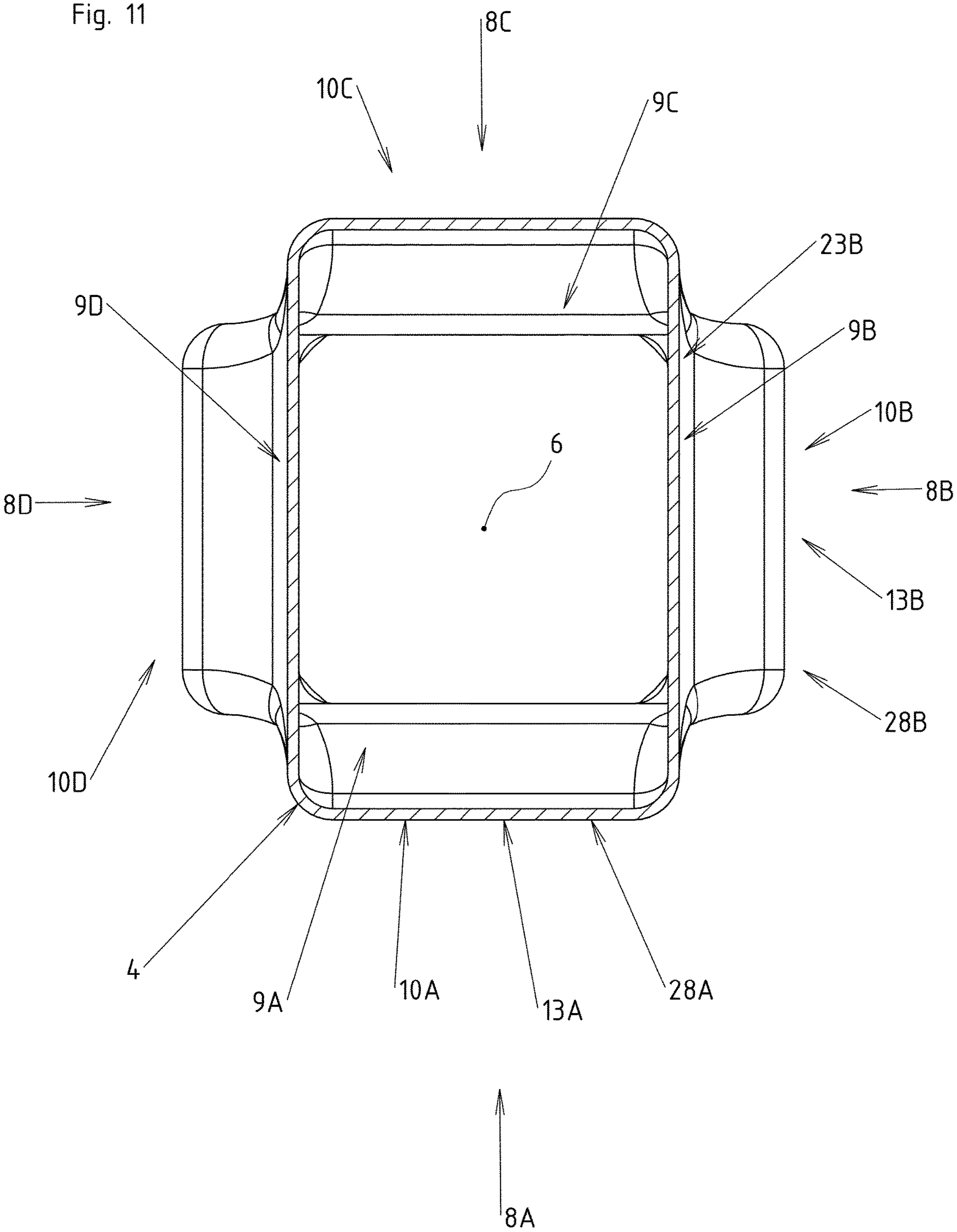
Figure 12:
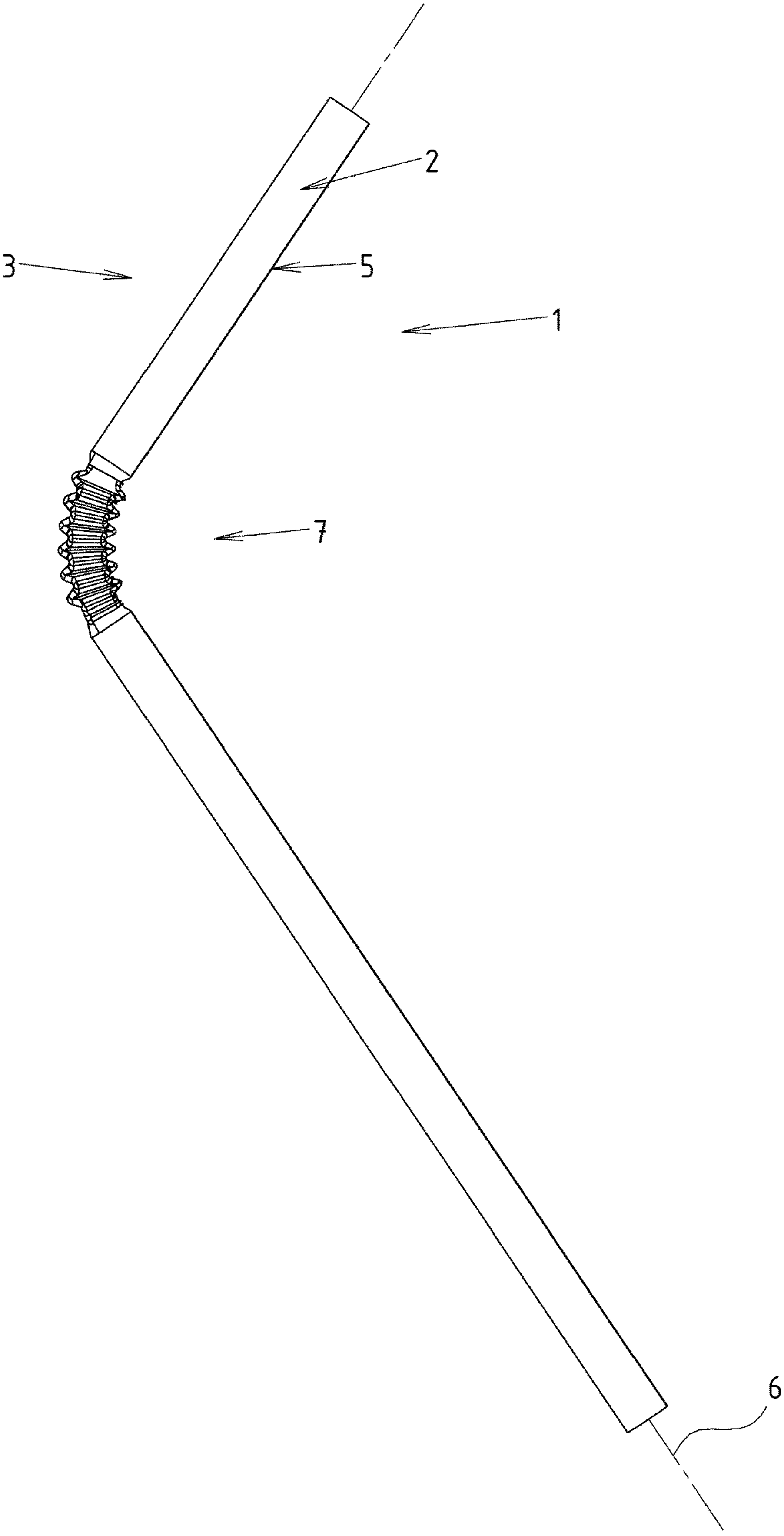

The at least two corrugated profiles 8A-D have a common period 14A-D, and said at least one 8A,C of the at least two corrugated profiles 8A-D and said at least one other 8B,D of the at least two corrugated profiles 8A-D have a phase difference 15 of one half of the common period when seen in axial direction 11 along the central axis 6. The phase difference 15BC is indicated in FIG. 8. The phase difference 15CD is indicated in FIG. 9.

More specifically, said at least one 8A,C of the at least two corrugated profiles 8A-D comprises a first corrugated profile 8A and a second corrugated profile 8C. The first corrugated profile 8A and the second corrugated profile 8C are located at opposite sides of the circumference 4. Said at least one other 8B,D of the at least two corrugated profiles 8A-D comprises a third corrugated profile 8B and a fourth corrugated profile 8D. The third corrugated profile 8B and the fourth corrugated profile 8D are located at opposite sides of the circumference 4.

The first corrugated profile 8A and the third corrugated profile 8B are circumferentially offset over one quarter of the circumference 4. The second corrugated 8C profile and the fourth corrugated profile 8D are circumferentially offset over one quarter of the circumference 4.

The first corrugated profile 8A and the second corrugated profile 8C have a first period 14A,C and are in phase when seen in axial direction 11 along the central axis 6. The third corrugated profile 8B and the fourth corrugated profile 8D have a second period 14B,D and are in phase when seen in axial direction 11 along the central axis 6. The first period 14A,C is equal to the second period 14B,D. This is also referred to as a common period 14A-D.

The at least two corrugated profiles 8A-D provided in the wall 5 only comprise the first corrugated profile 8A, the second corrugated profile 8C, the third corrugated profile 8B, and the fourth corrugated profile 8D.

Each of the at least two corrugated profiles 8A-D forms a periodical profile 20A-D of subsequent inward corrugations 9A-D and outward corrugations 10A-D when seen in axial direction 11 along the central axis 6.

The inward corrugations 9A-D of each of the at least two corrugated profiles 8A-D form bottom sections 21A-D of said corrugated profile 8A-D. The outward corrugations 10A-D of each of the at least two corrugated profiles 8A-D form top sections 22A-D of said corrugated profile 8A-D.

The bottom sections 21A-D comprise circumferentially extending bottom ridges 23A-D. Each bottom ridge 23A-D comprises a left bottom end 24A-D and a right bottom end 25A-D. Each of the at least two corrugated profiles 8A-D comprises a virtual left bottom end line 26A-D extending through the left bottom ends 24A-D of its bottom ridges 23A-D. Each the at least two corrugated profiles 8A-D comprises a virtual right bottom end line 27A-D extending through the right bottom ends 25A-D of its bottom ridges 23A-D.

The virtual left bottom end lines 26A-D and the virtual right bottom end lines 27A-D extend parallel to the central axis 6.

In other embodiments of the straw 1 according to the invention, the virtual left bottom end lines 26A-D and the virtual right bottom end lines 27A-D may extend helically around at least part of the central axis 6.

The virtual left bottom end line 26A,C of each said at least one 8A,C of the at least two corrugated profiles 8A-D is located between the virtual left bottom end line 26B,D and the virtual right bottom end line 27B,D of one of said at least one other 8B,D of the at least two corrugated profiles 8A-D. The virtual right bottom end line 27A,C of each said at least one 8A,C of the at least two corrugated profiles 8A-D is located between the virtual left bottom end line 26B,D and the virtual right bottom end line 27B,D of one of said at least one other 8B,D of the at least two corrugated profiles 8A-D. The term between relates in this situation to when seen in circumferential direction 18.

The top sections 22A-D comprise circumferentially extending top ridges 28A-D. Each top ridge 28A-D comprises a left top end 29A-D and a right top end 30A-D. Each of the at least two corrugated profiles 8A-D comprises a virtual left top end line 31A-D extending through the left top ends 29A-D of its top ridges 28A-D. Each the at least two corrugated profiles 8A-D comprises a virtual right top end line 32A-D extending through the right top ends 30A-D of its top ridges 28A-D.

The virtual left top end lines 31A-D and the virtual right top end lines 32A-D extend parallel to the central axis 6.

In other embodiments of the straw 1 according to the invention, the virtual left top end lines 31A-D and the virtual right top end lines 32A-D may extend helically around at least part of the central axis 6.

The virtual left top end line 31A,C and the virtual right top end line 32A,C of each said at least one 8A,C of the at least two corrugated profiles 8A-D are located between the virtual right top end line 32B,D of one of said at least one other 8B,D of the at least two corrugated profiles 8A-D and the virtual left top end line 31B,D of another of said at least one other 8B,D of the at least two corrugated profiles 8A-D. The term between relates in this situation to when seen in circumferential direction 18.

Each of the at least two corrugated profiles 8A-D forms a zig-zag profile 33A-D or a zig-zag-like profile 33A-D when seen in axial direction 11 along the central axis 6.

The inward corrugations 9A-D of each of the at least two corrugated profiles 8A-D are axially aligned relative to each other and the outward corrugations 10A-D of each of the at least two corrugated profiles 8A-D are axially aligned relative to each other.

In other embodiments of the straw 1 according to the invention, at least part of the inward corrugations 9A-D of each of at least two corrugated profiles 8A-D may be circumferentially offset relative to each other and/or at least part of the outward corrugations 10A-D of each of the at least two corrugated profiles 8A-D may be circumferentially offset relative to each other. They may be circumferentially offset to a constant degree or may be circumferentially offset to a varying degree.

The FIGS. 13-18 show a second embodiment of the straw 1 according to the invention. The bendable part 7 comprises at least two corrugated profiles 8A-F provided in the wall 5. Each corrugated profile 8A-F comprises inward corrugations 9A-F and outward corrugations 10A-F being positioned one after the other in axial direction 11 along the central axis 6. The inward corrugations 9A-F extend along only part of the circumference 4 of the tubular body 3. The outward corrugations 10A-F extend along only part of the circumference 4 of the tubular body 3. At least one 8A,C,E of the at least two corrugated profiles 8A-F is circumferentially offset relative to at least one other 8B,D,F of the at least two corrugated profiles 8A-F.

Said at least one 8A,D,E of the at least two corrugated profiles 8A-F comprises a first corrugated profile 8A, a second corrugated profile 8D, and a third corrugated profile 8E which define a first triangle 17A surrounding the central axis 6. Said at least one other 8B,D,F of the at least two corrugated profiles 8A-F comprises a fourth corrugated profile 8B, a fifth corrugated profile 8D, and a sixth corrugated profile 8F which define a second triangle 17B surrounding the central axis 6.

The first triangle 17A is a first equilateral triangle, and the second triangle 17B is a second equilateral triangle.

In other examples of the straw 1 according to the invention, the first triangle 17A and the second triangle 17B may have a different form, such as an isosceles triangle.

The first corrugated profile 8A and the fourth corrugated profile 8B are circumferentially offset over one sixth of the circumference 4. The second corrugated profile 8C and the fifth corrugated profile 8D are circumferentially offset over one sixth of the circumference 4. The third corrugated profile 8E and the sixth corrugated profile 8F are circumferentially offset over one sixth of the circumference 4.

The first corrugated profile 8A, the second corrugated profile 8C, and the third corrugated profile 8E have a first period 14A,C,E and are in phase when seen in axial direction 11 along the central axis 6. The fourth corrugated profile 8B, the fifth corrugated profile 8D, and the sixth corrugated profile 8F have a second period 14B,D,F and are in phase when seen in axial direction 11 along the central axis 6. The first period 14A,C,E is equal to the second period 14B,D,F.

The at least two corrugated profiles 8A-F provided in the wall 5 only comprise the first corrugated profile 8A, the second corrugated profile 8C, the third corrugated profile 8E, the fourth corrugated profile 8B, the fifth corrugated profile 8D, and the sixth corrugated profile 8F.

Figure 5A:
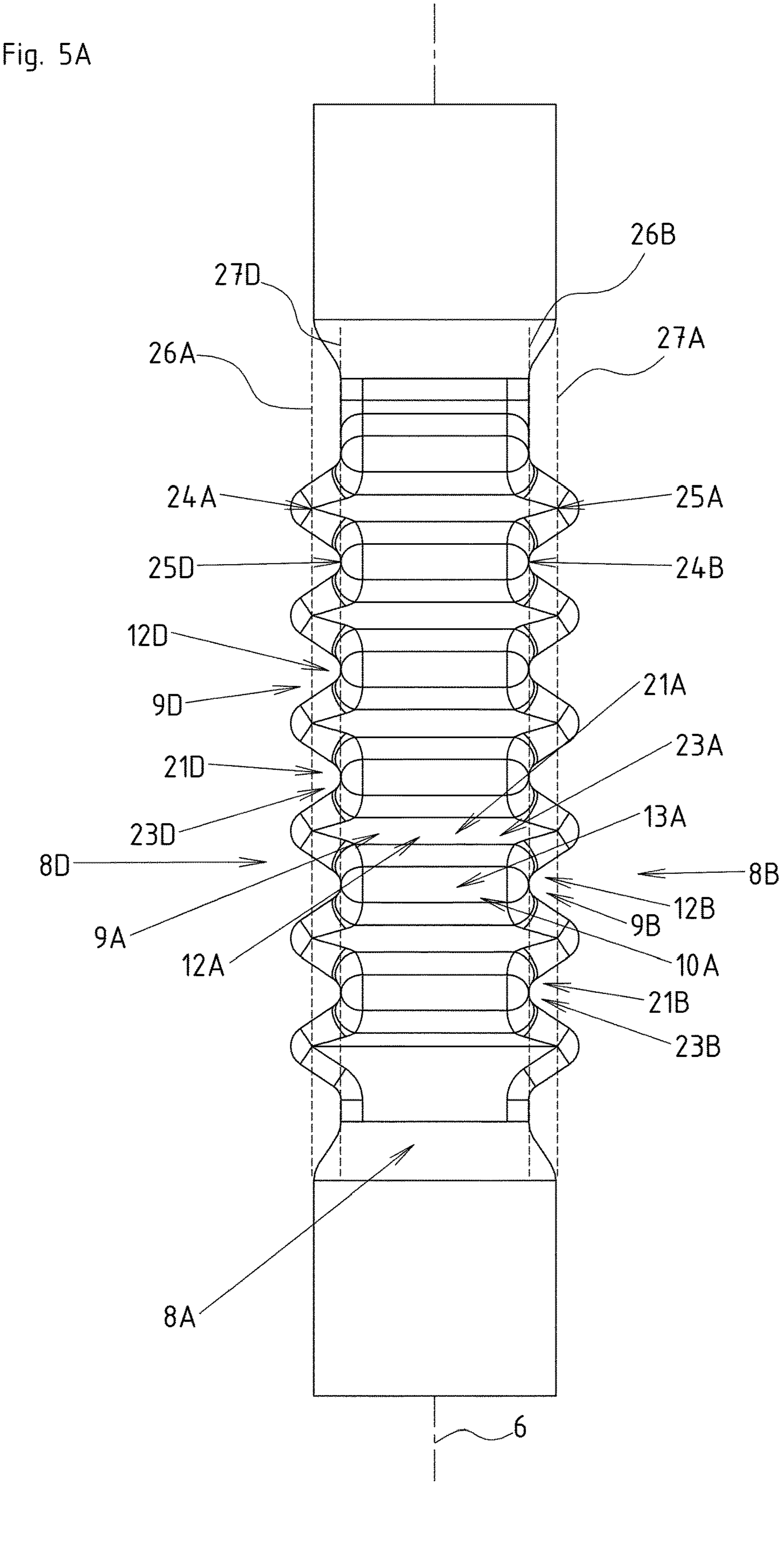
Figure 5B:
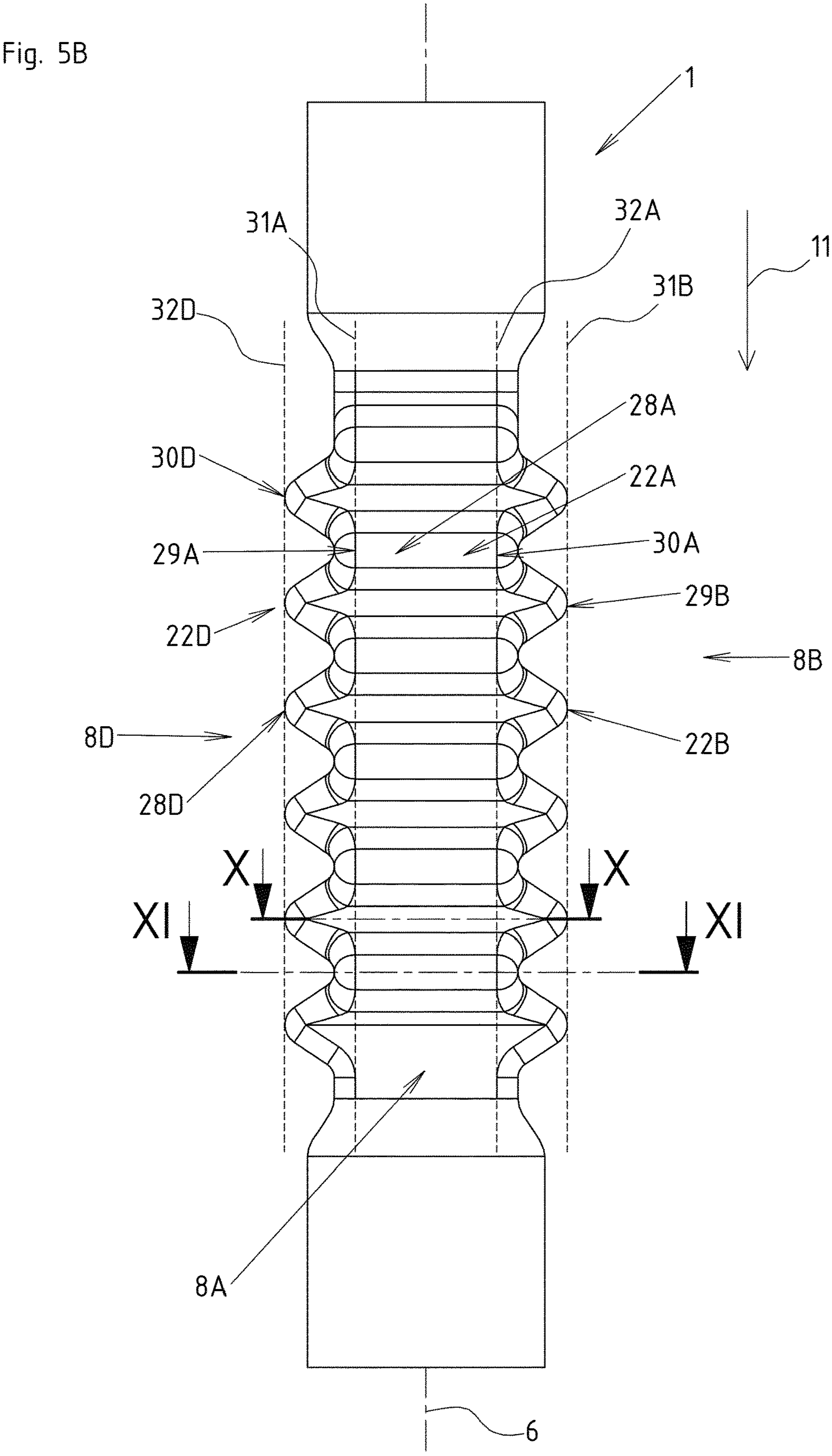
Figure 6A:
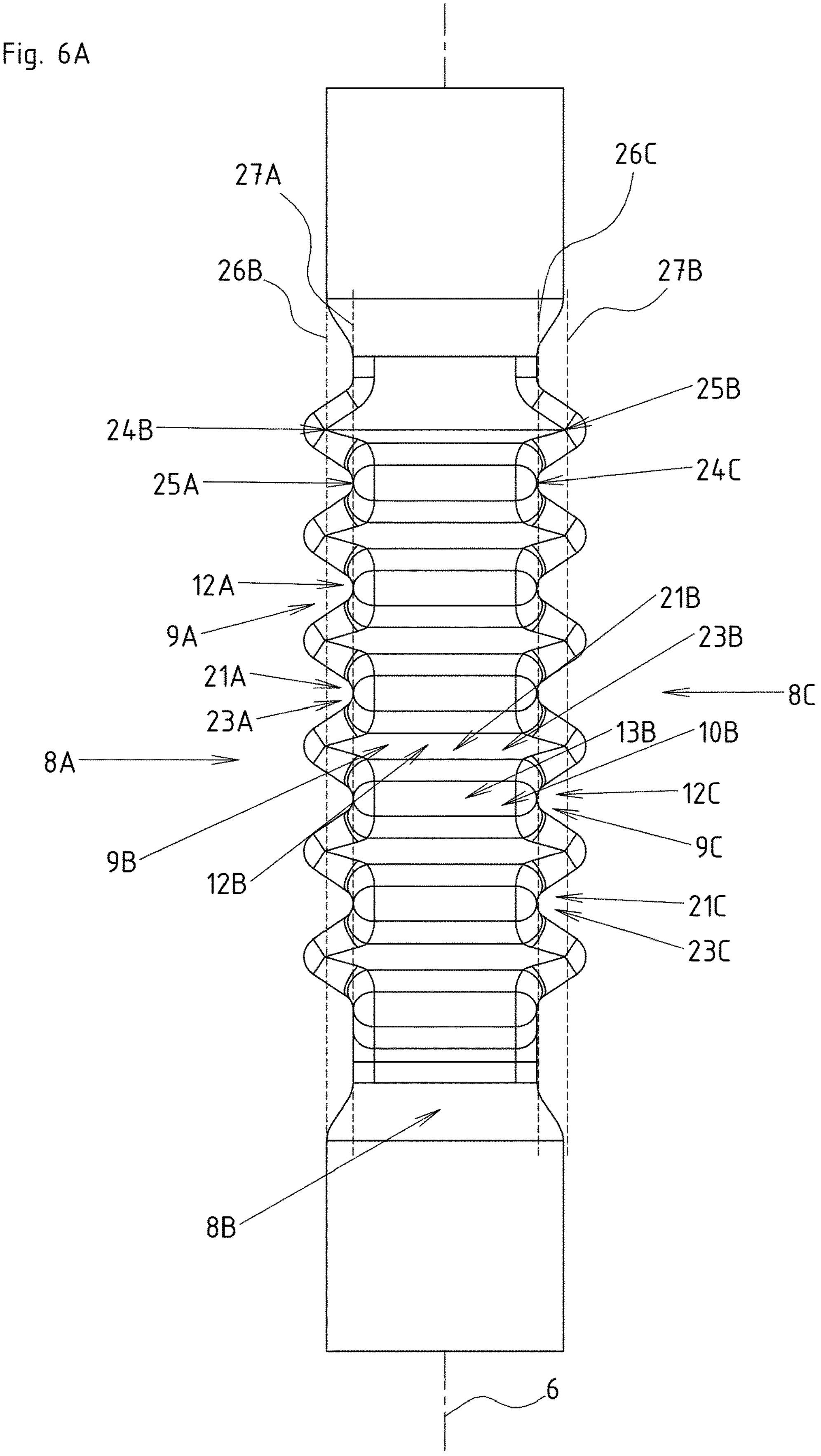
Figure 6B:
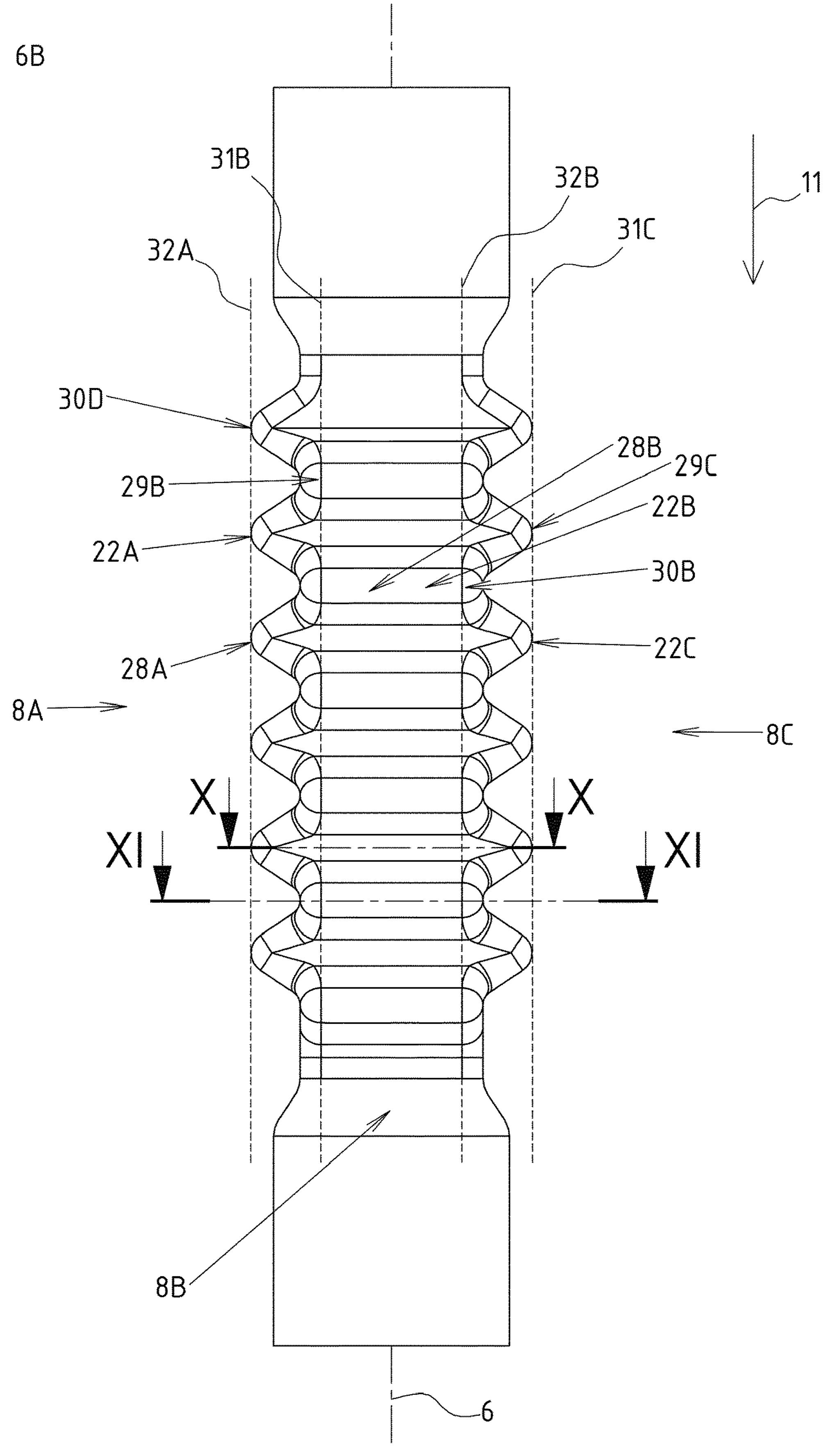
Figure 7A:
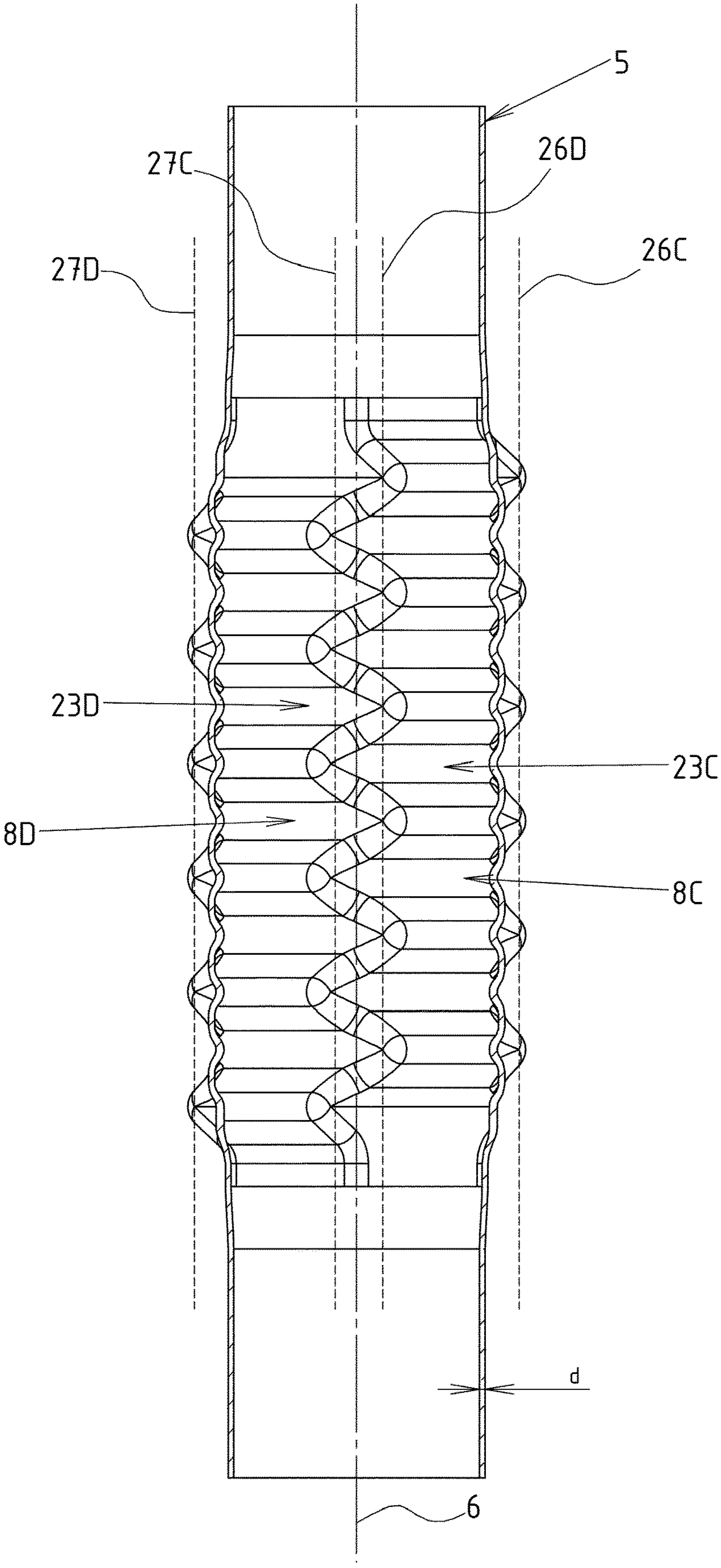
Figure 7B:
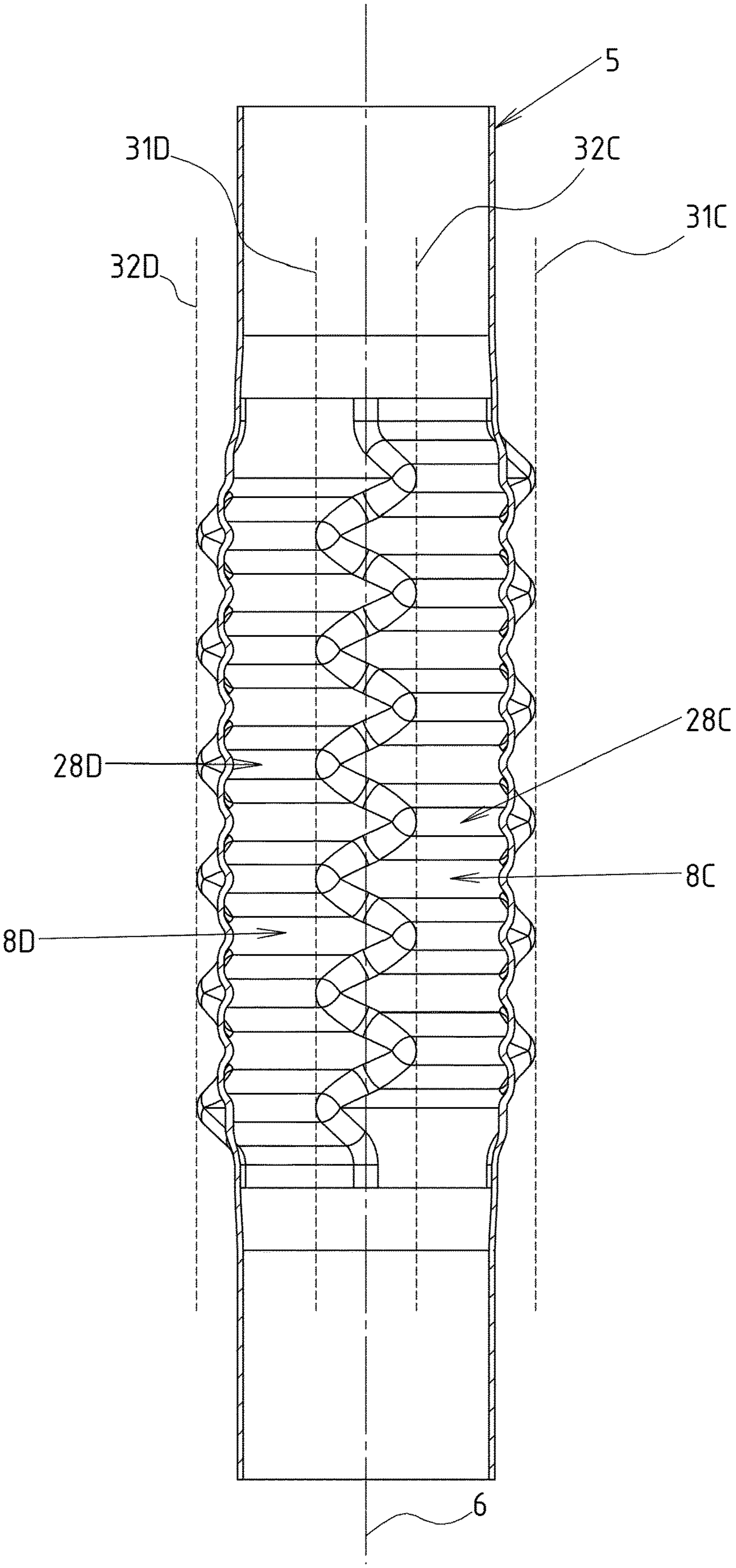
Figure 19A:
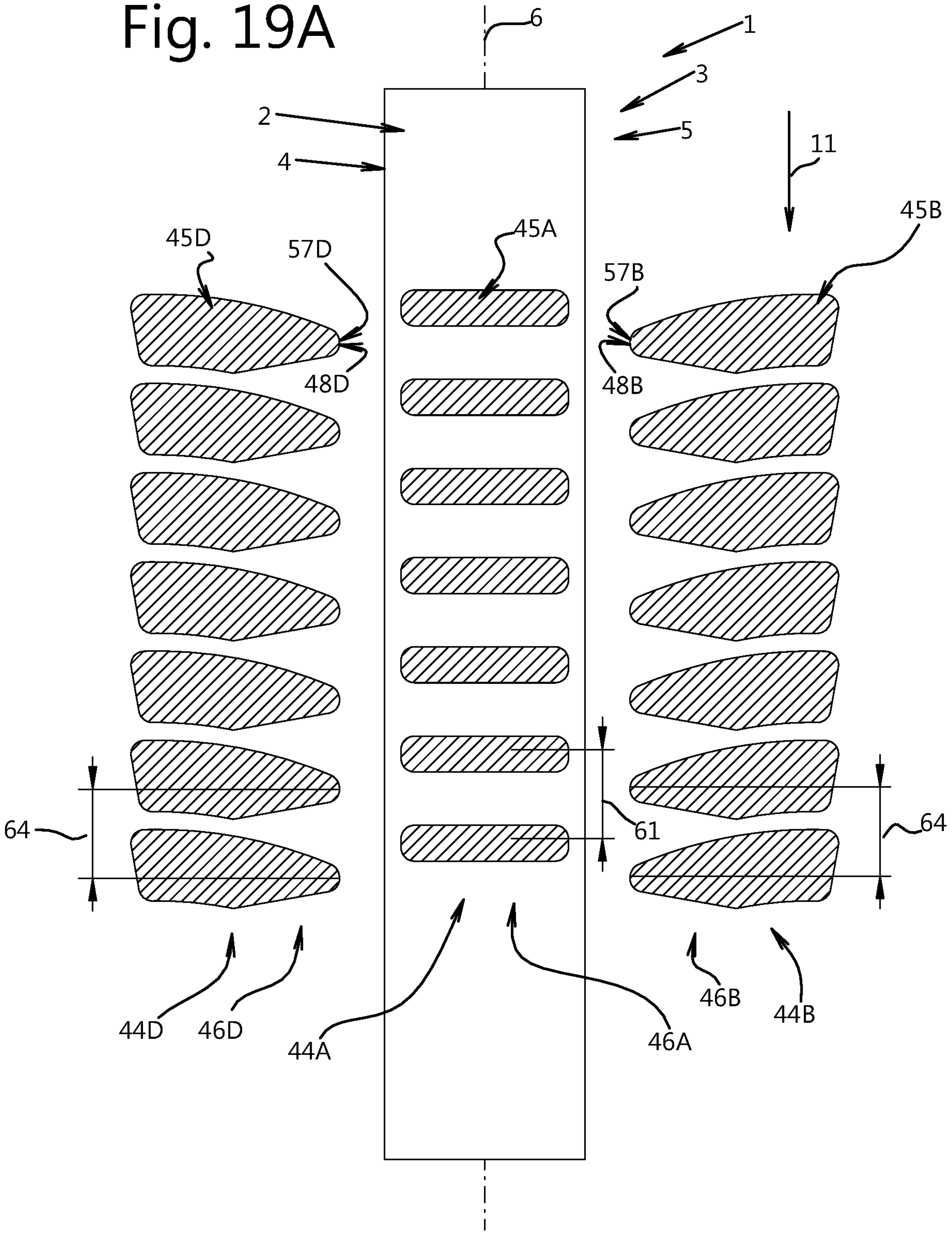
Figure 20A:
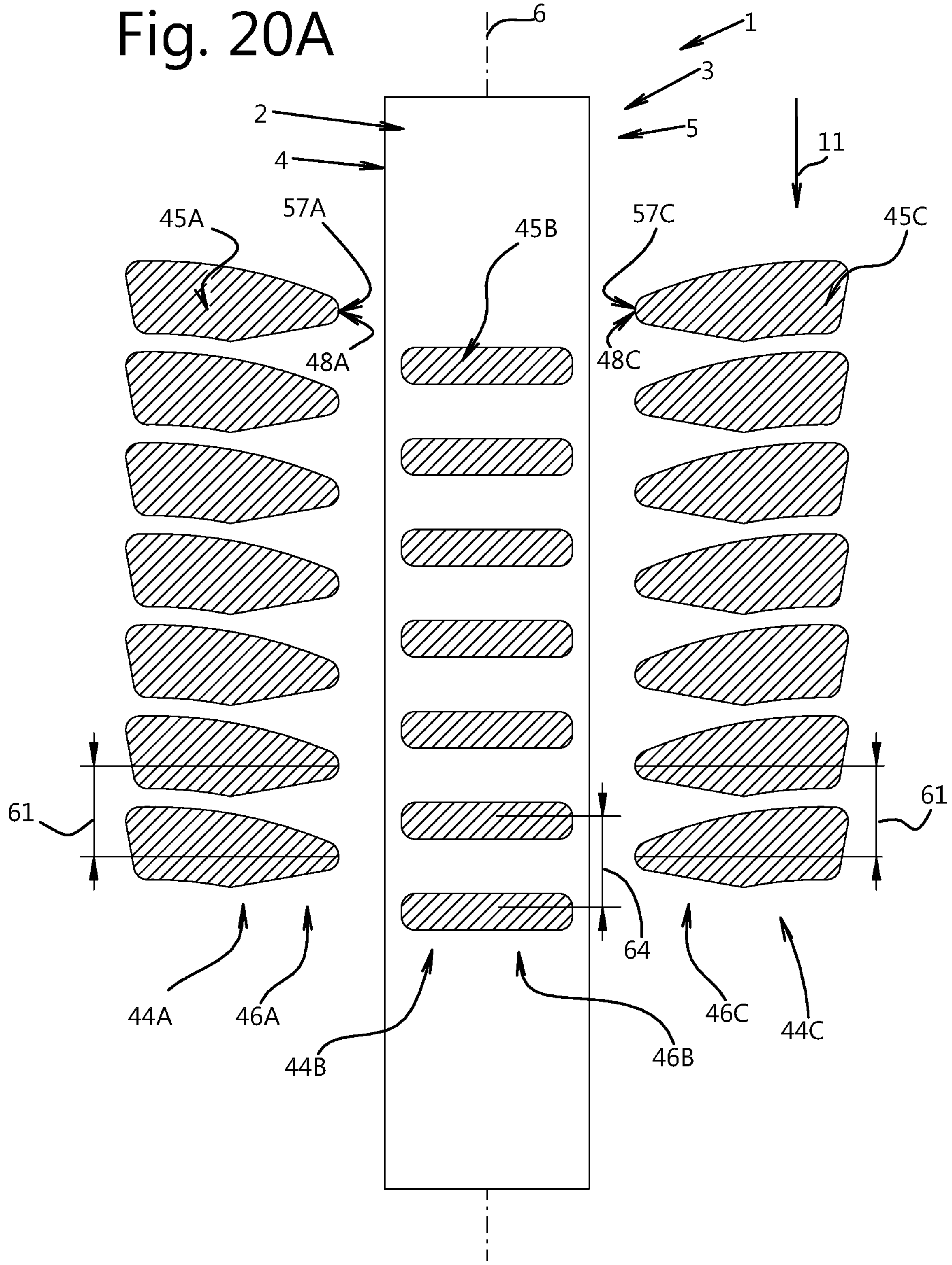
Figure 21:
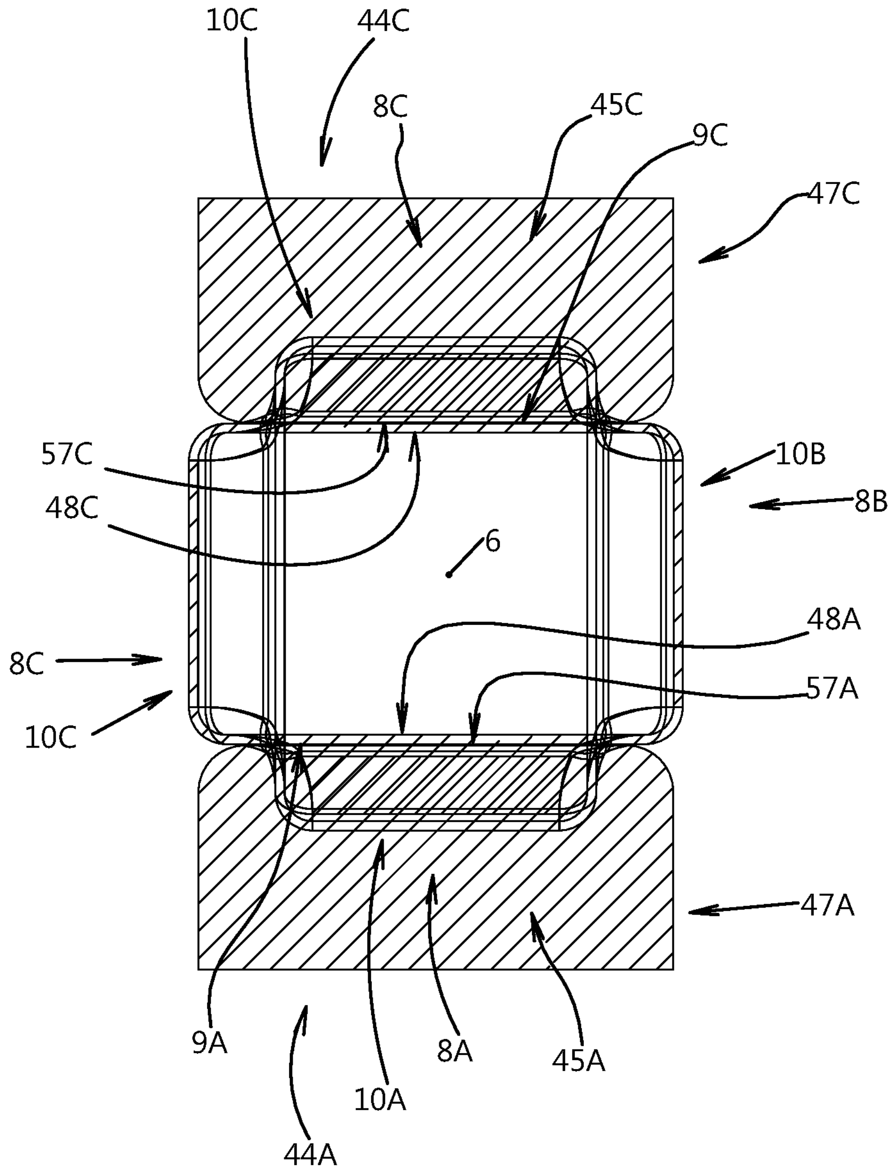
Figure 22:
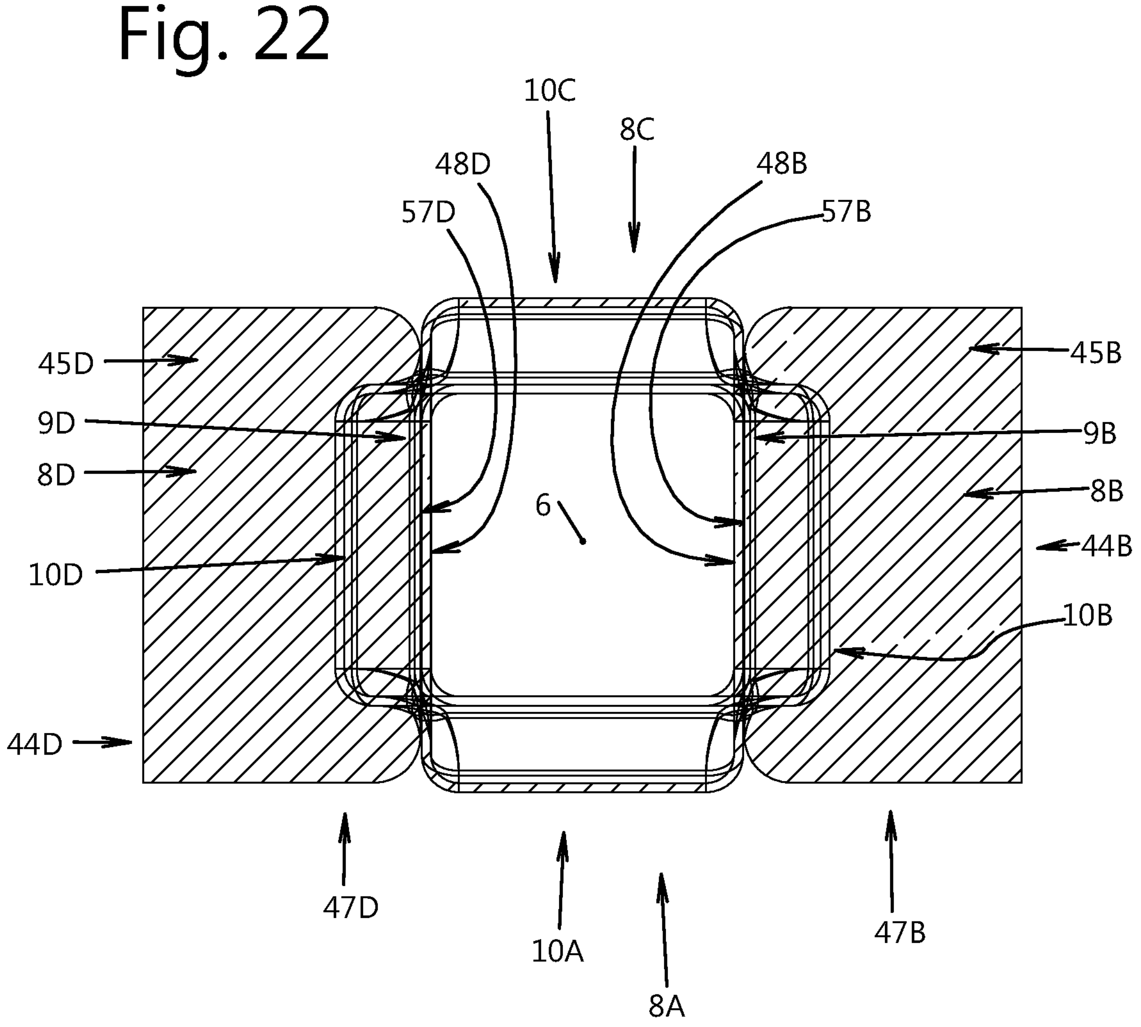

The FIGS. 19A, B show a first embodiment of the method according to invention to produce the straw 1 of FIG. 1 in the side view of the FIGS. 5A, B. The FIGS. 20A, B show the first embodiment of the method in the side view of the FIGS. 6A, B. FIG. 21 shows a view in cross-section perpendicular to the central axis 6 and along line XXI-XXI of FIG. 19B. FIG. 22 shows a view in cross-section perpendicular to the central axis 6 and along line XXII-XXII of FIG. 19B.

The method comprises the step of providing the tubular body 3 made from paper 2 or paper-like material and having the circumference 4 formed by the wall 5 surrounding the central axis 6.

At least two series 44A-D of push members 45A-D are positioned along the tubular body 3. More specifically, four series 44A-D of push members 45A-D are positioned along the tubular body 3.

Each of the at least two series 44A-D of push member 45A-D comprises multiple push members 45A-D being spaced from each other in axial direction 11 along the central axis 6 of the tubular body 3.

Figure 19B:
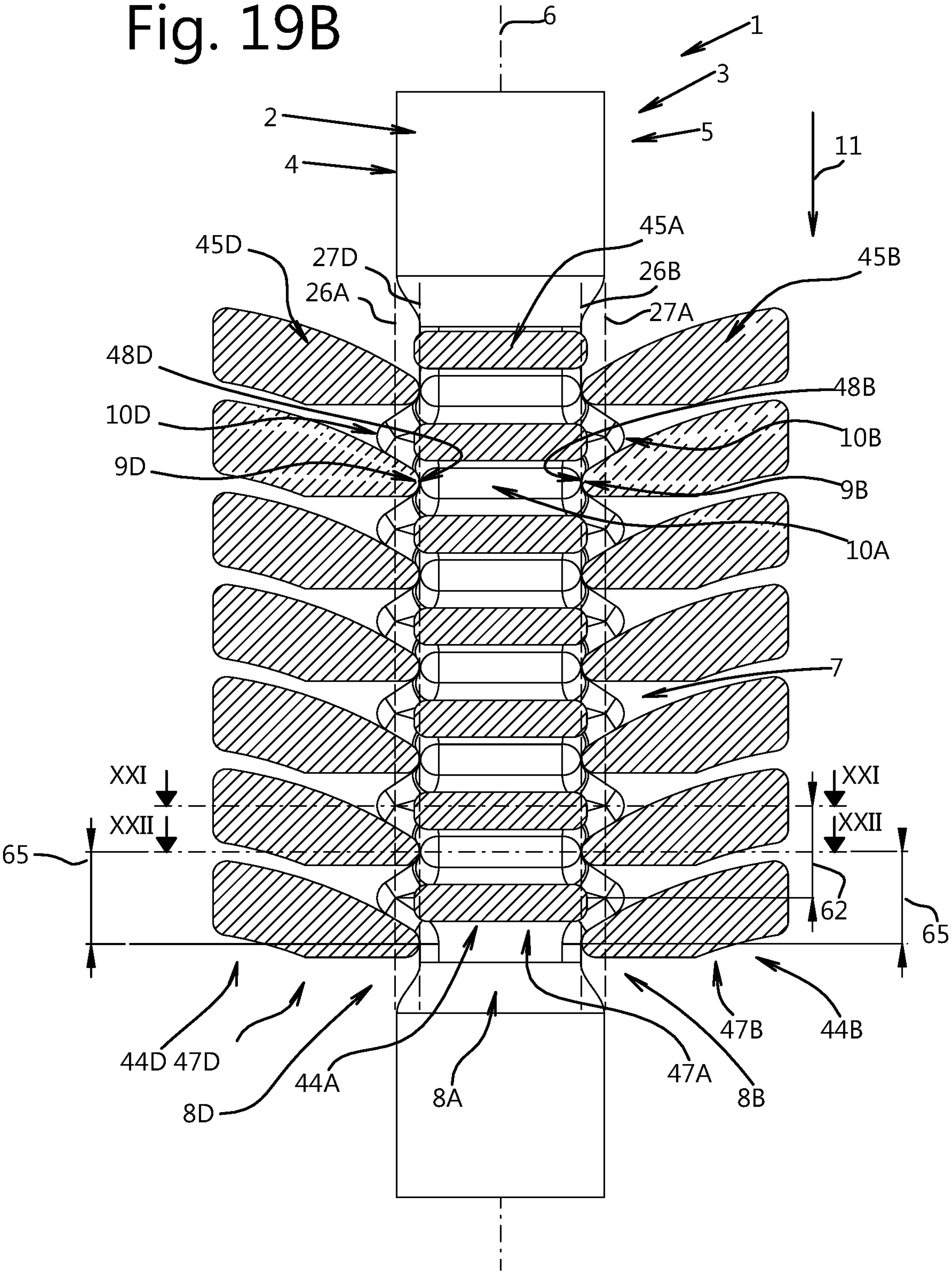
Figure 20B:
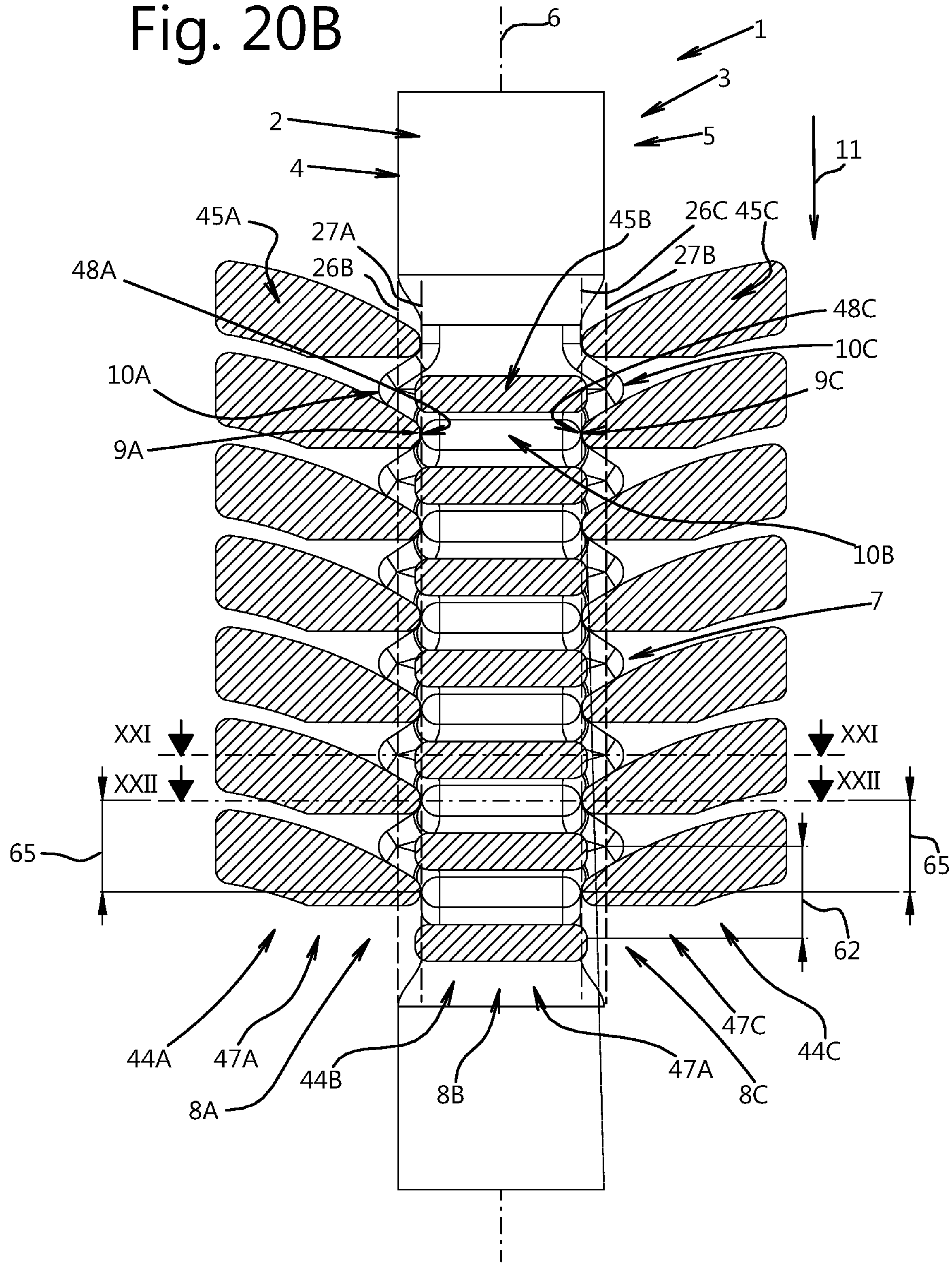

Each push member 45A-D is movable from a first member position 46A-D in which the push member 45A-D is spaced from the circumference 4 of the tubular body 3 (see the FIGS. 19A and 20A) into a second member position 47A-D located closer to the central axis 6 to push a contact part 48A-D of the circumference 4 of the tubular body 3 coming in contact with the push member 45A-D towards the central axis 6 in order to form an inward corrugation 9A-D extending along only part of the circumference 4 of the tubular body 3 (see the FIGS. 19B and 20B). Said first member position 46A-D and second member position 47A-D are also indicated in the FIGS. 23A,B and 24A,B.

The push members 45A-D positioned in the first member position 46A-D are located at a first radial distance 91A-D from the central axis 6. The push members 45A-D positioned in the second member position 47A-D are located at a second radial distance 92A-D from the central axis 6. The second radial distance 92A-D is smaller than the first radial distance 91A-D. In the shown method, the first radial distance 91A-D of the at least two series of push members 45A-D are the same and the second radial distance 92A-D of the at least two series of push members 45A-D are the same. In other examples of the method according to the invention, the first radial distance 91A-D of the at least two series of push members 45A-D differ from each other and/or the second radial distance 92A-D of the at least two series of push members 45A-D differ from each other.

At least one 44A,C of the at least two series 44A-D of push members 45A-D is positioned in view of the tubular body 3 circumferentially offset relative to at least one other 44B,D of the at least two series 44A-D of push members 45A-D. Said at least one 44A,C of the at least two series 44A-D of push members 45A-D comprises push members 45A,C which are located between two push members 45B,D of said at least one other 44B,D of the at least two series 44A-D of push members 45A-D when seen in axial direction 11 along the central axis 6 of the tubular body 3.

The method comprises moving the push members 45A-D of the at least two series 44A-D of push members 45A-D from the first member position 46A-D into the second member position 47A-D to form with each series 44 A-D of push members 45A-D inward corrugations 9A-D being positioned one after the other in axial direction 11 along the central axis 6 and moving the inward corrugations 9A-D of each of the at least two series 44A-D of push members 45A-D closer to each other in axial direction 11 along the central axis 6 to form outward corrugations 10A-D extending along only part of the circumference 4 of the tubular body 3 between subsequent inward corrugations 9A-D, thereby providing the bendable part 7 to the tubular body 3.

The bendable part 7 comprises at least two corrugated profiles 8A-D provided in the wall 5. Each corrugated profile 8A-D comprises inward corrugations 9A-D and outward corrugations 10A-D being positioned one after the other in axial direction 11 along the central axis 6.

Figure 23A:
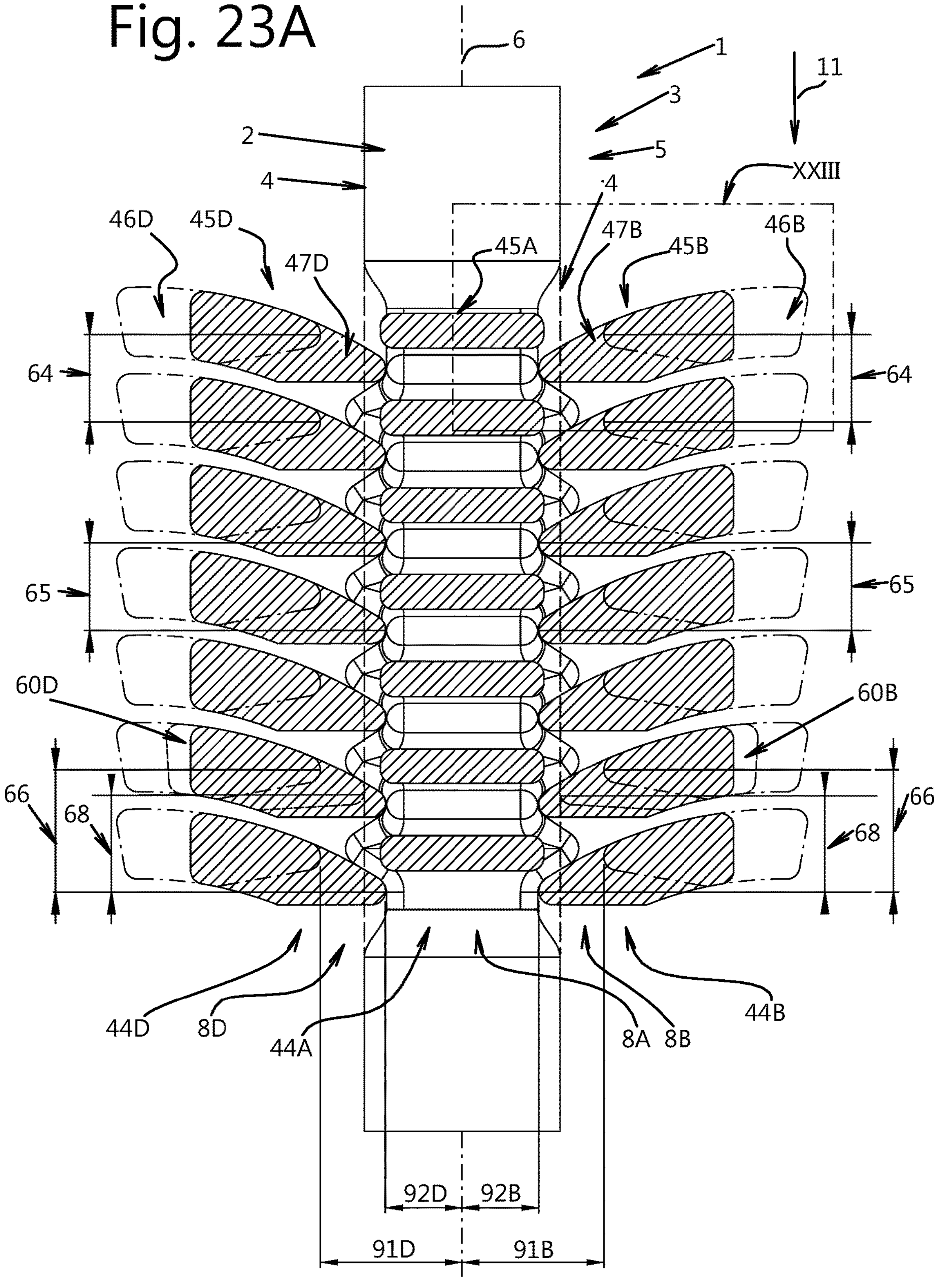

The method comprises fixating a fixated part 50 of the tubular body 3 such that the tubular body 3 comprises a non-fixated part 51 having a free end 52, positioning the at least two series 44A-D of push members 45A-D along the non-fixated part 51 of the tubular body 3, and moving the push members 45A-D being moved from the first member position 46A-D into the second member position 47A-D also in axial direction 11 along the central axis 6 towards the fixated part 50 of the tubular body 3 in order to form the outward corrugations 10A-D (see the FIGS. 23A,B and 24A,B).

Figure 25A:
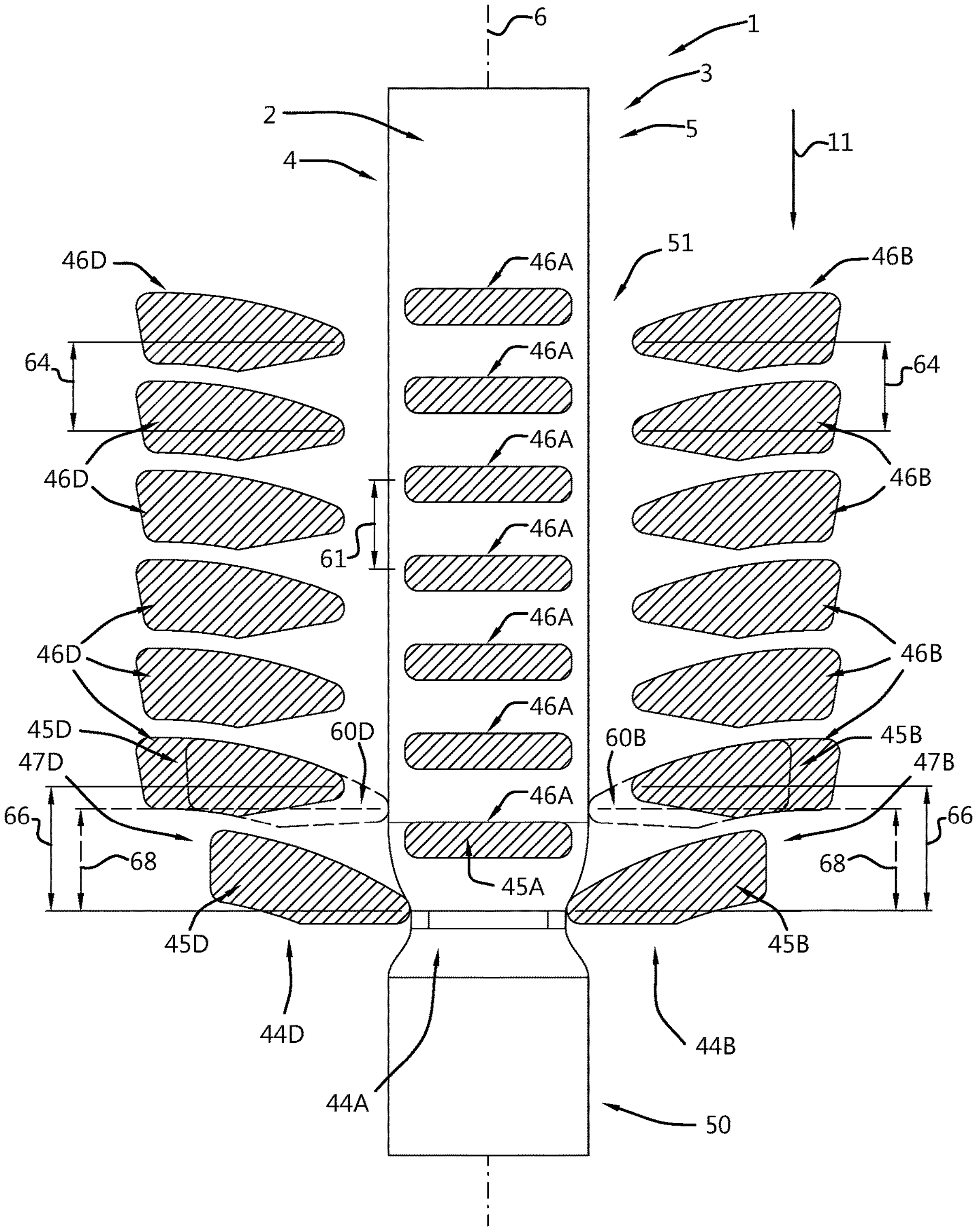
Figure 25B:
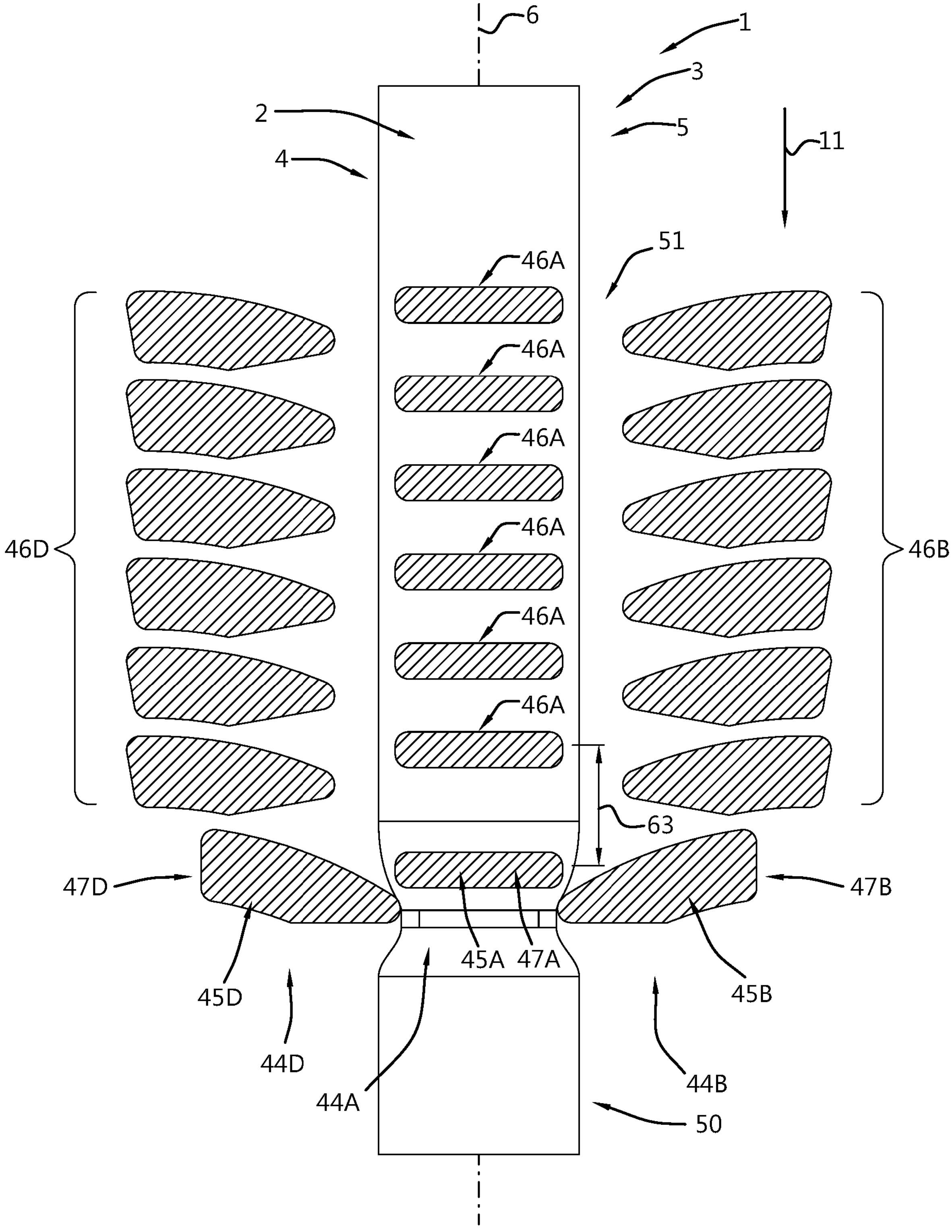
Figure 25C:
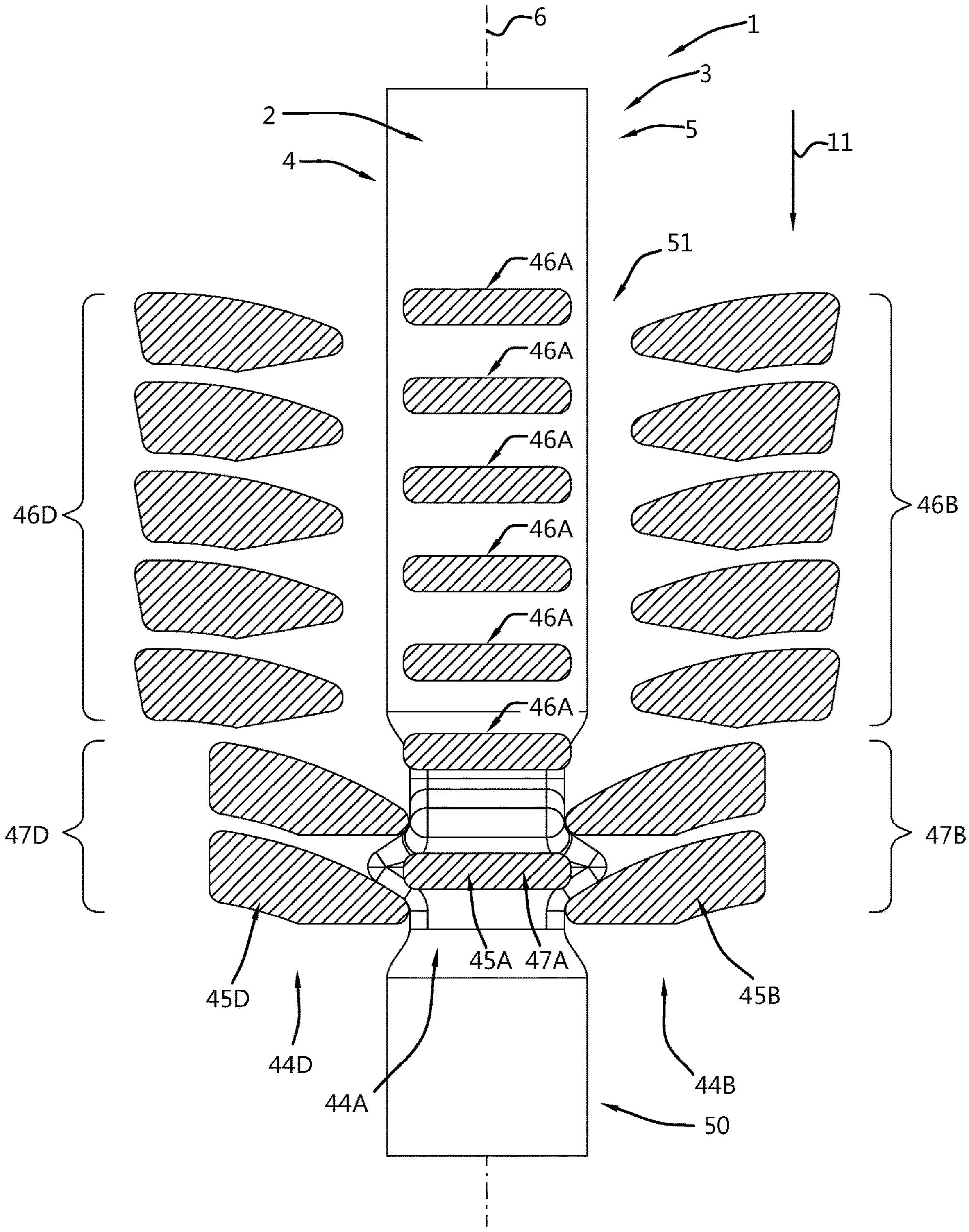
Figure 25D:
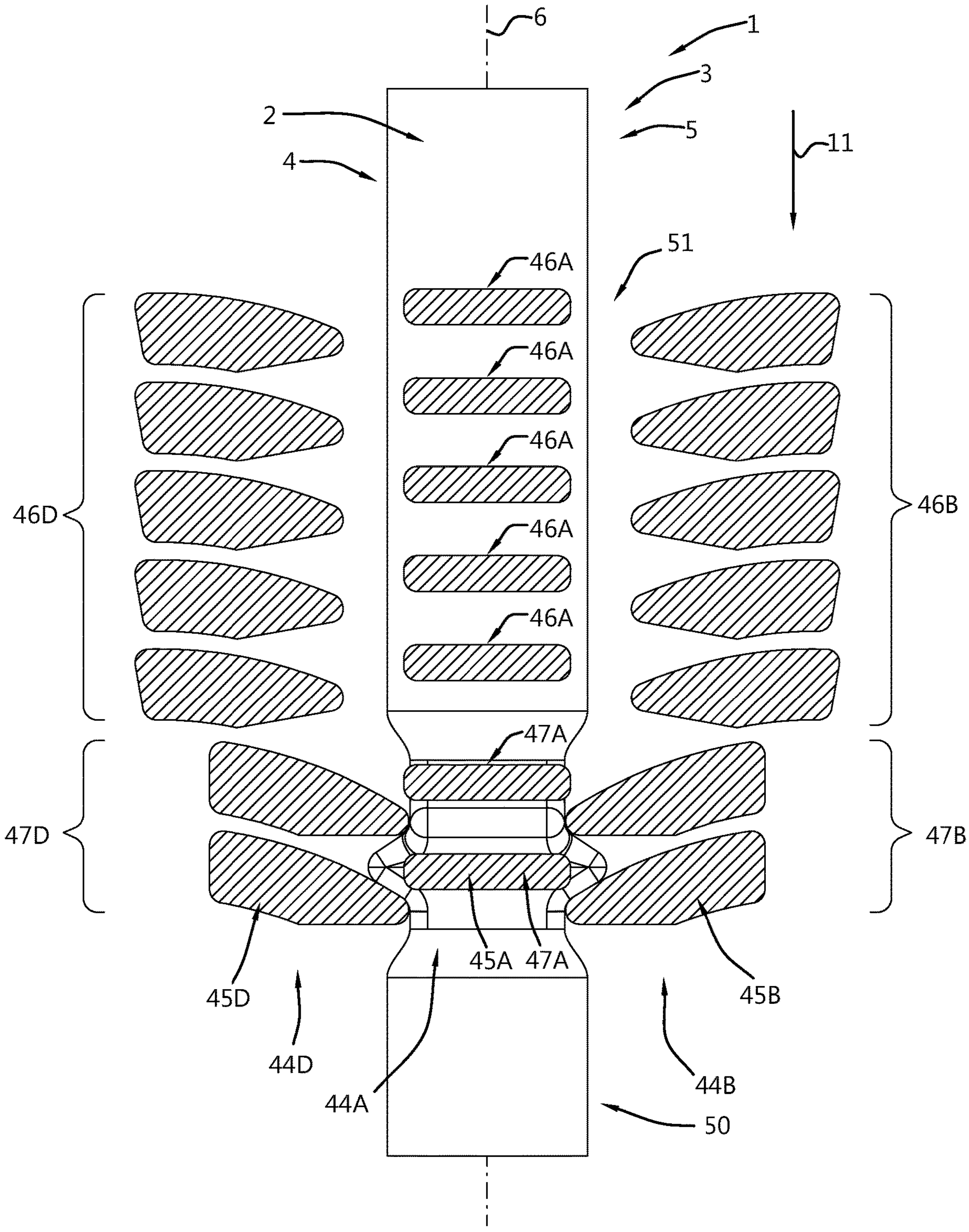
Figure 25E:
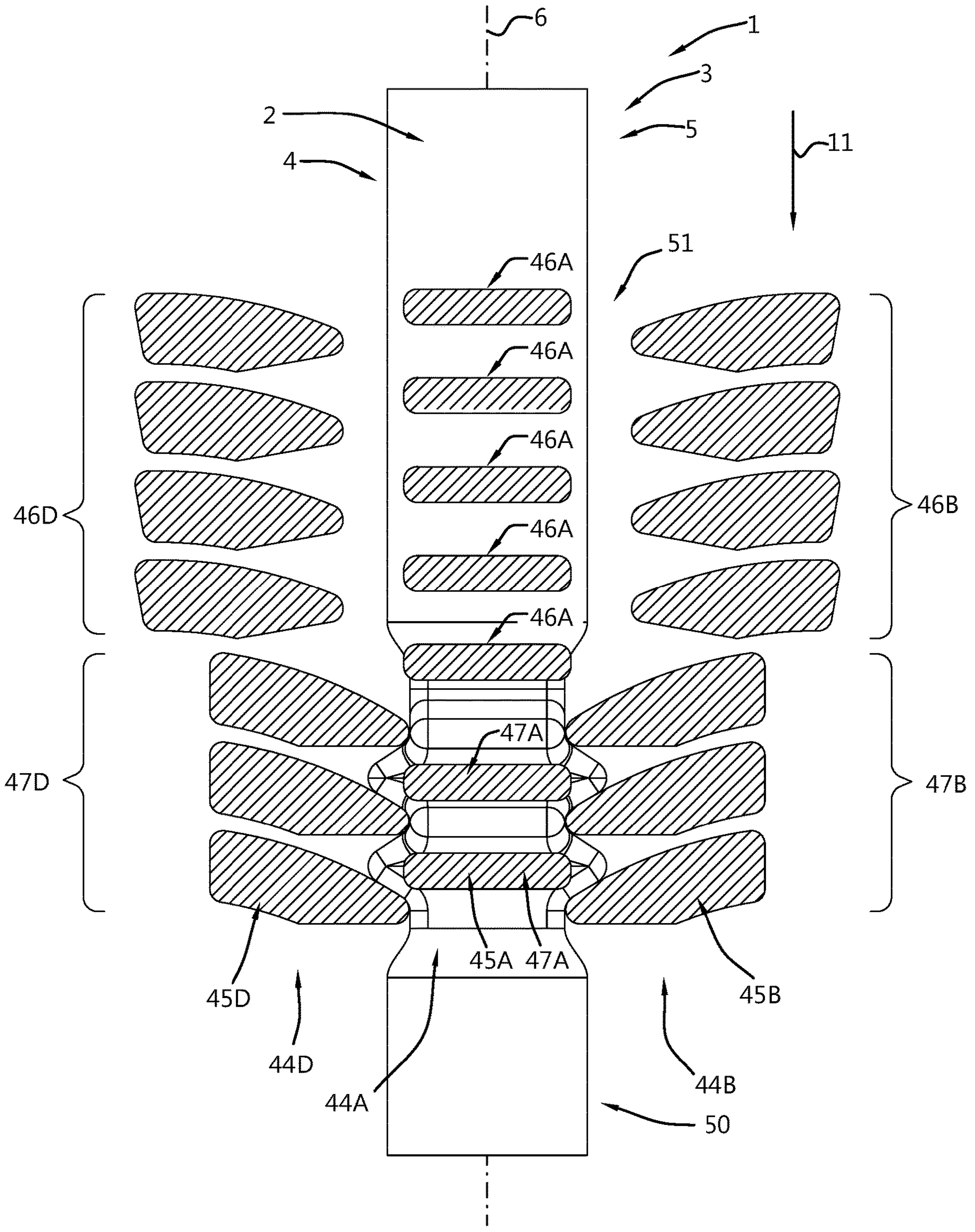
Figure 25F:
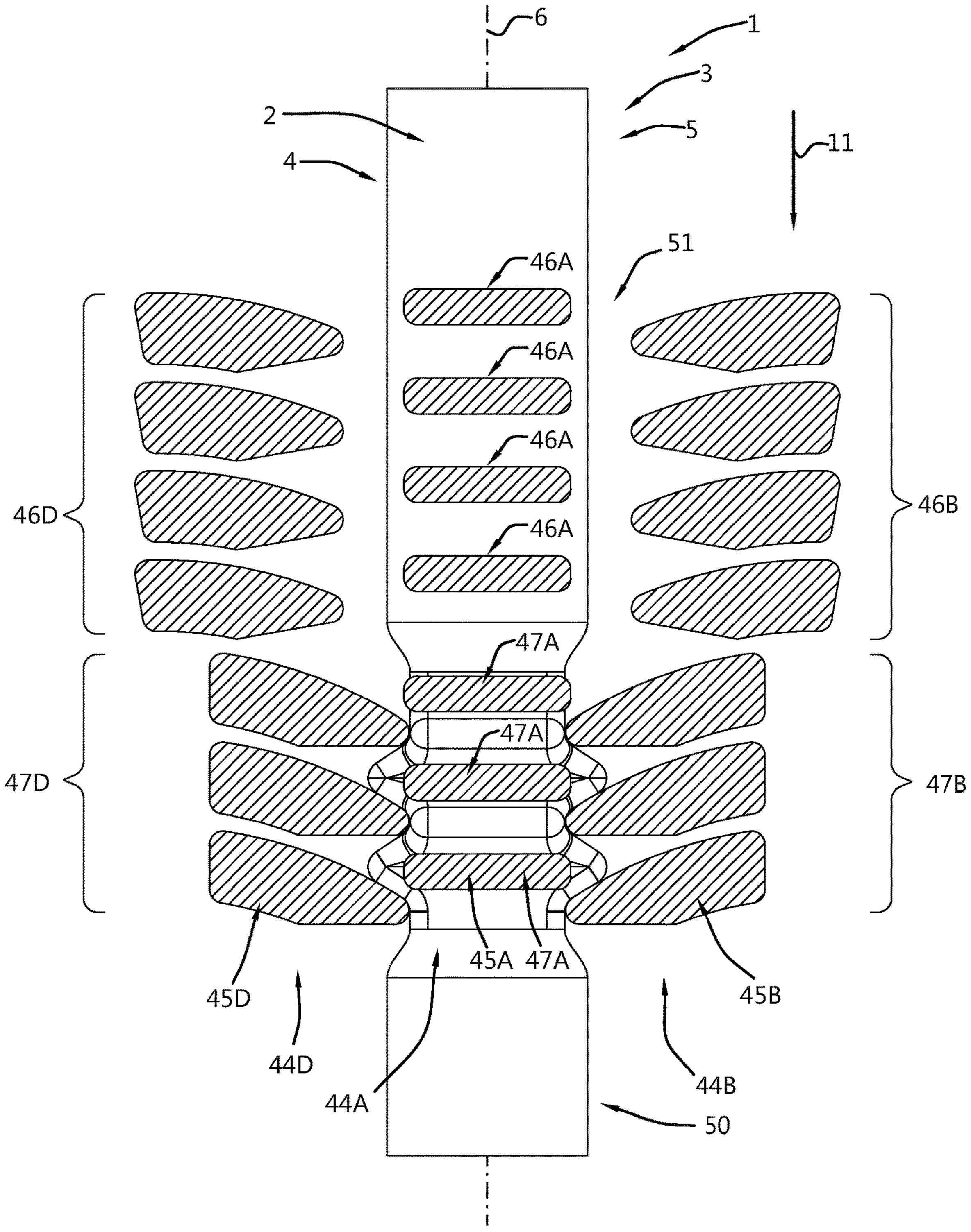
Figure 25G:
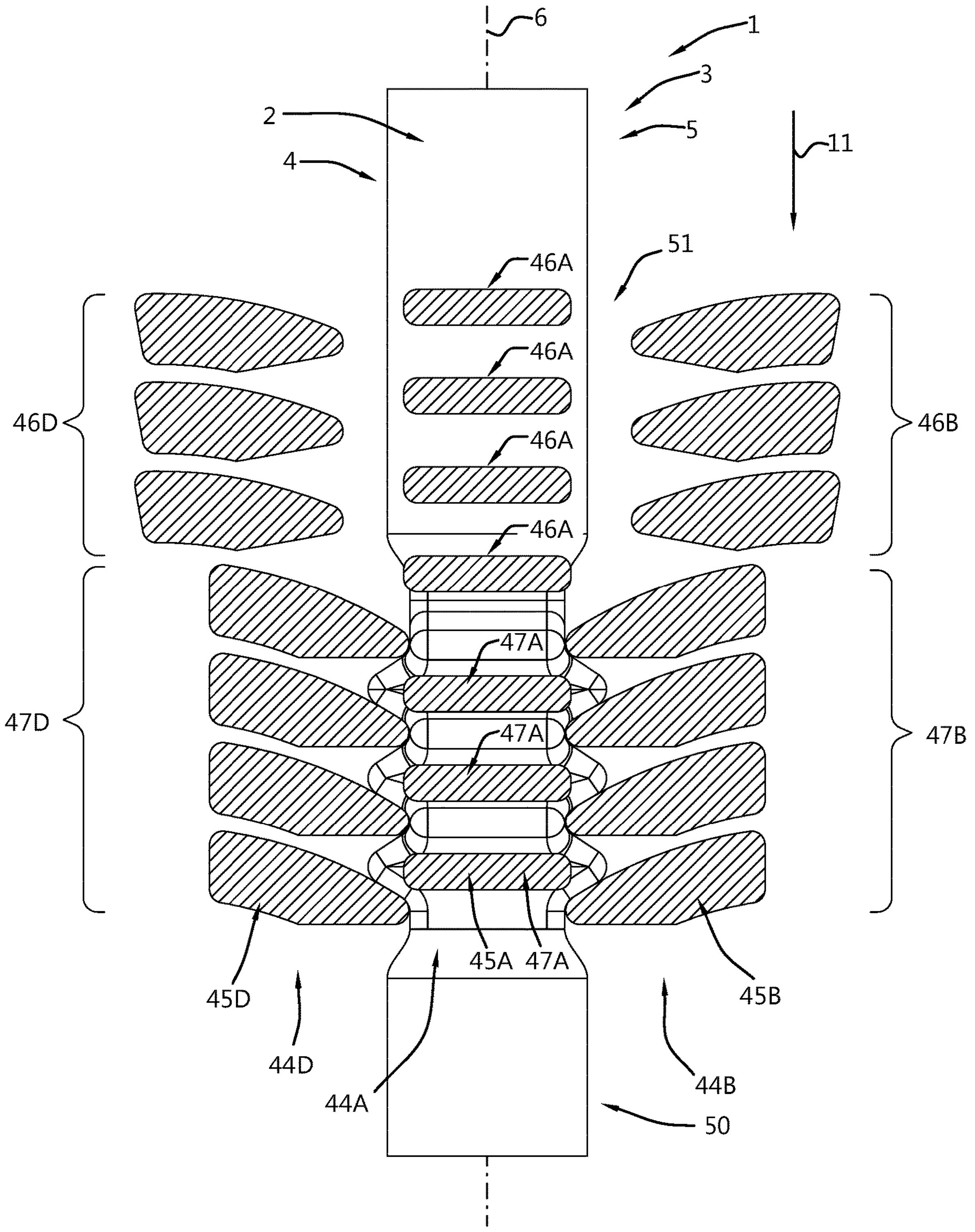
Figure 25H:
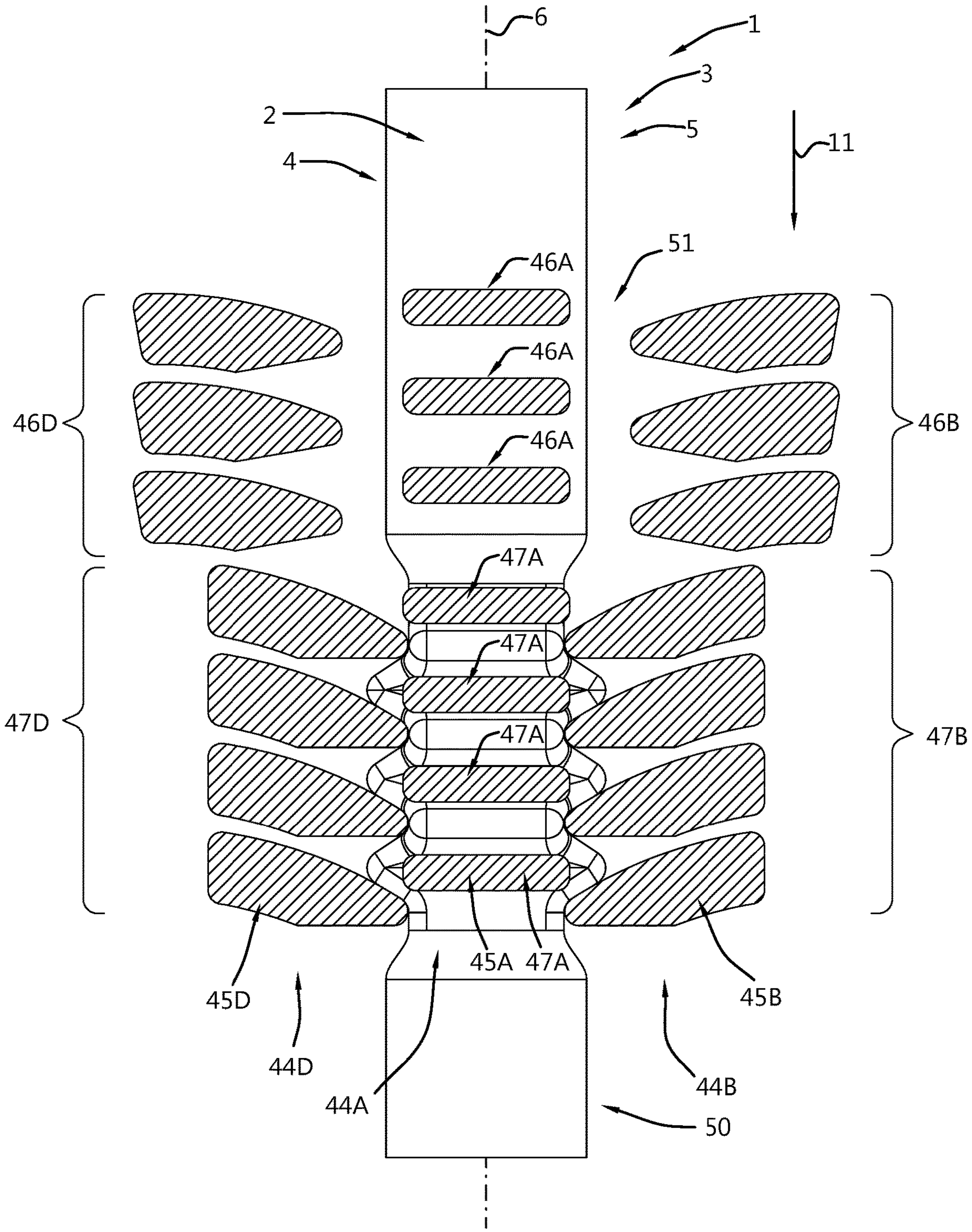
Figure 25I:
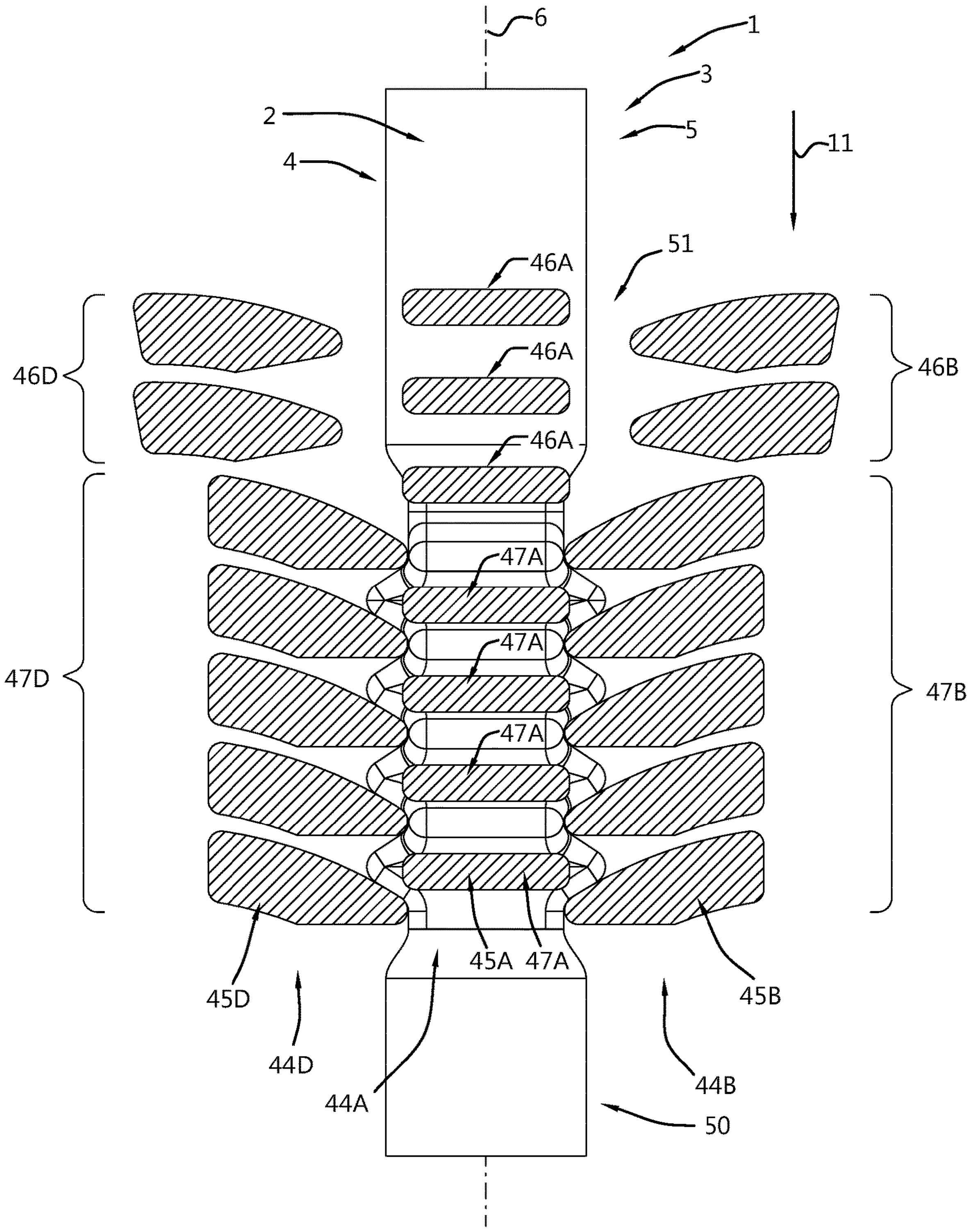
Figure 25J:
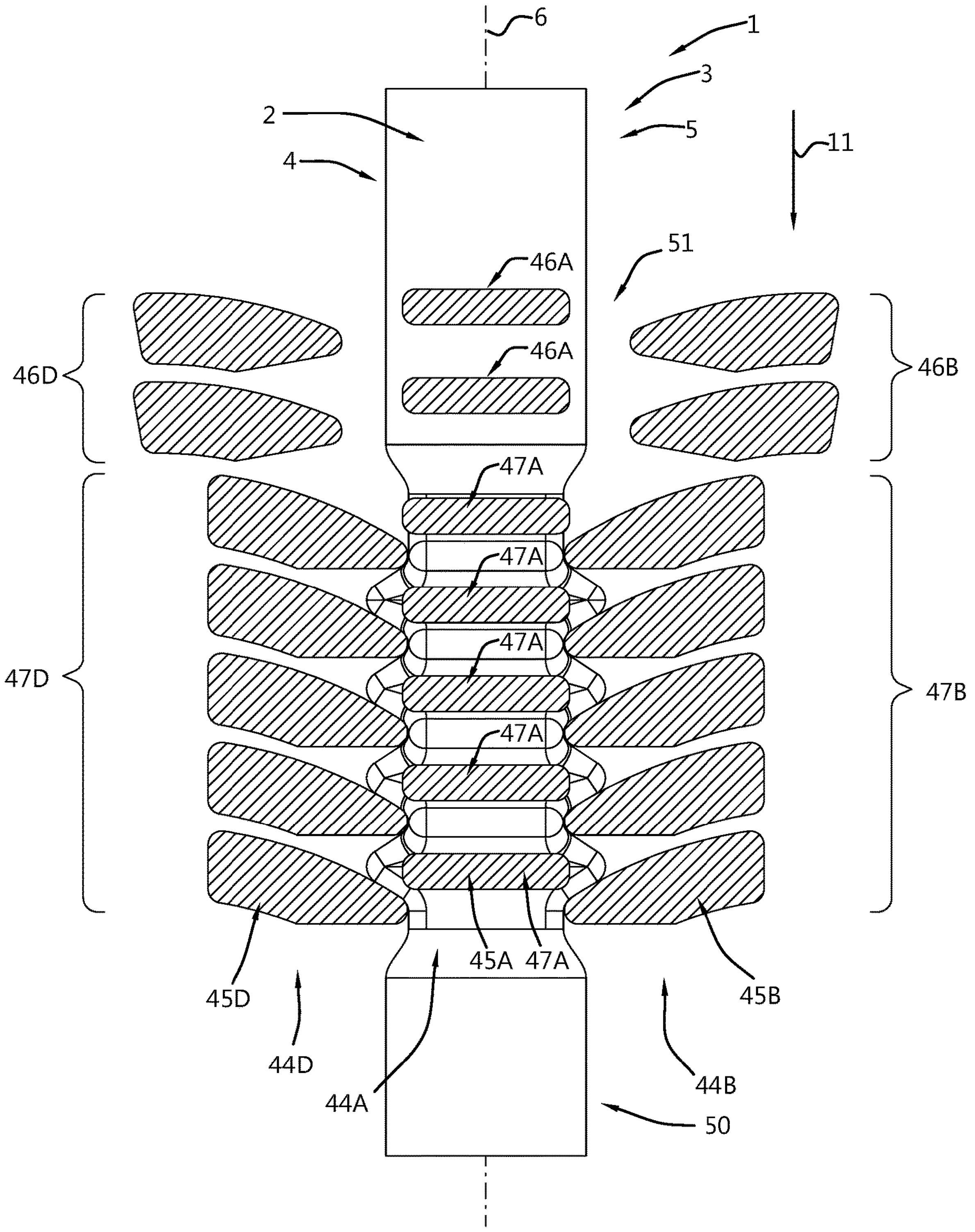
Figure 25K:
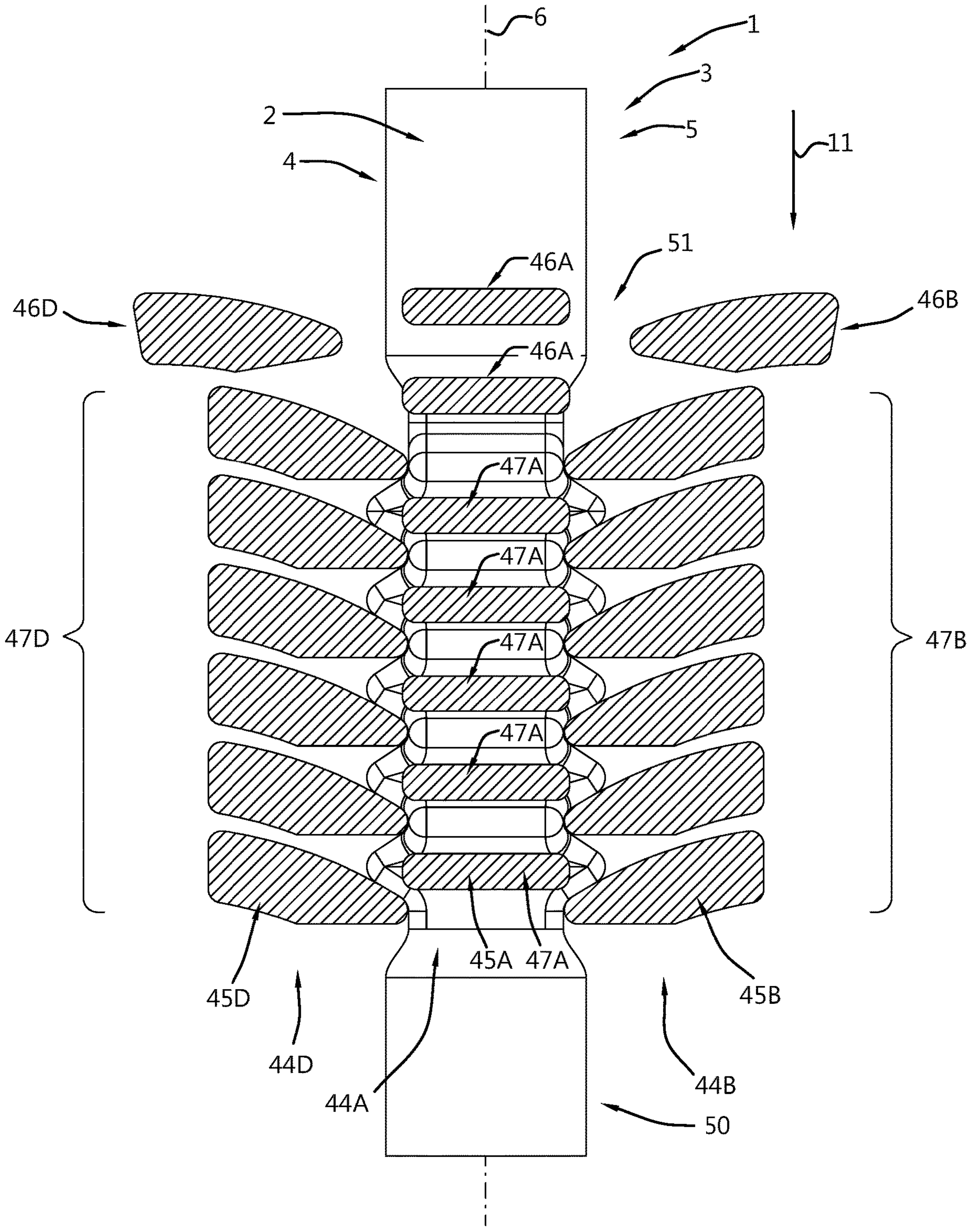
Figure 25L:
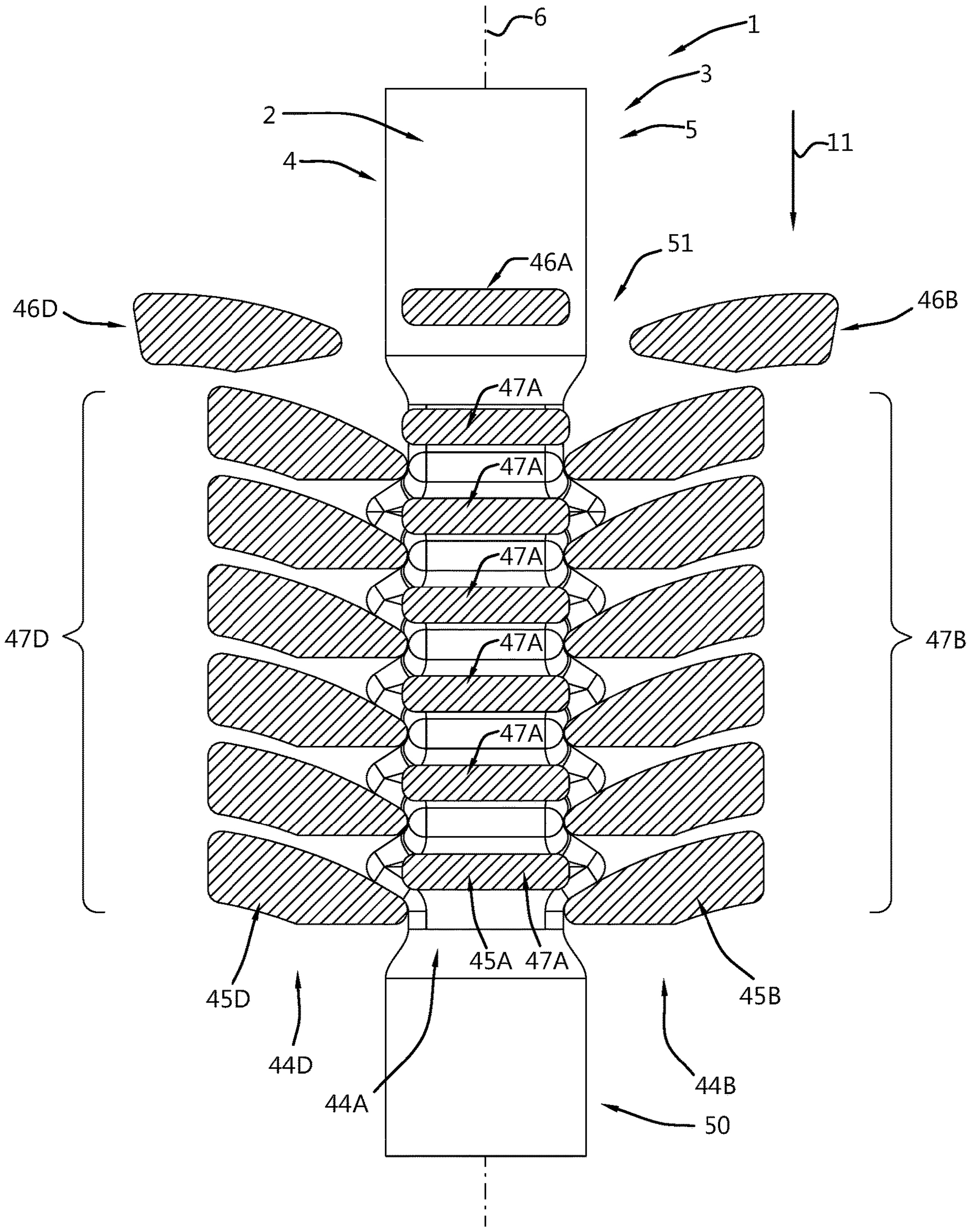
Figure 25M:
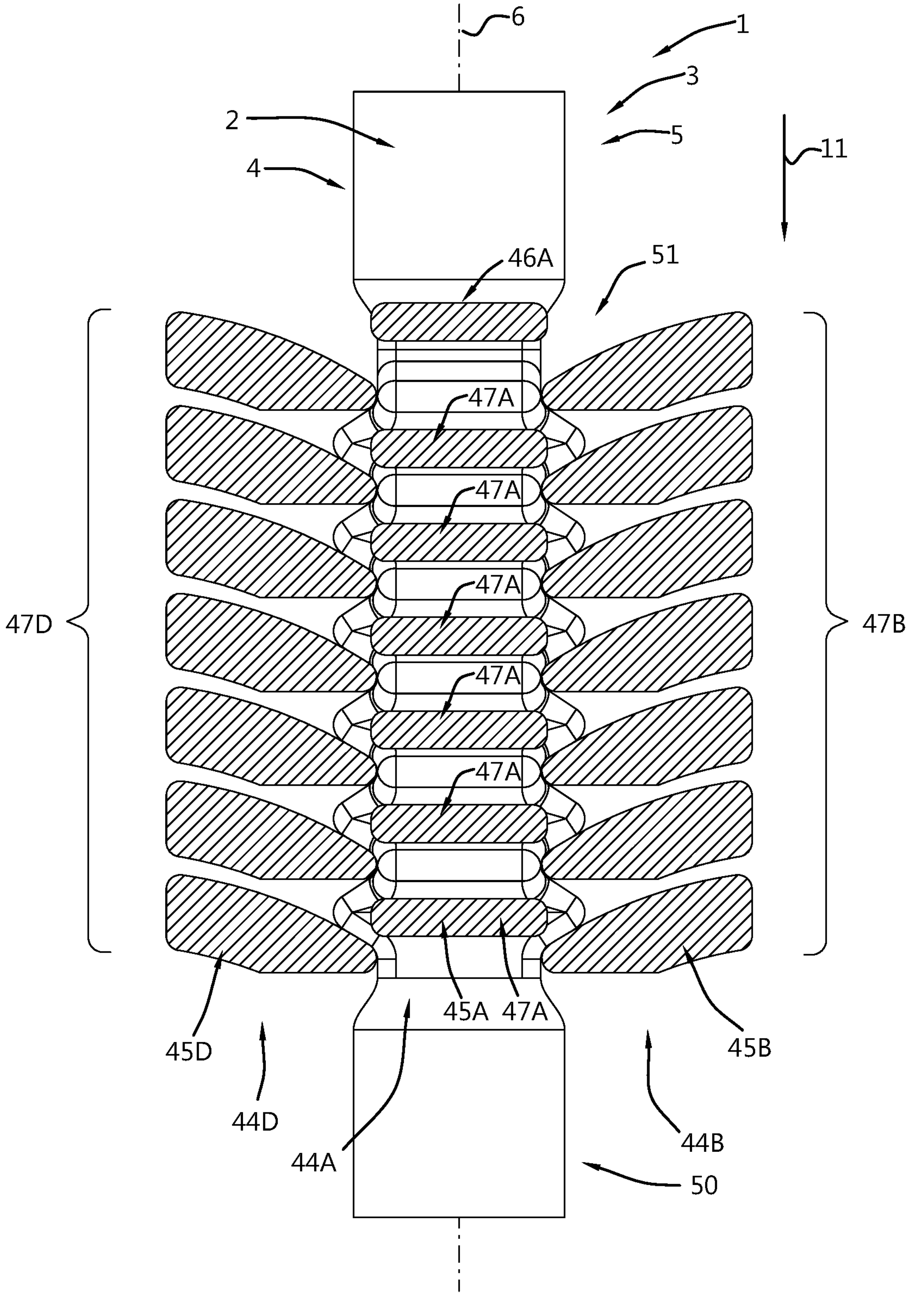
Figure 25N:
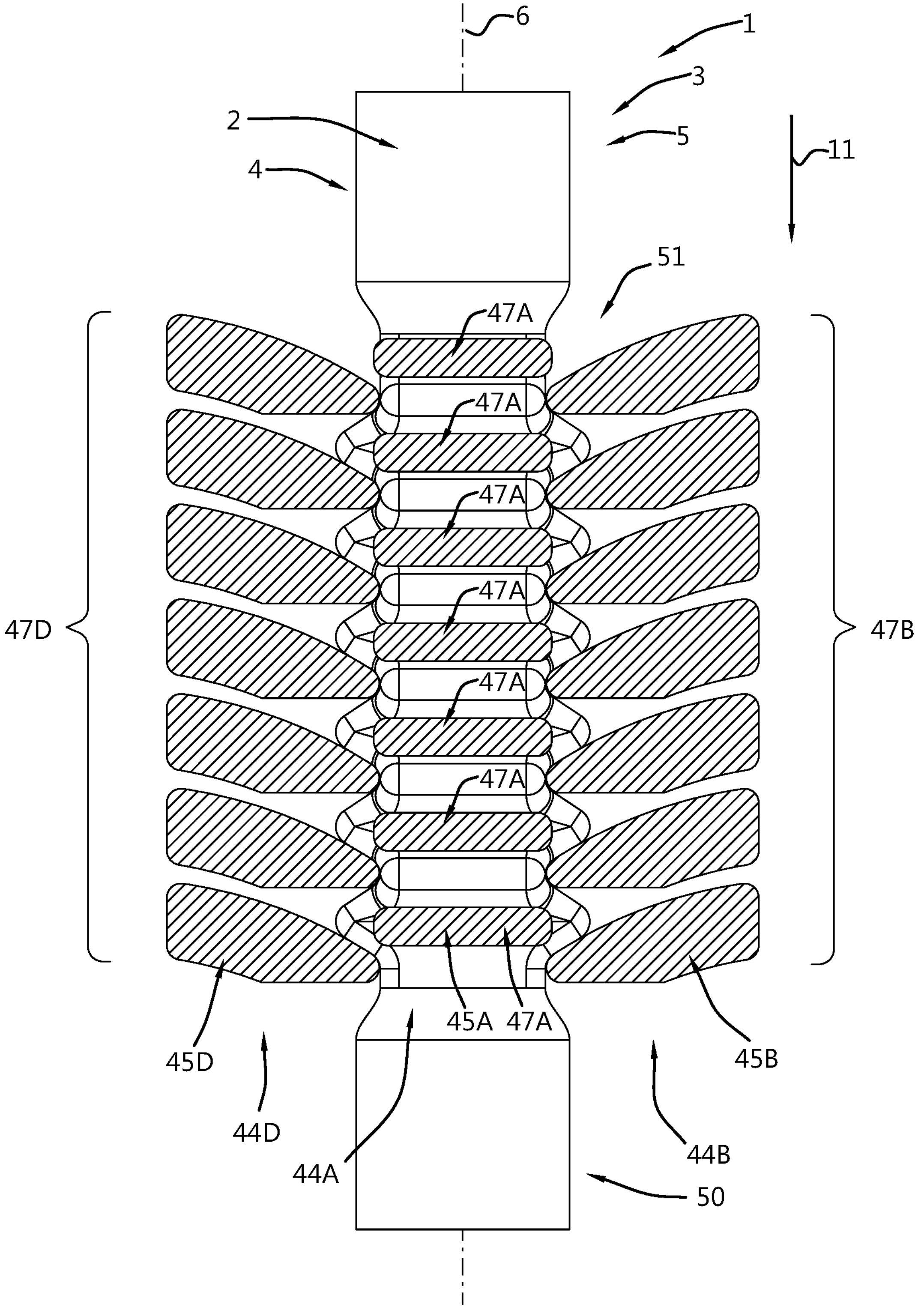

The method comprises, when seen in axial direction 11 along the central axis 6, moving subsequent push members 45A-D one after the other from the first member position 46A-D towards the second member position 47A-D and starting with the push members 45B,D nearest to the fixated part 50 of the tubular body 3. This applies to all the push members 45A-D of the least two series 44A-D of push members 45A-D. This is depicted in the FIGS. 25A-N showing the subsequent steps of the method.

The method comprises, for each of the at least two series 44A-D of push members 45A-D, bringing the subsequent push members 4A-D into contact with the circumference 4 of the tubular body 3 when or after a respective previous push member 45A-D has reached the second member position 47A-D.

The method comprises:

- placing the push members 45A,C of each of said at least one 44A,C of the at least two series 44A-D of push members 45A-D at a first axial member distance 61 from each other in axial direction 11 along the central axis 6 when said push members 45A,C are positioned in the first member position 46A,C,
- placing the push members 45A,C of each of said at least one 44A,C of the at least two series 44A-D of push members 45A-D at a second axial member distance 62 from each other in axial direction 11 along the central axis 6 when said push members 45A,C are positioned in the second member position 47A,C,
- placing the subsequent push member 45A,C of each of said at least one 44A,C of the at least two series 44A-D of push members 45A-D positioned in the first member position 46A,C at a third axial member distance 63 in axial direction 11 along the central axis 6 from the previous push member 45A,C positioned in the second member position 47A,C, wherein the third axial member distance 63 is larger than the second axial member distance 62,
- placing the push members 45B,D of each of said at least one other 44B,D of the at least two series 44A-D of push members 45A-D at a fourth axial member distance 64 from each other in axial direction 11 along the central axis 6 when said push members 45B,D are positioned in the first member position 46B,D,
- placing the push members 45B,D of each of said at least one other 44B,D of the at least two series 44A-D of push members 45A-D at a fifth axial member distance 65 from each other in axial direction 11 along the central axis 6 when said push members 45B,D are positioned in the second member position 47B,D, and
- placing the subsequent push member 45B,D of each of said at least one other 44B,D of the at least two series 44A-D of push members 45A-D positioned in the first member position 46B,D at a sixth axial member distance 66 in axial direction 11 along the central axis 6 from the previous push member 45B,D positioned in the second member position 47B,D, and wherein the sixth axial member distance 66 is larger than the fifth axial member distance 65.

The first axial member distance 61 and the second axial member distance 62 are equal to each other. The fourth axial member distance 64 and the fifth axial member distance 65 are equal to each other. The third axial member distance 63 and the sixth axial member distance 66 are equal to each other.

In other examples of the method according to the invention, the first axial member distance 61 and the second axial member distance 62 differ from each other and/or the fourth axial member distance 64 and the fifth axial member distance 65 differ from each other and/or the third axial member distance 63 and the sixth axial member distance 66 differ from each other.

The method comprises:

- moving said subsequent push member 45A,C of each of said at least one 44A,C of the at least two series 44A-D of push members 45A-D out of the first member position 46A,C and into first contact with the circumference 4 of the tubular body 3 at a seventh axial member distance 67 in axial direction 11 along the central axis 6 from said previous push member A,C positioned in the second member position 47A,C, wherein the seventh axial member distance 67 is larger than the second axial member distance 62, and
- moving said subsequent push member 45B,D of each of said at least one other 44B,D of the at least two series 44A-D of push members 45A-D out of the first member position 46A,D and into first contact with the circumference 4 of the tubular body 3 at an eighth axial member distance 68 in axial direction 11 along the central axis 6 from said previous push member 45B,D positioned in the second member position 47B,D, wherein the eighth axial member distance 68 is larger than the fifth axial member distance 65.

Figure 24A:
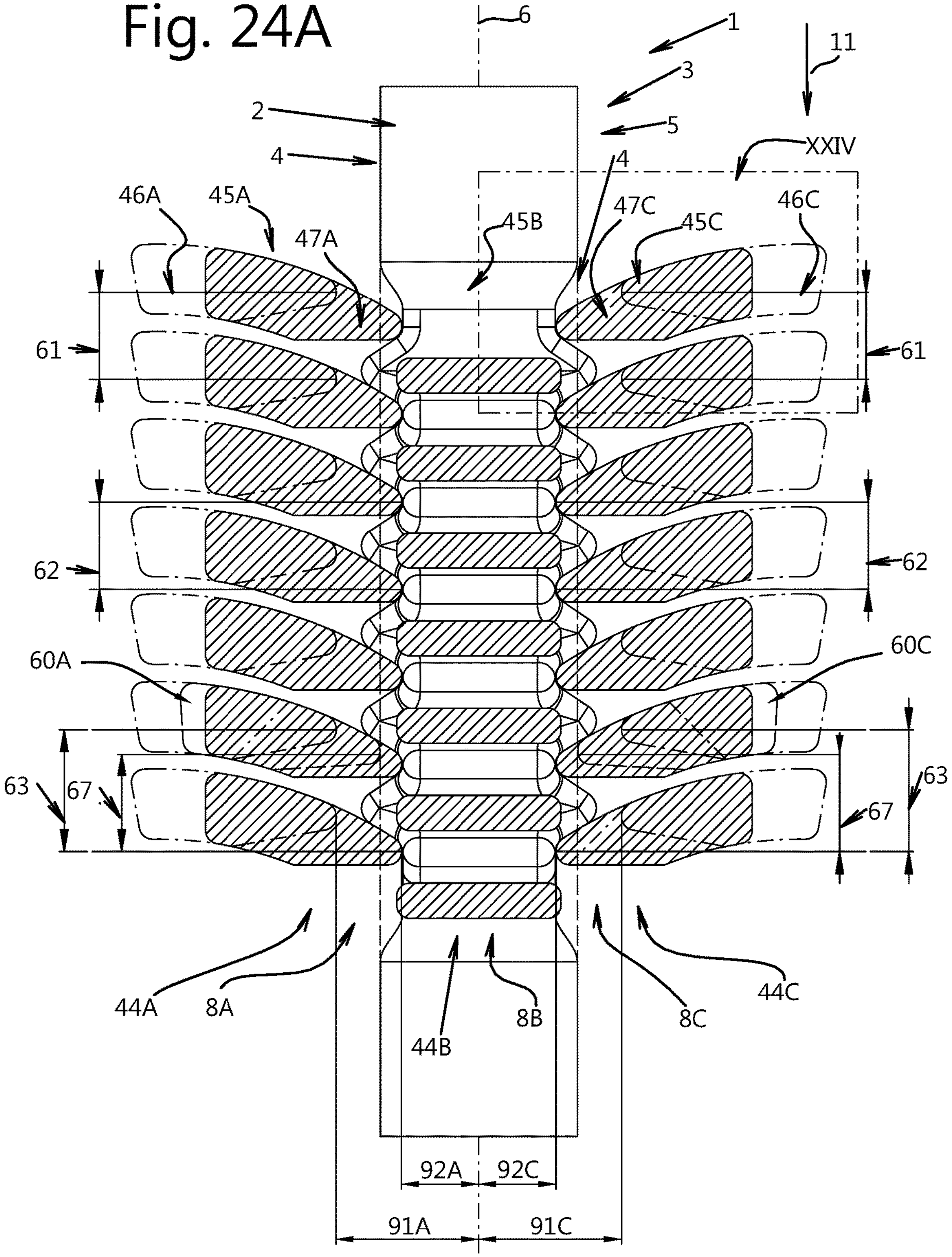

The first contact positions 60A-D in which the push members 45A-D come into first contact with the circumference 4 of the tubular body 3 are shown in the FIGS. 23A, 24A and 25A.

The seventh axial member distance 67 and the eighth axial member distance 68 are equal to each other.

In other examples of the method according to the invention, the seventh axial member distance 67 and the eighth axial member distance 68 differ from each other.

The method comprises, when the push members 45A-D of the at least two series 44A-D of push members 45A-D are positioned in the second member position 47A-D, placing the push members 45A,C of said at least one 44A,C of the at least two series 44A-D of push members 45A,D which are located between two push members 45B,D of said at least one other 44B,D of the at least two series 44A-D of push members 45A-D in the middle between said two push members 45B,D of said at least one other 44B,D of the at least two series 44A-D of push members 45A-D when seen in axial direction 11 along the central axis 6.

Figure 23B:
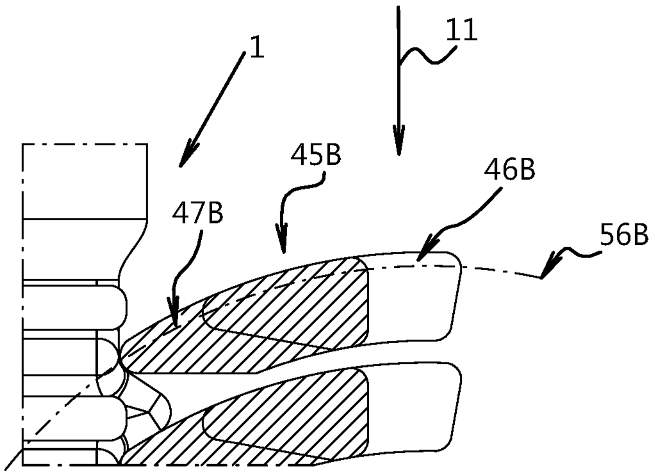
Figure 24B:
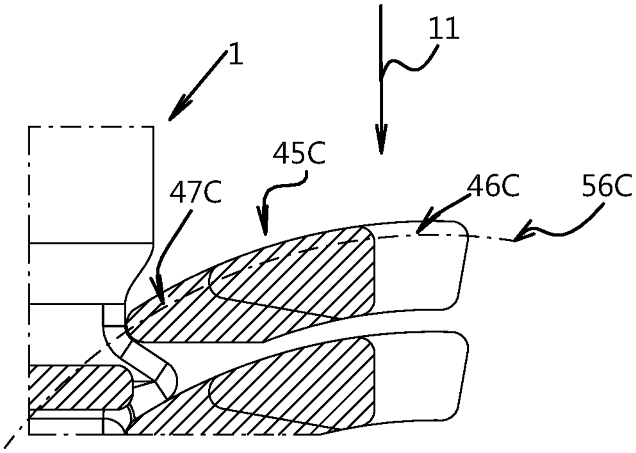

The method comprises moving the push members 45A-D along a curved trajectory, such as a trajectory 56A-D along part of a circle, towards the fixated part 50 of the tubular body 3 during the movement from the first member position 46A-D into the second member position 47A-D (see FIGS. 23B and 24B).

In other examples of the method according to the invention, the method comprises moving the push members 45A-D along a transverse trajectory extending under an angle $\alpha$ larger than 90 degrees relative to the central axis 6 and towards the fixated part 50 of the tubular body 3 during the movement from the first member position 46A-D into the second member position 47A-D.

The method comprises pushing the contact parts 48A-D of the circumference 4 of the tubular body 3 with a contact edge 57A-D of the push members 45A-D towards the central axis 6 in order to form the inward corrugations 9A-D.

The method comprises pushing the contact parts 48A-D of the circumference 4 of the tubular body 3 formed from at least one helically wound strip of paper 2 or paper-like material with the push members 45A-D towards the central axis 6 in order to form the inward corrugations 9A-D.

The method comprises pushing the contact parts 48A-D of the circumference 4 of the tubular body 3 formed from multiple helically wound strips of paper 2 or paper-like material with the push members 45A-D towards the central axis 6 in order to form the inward corrugations 9A-D.

Figure 13:
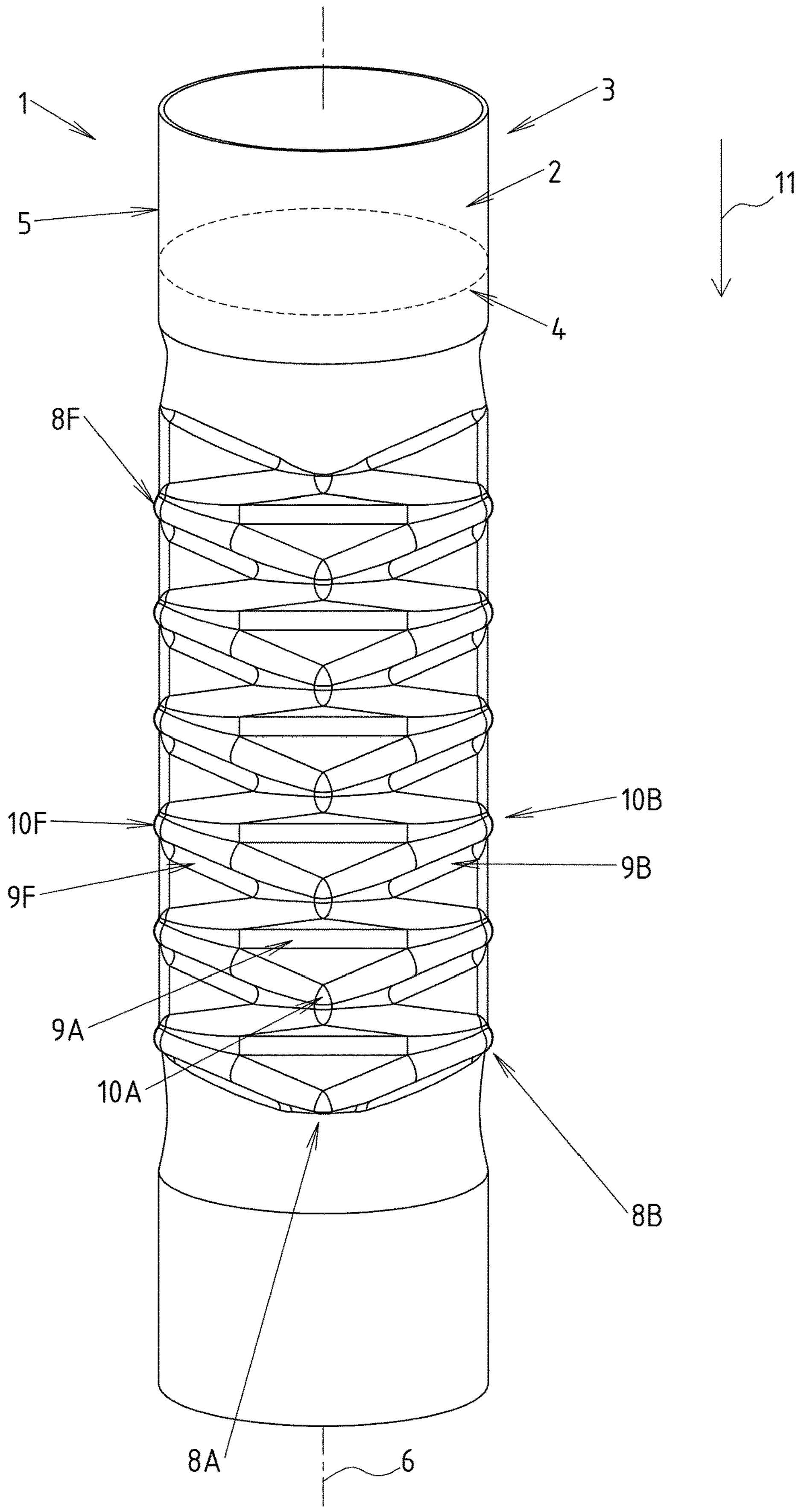
Figure 14:
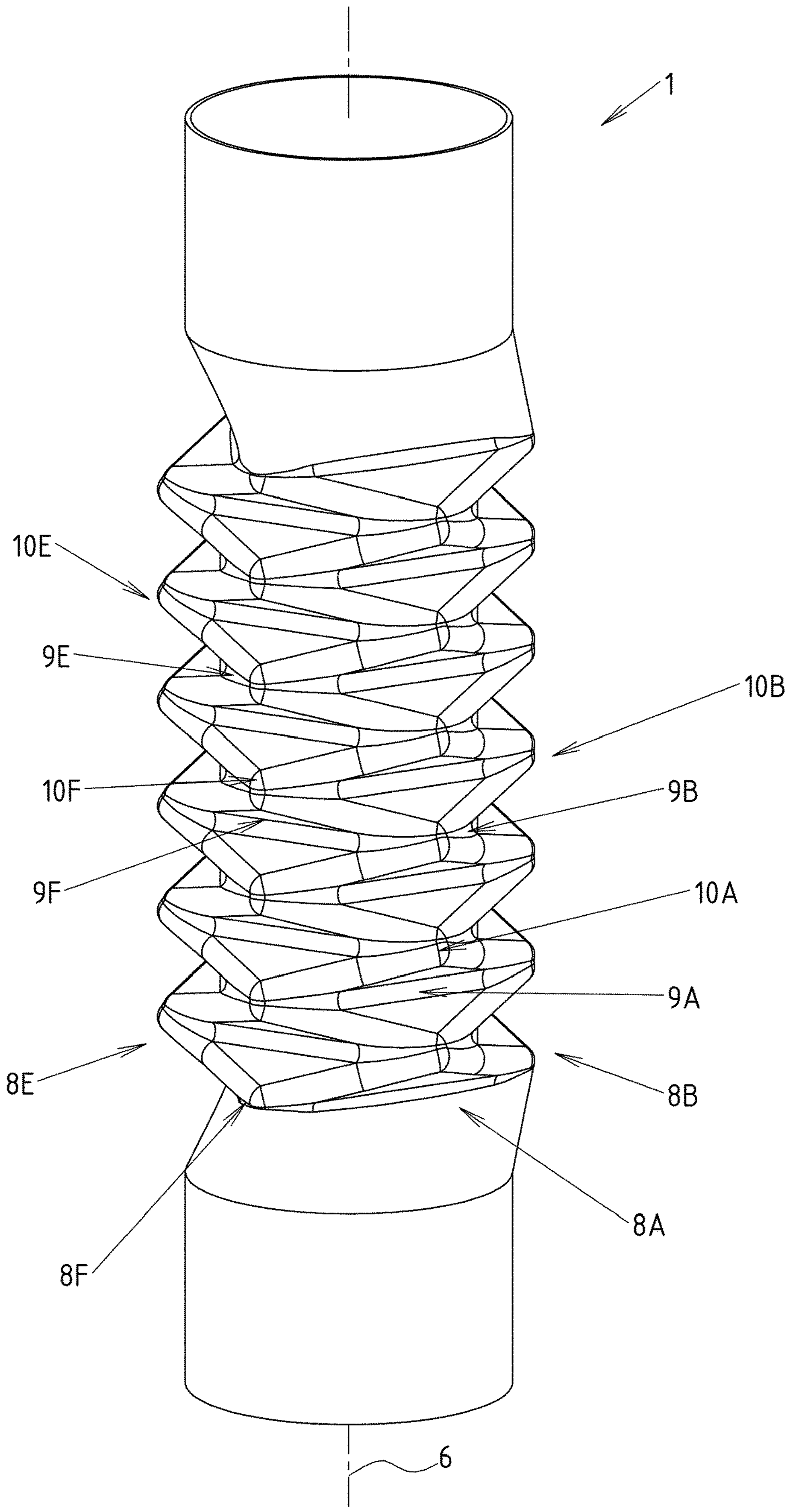
Figure 15:
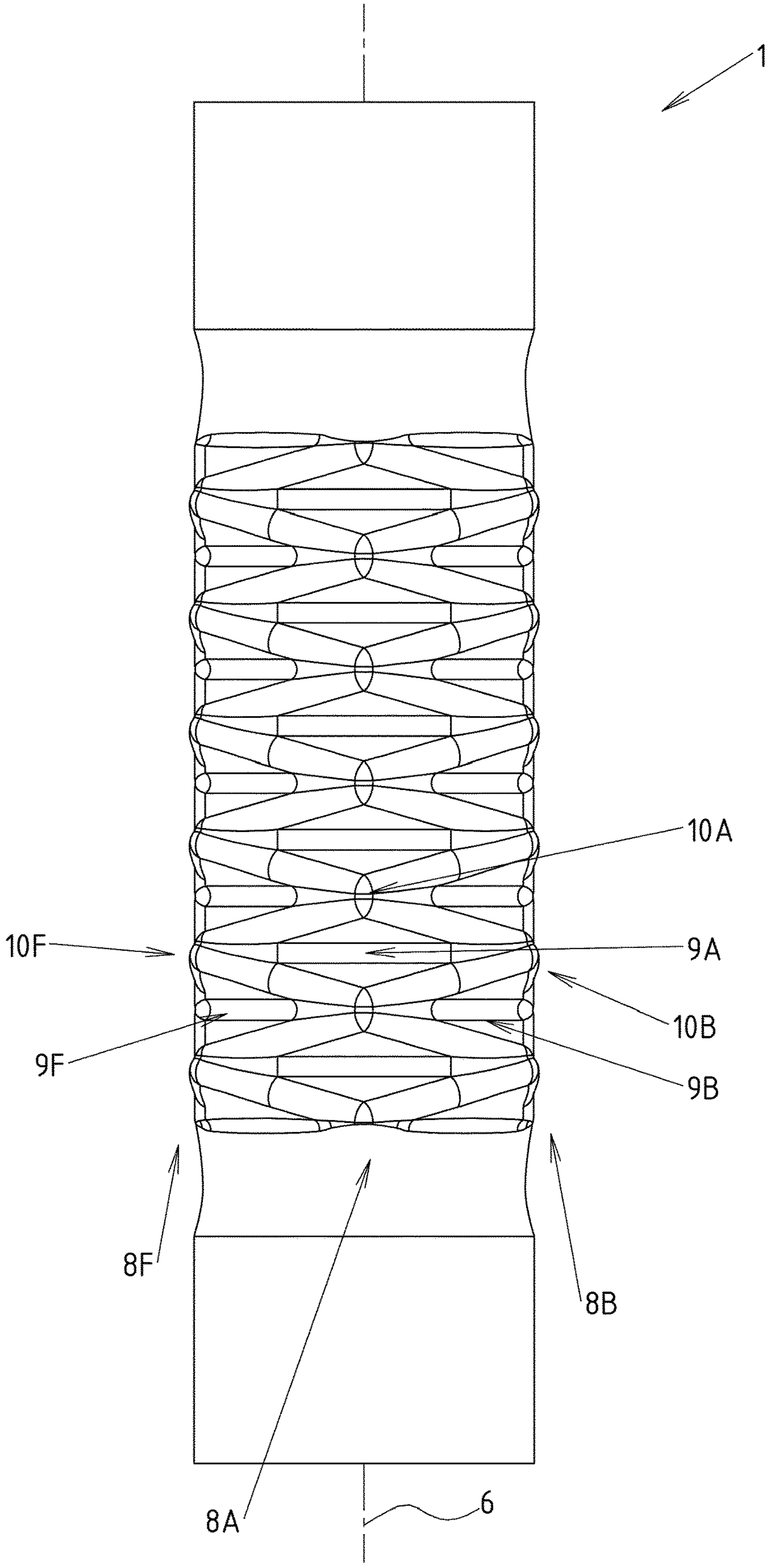
Figure 16:
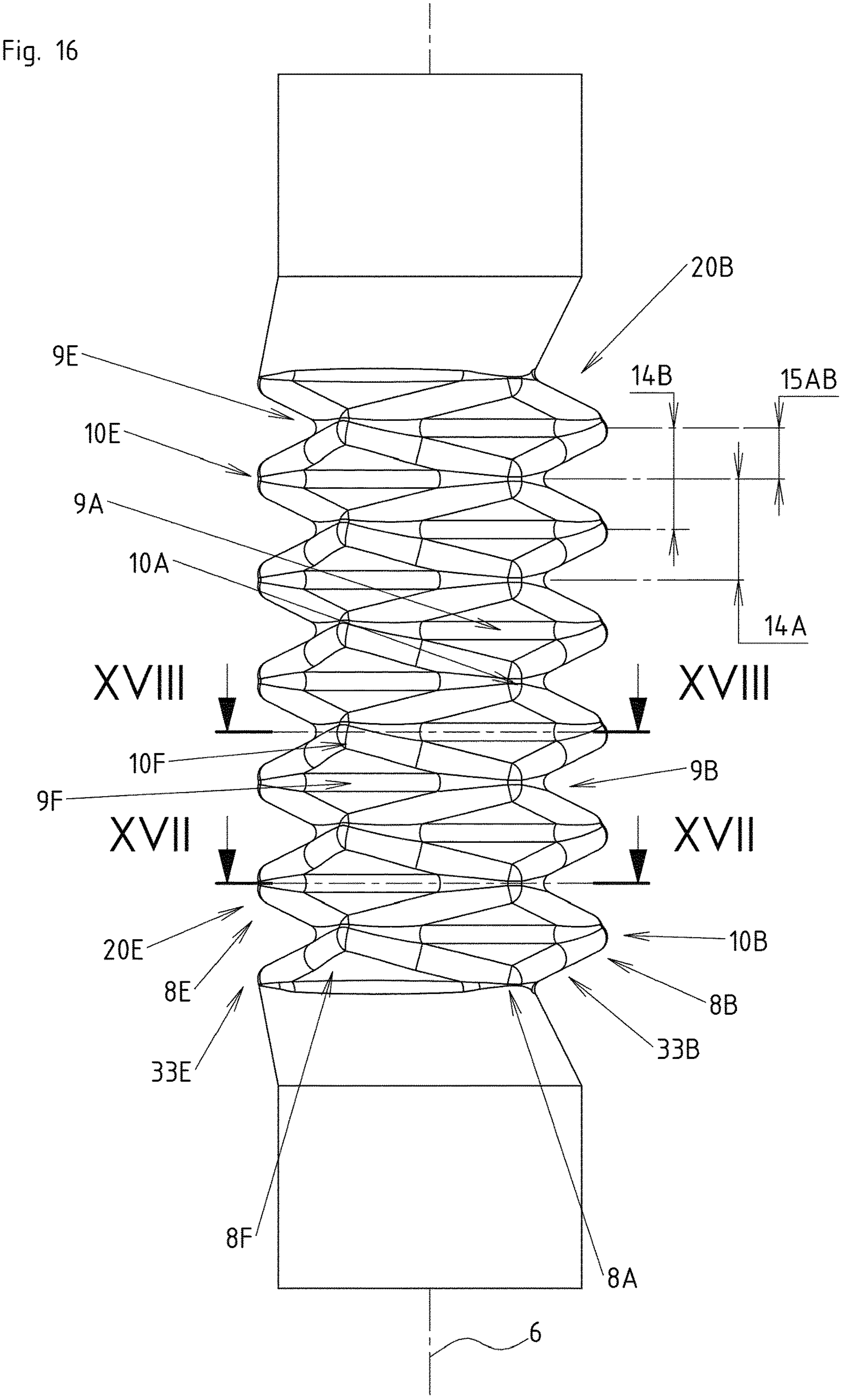

A second embodiment of the method according to the invention relates to the production of the straw 1 of FIG. 13.

Figure 17:
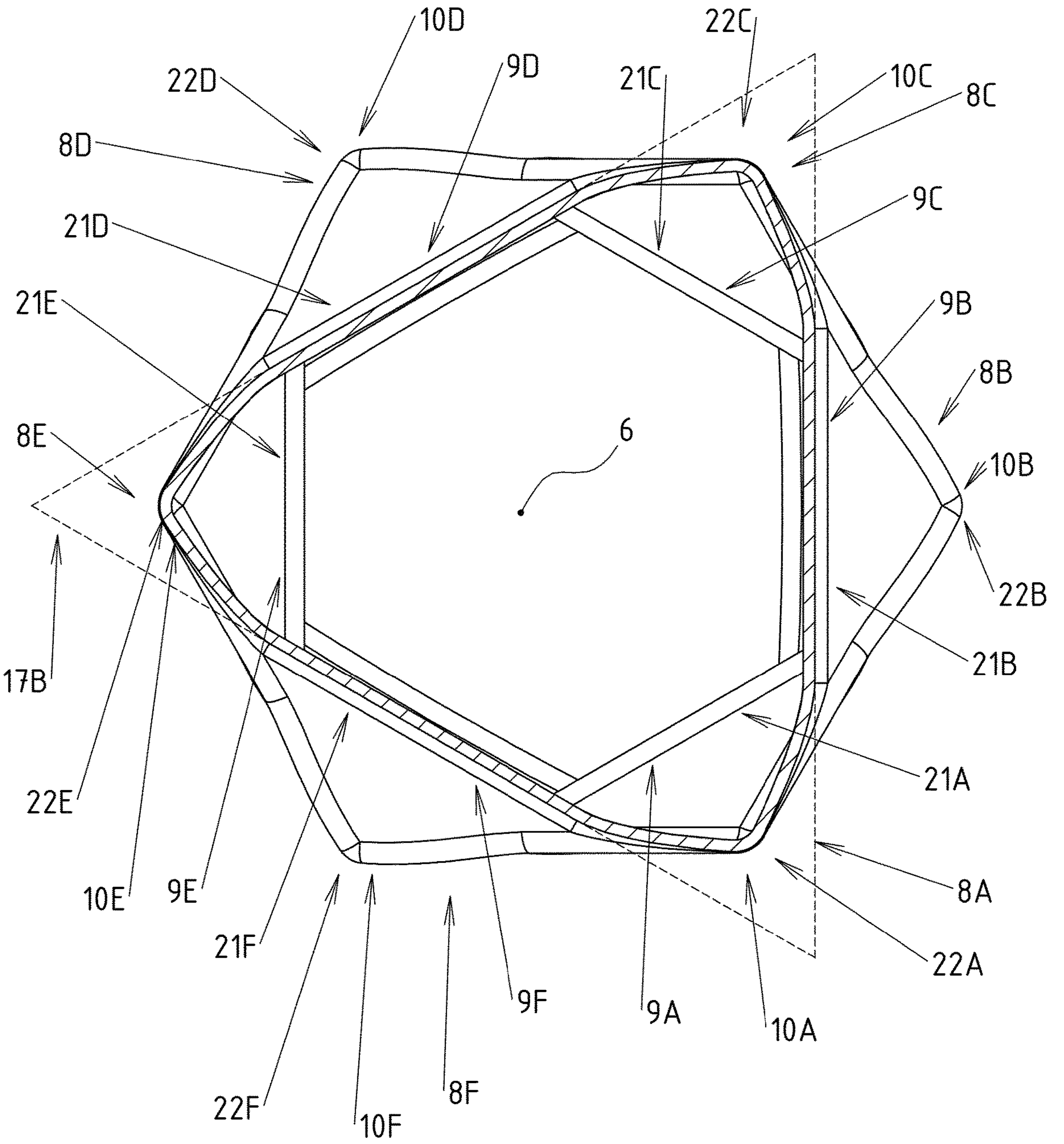
Figure 18:
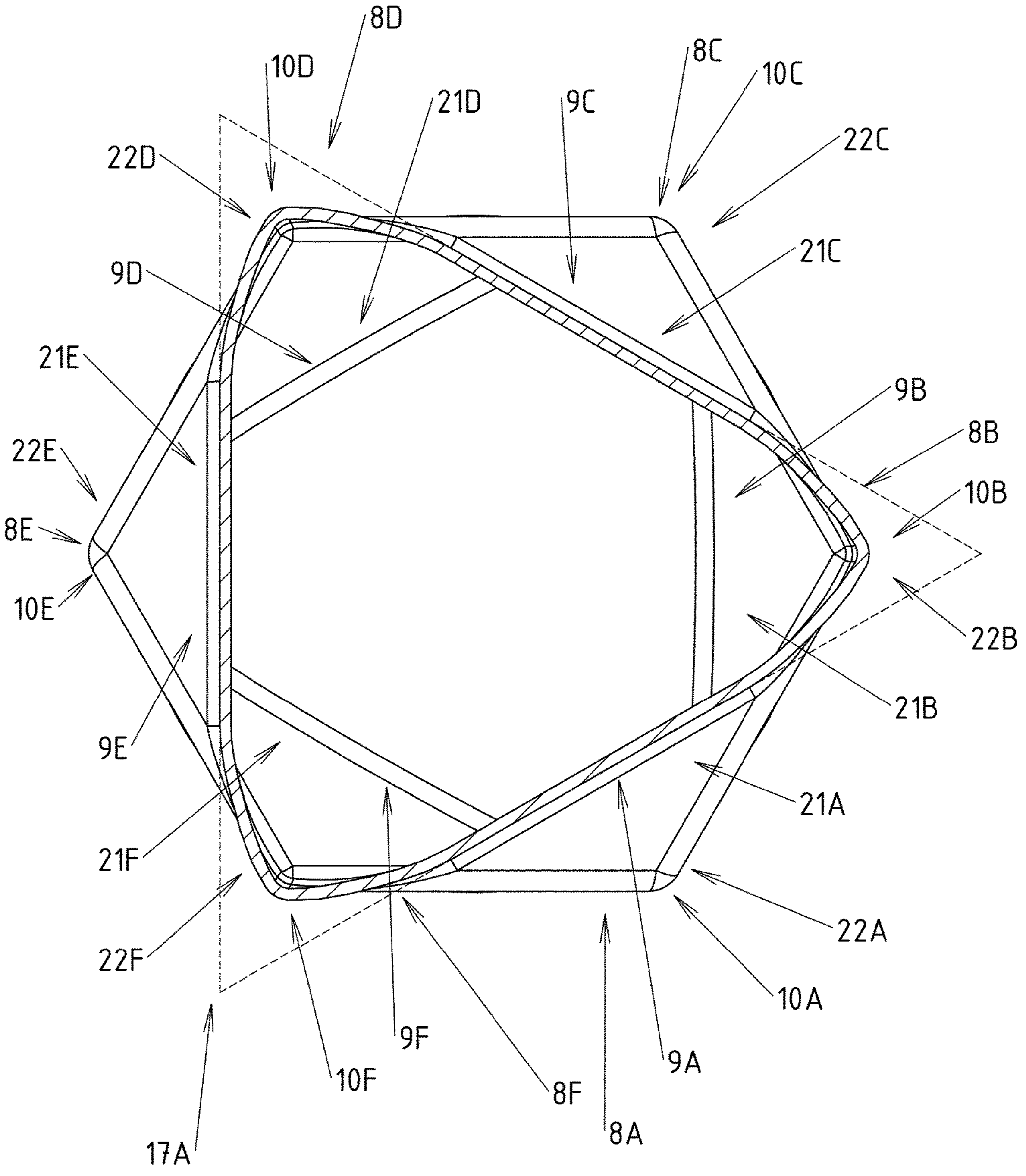
Figure 26:
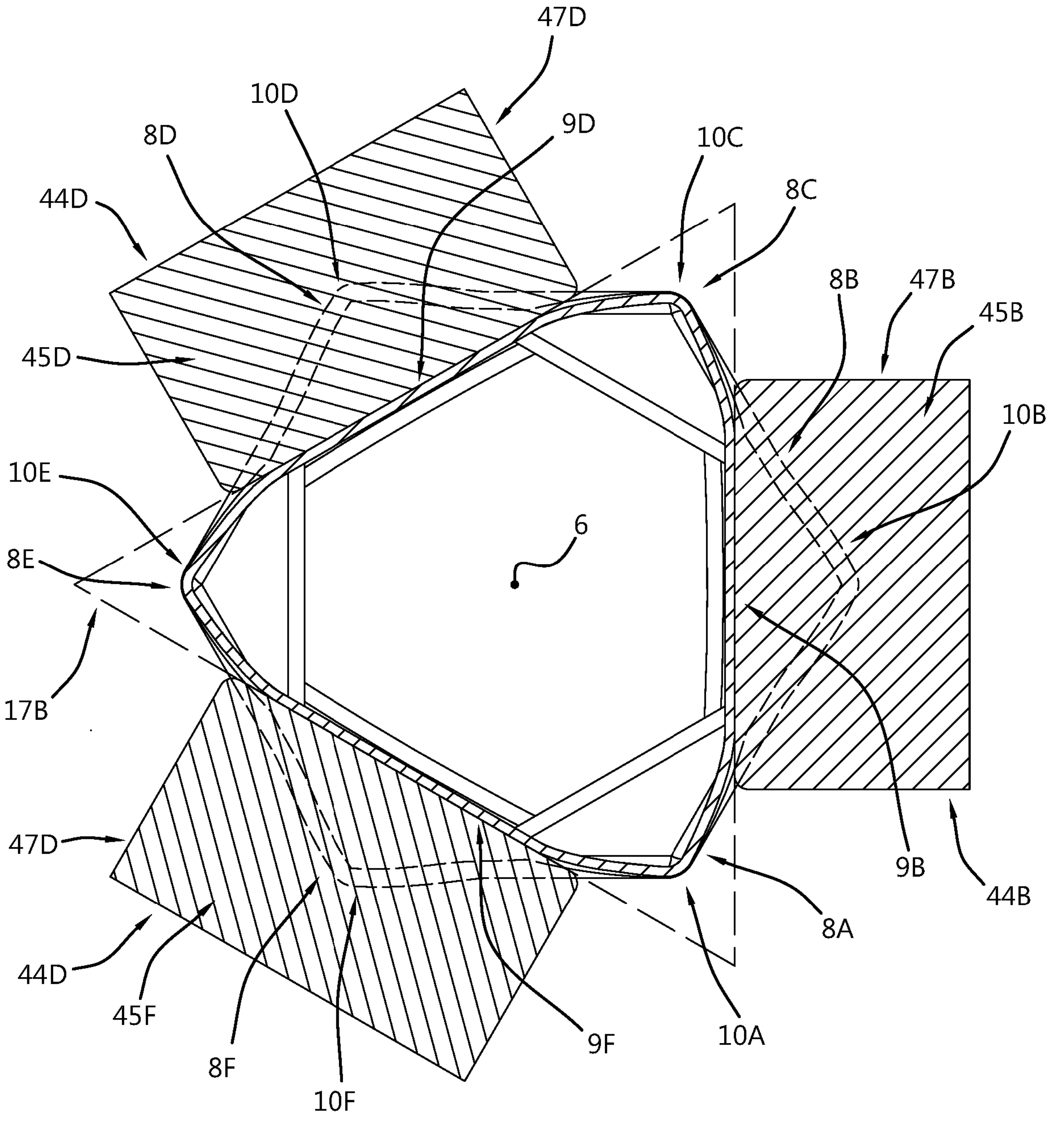
Figure 27:
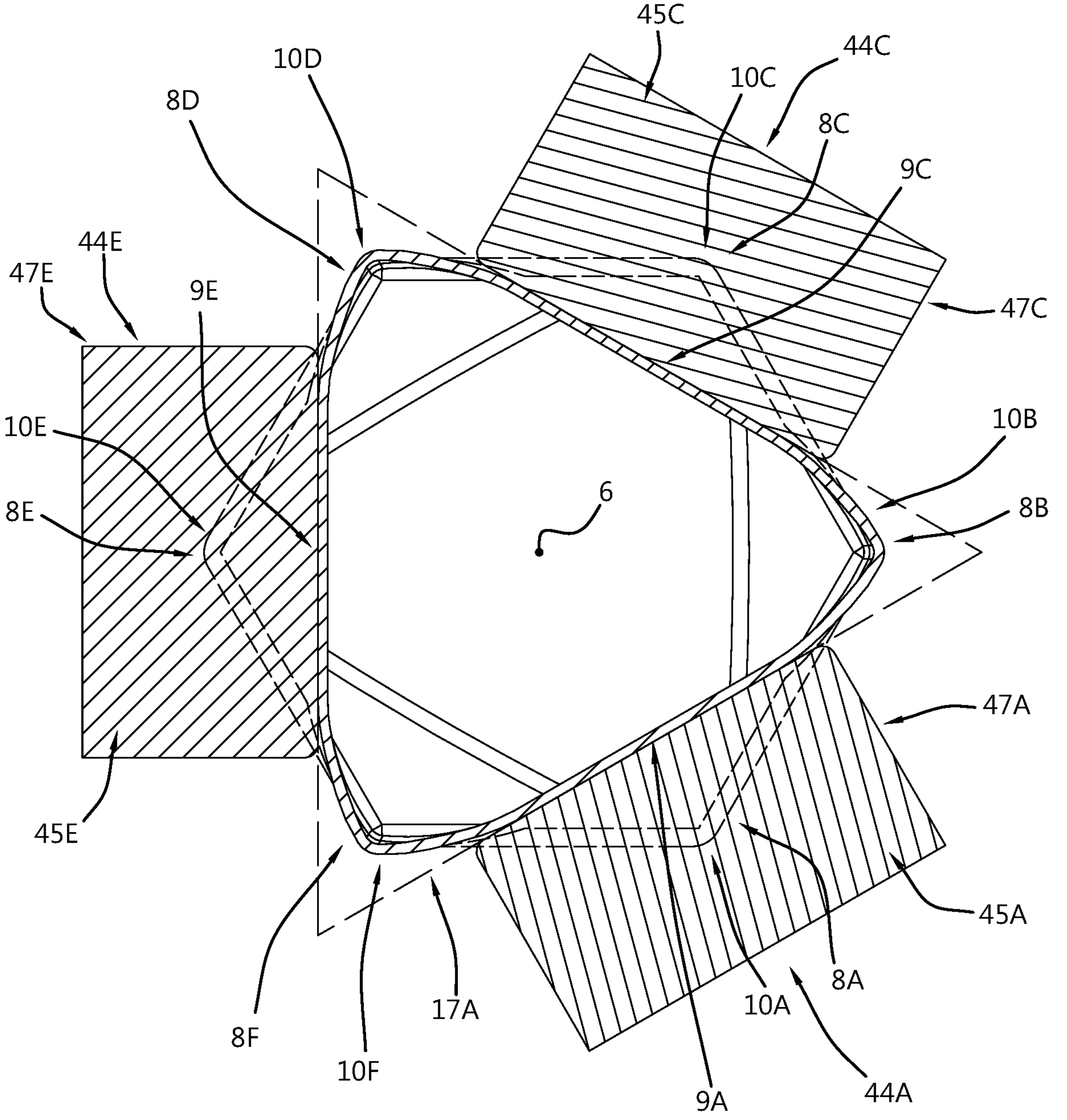

The FIGS. 26 and 27 show said second embodiment of the method in the views in cross-section of the FIGS. 17 and 18, respectively. In this method, six series 44A-F of push members 45A-F are positioned along the tubular body 3.

Figure 28A:
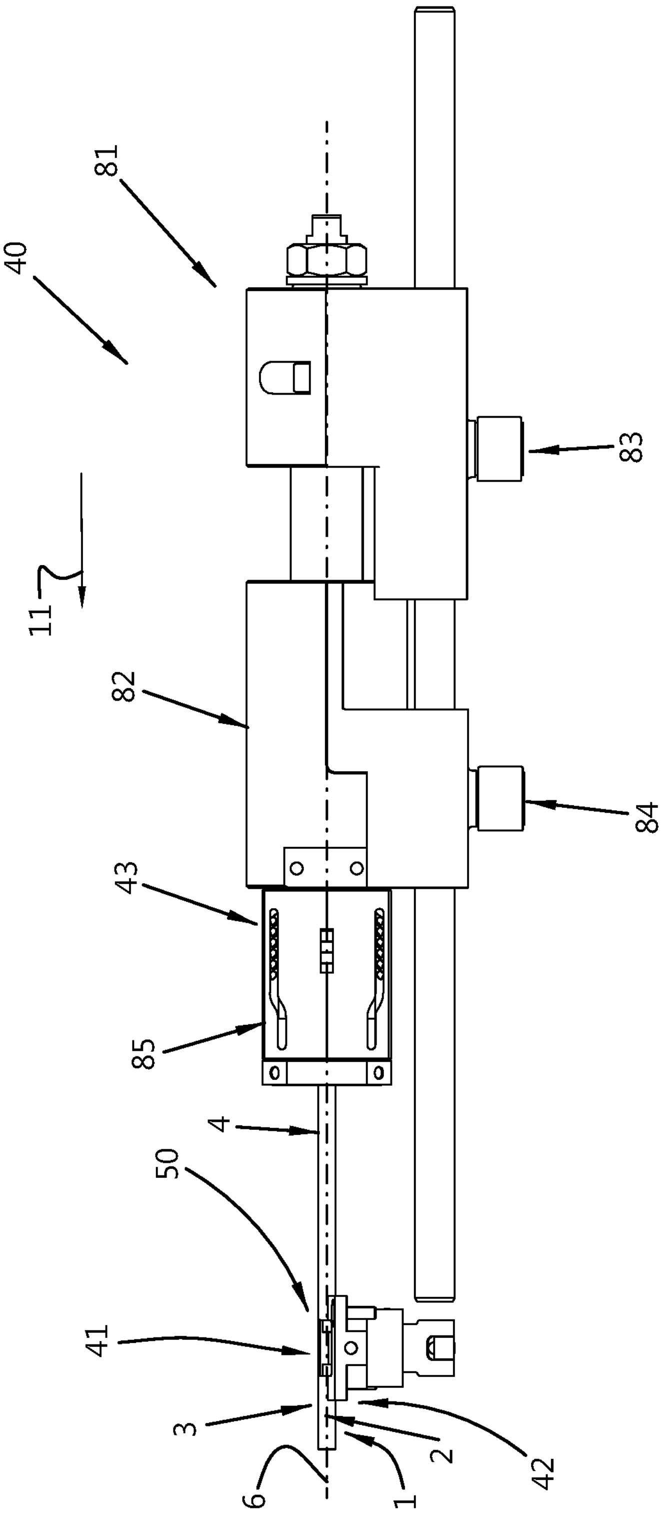
Figure 28B:
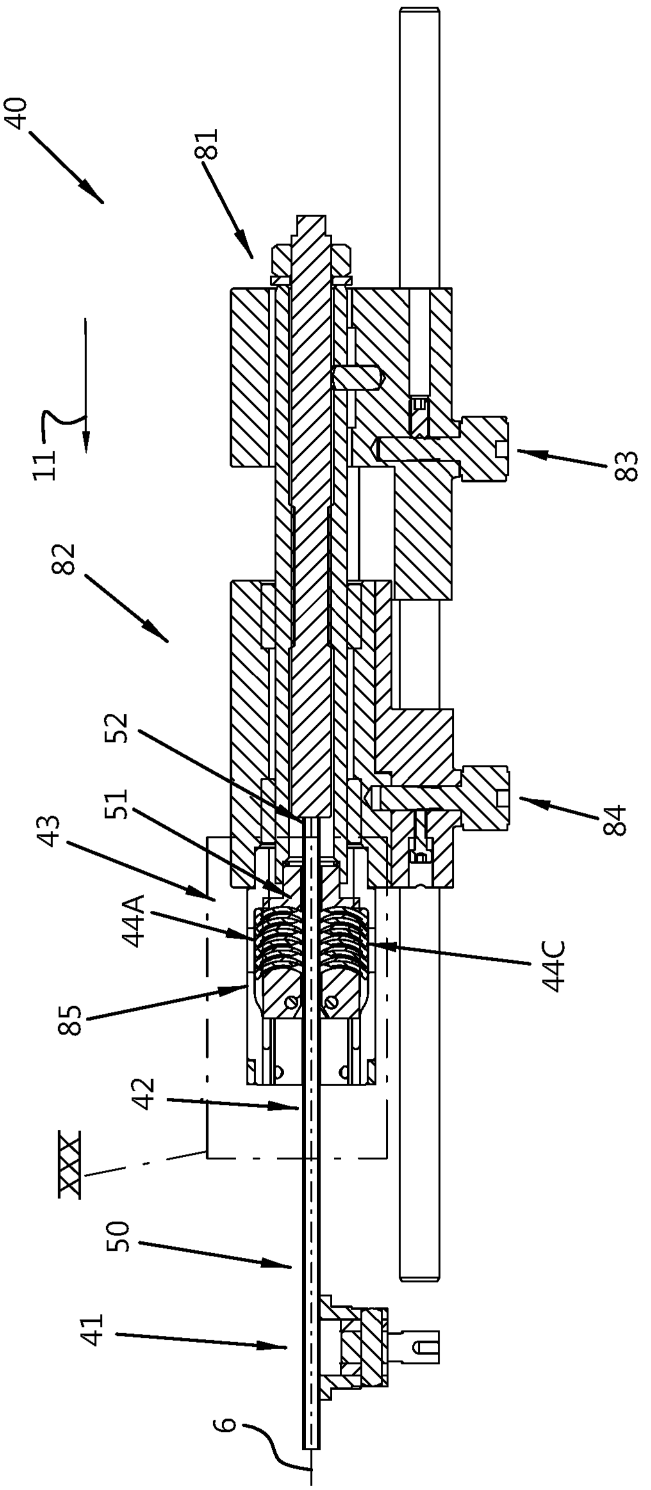
Figure 29A:
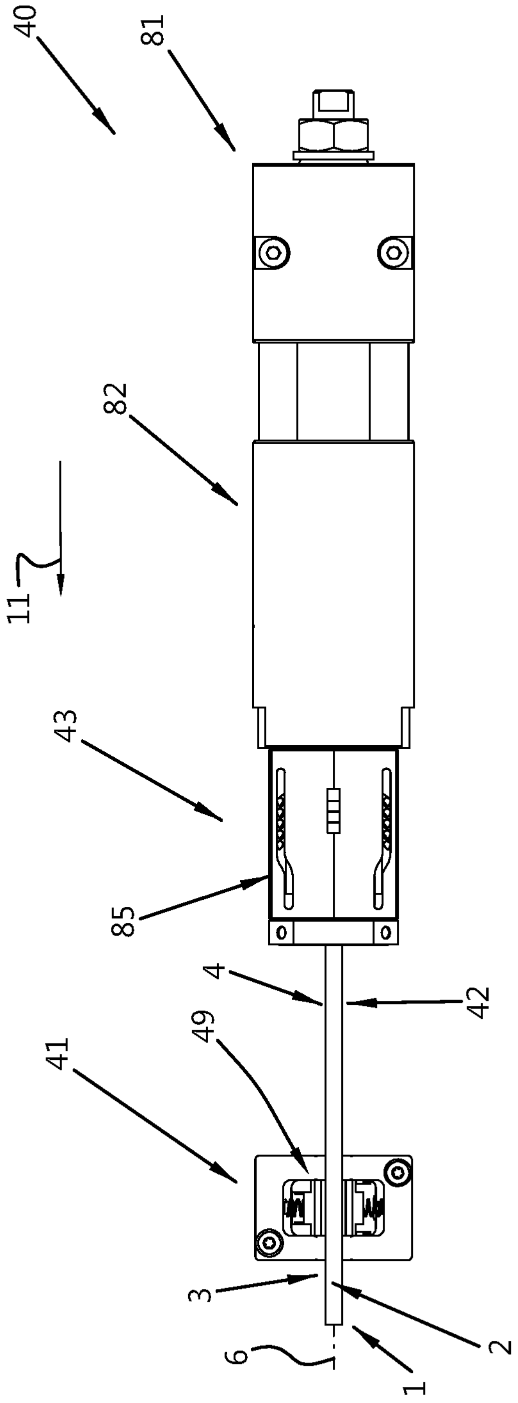
Figure 29B:
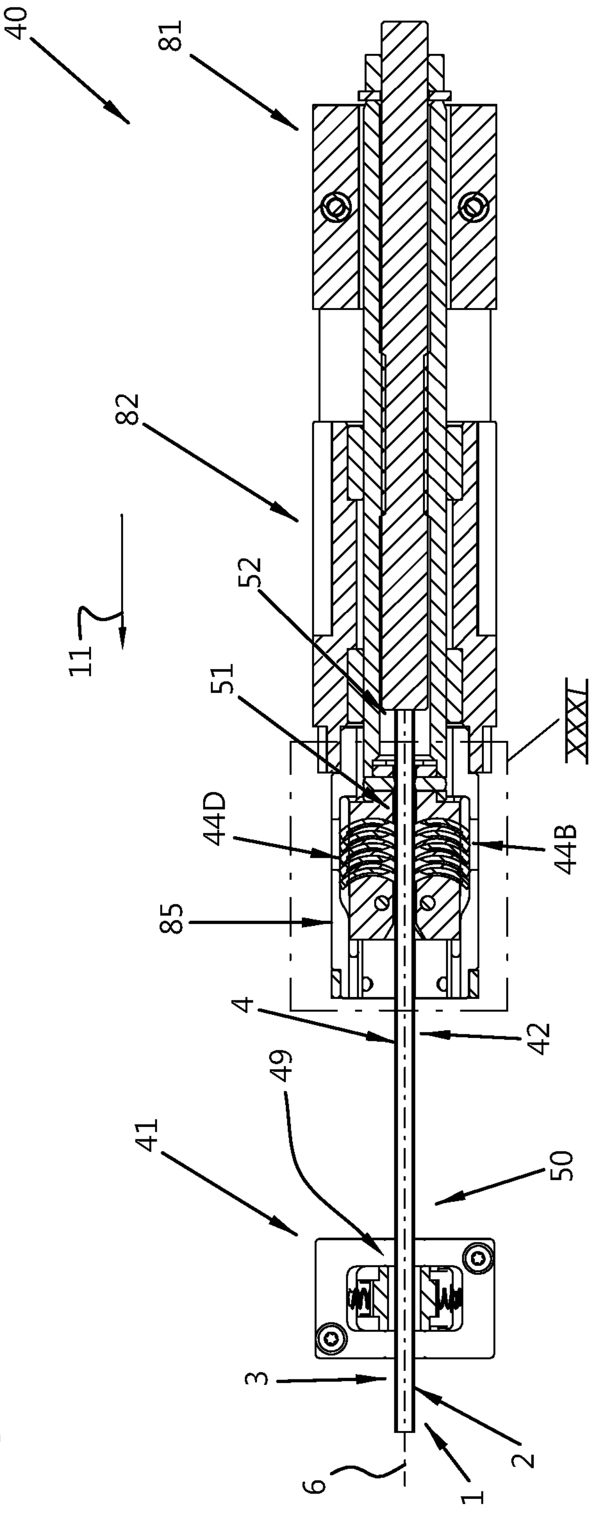

FIG. 28A shows a side view of a first embodiment of the system 40 according to invention. FIG. 28B shows the view of FIG. 28A in cross section along the central axis 6 of the straw 1. FIG. 29A shows a top view of the system 40 of FIG. 28A. FIG. 29B shows the view of FIG. 29A in cross section along the central axis 6 of the straw 1.

The system 40 operates similar to the method of the FIGS. 19-25 with the difference that for each of the at least two series 44A-D of push members 45A-D, the subsequent push members 45A-D are brought into contact with the circumference 4 of the tubular body 3 just before a respective previous push member 45A-D has reached the second member position 47A-D. Further features explained with respect to said method also apply to the system, such as the features relating the first axial member distance 61, the second axial member distance 62, the third axial member distance 63, the fourth axial member distance 64, the fifth axial member distance 65, the sixth axial member distance 66, the seventh axial member distance 67, and the eighth axial member distance 68.

The system 40 comprises a first system part 81 and second system part 82. During operation, the first system part 81 is held in position by a first cam 83 and the second system part 82 is moved towards the first system part 81 by a second cam 84.

The system 40 comprises a holding unit 41 to hold the tubular body 3 in an operation position 42. The holding unit 41 is configured to maintain its position with respect to the first system part 81.

The system 40 comprises a profiling device 43 comprising at least two series 44A-D of push members 45A-D which are positionable along the tubular body 3 being held in the operation position 42. More specifically, the profiling device 43 comprises four series 44A-D of push members 45A-D which are positionable along the tubular body 3 being held in the operation position 42.

Each of the at least two series 44A-D of push members 45A-D comprises multiple push members 45A-D being spaced from each other in axial direction 11 along the central axis 6 of the tubular body 3.

Figure 30A:
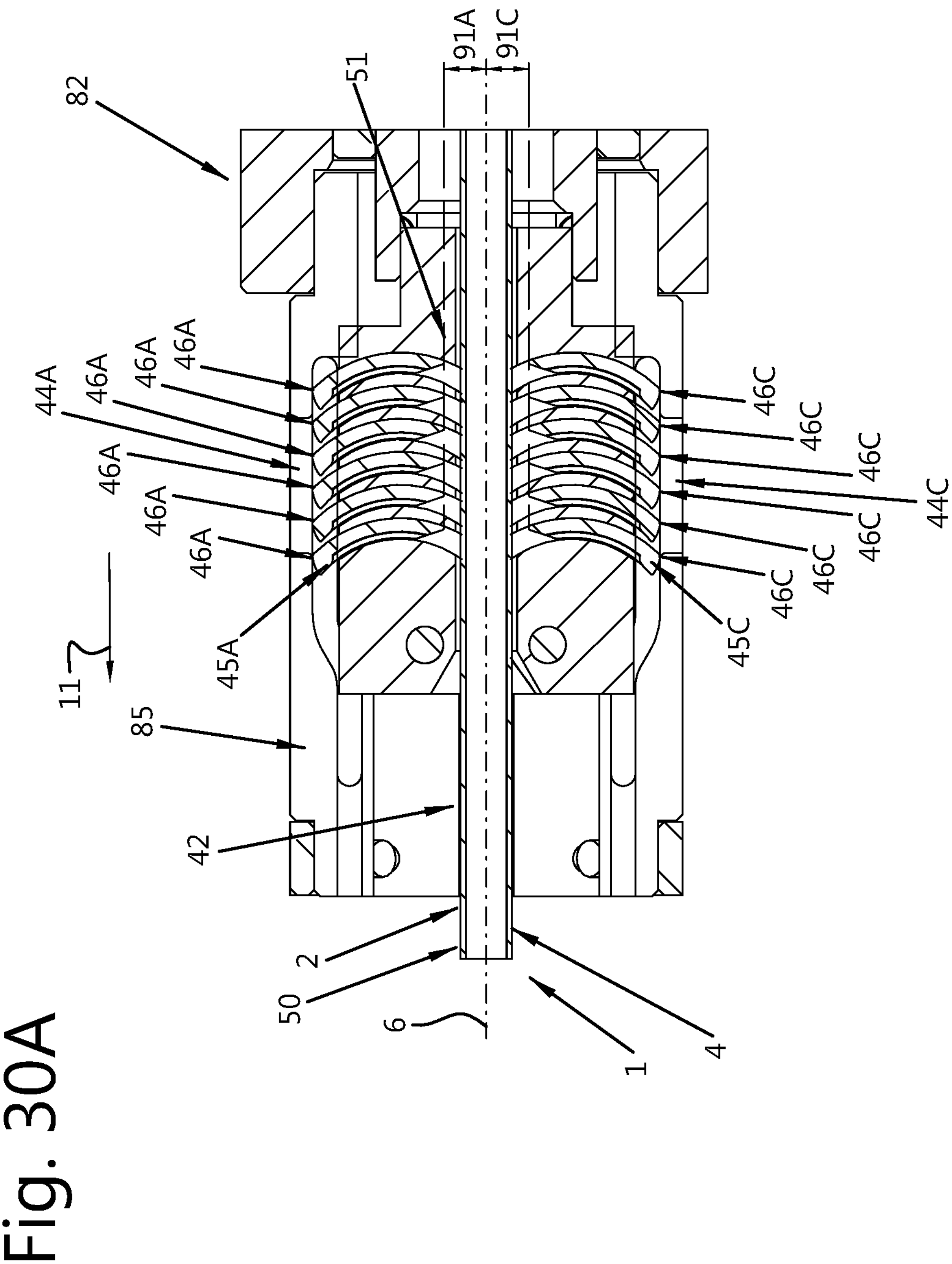
Figure 30B:
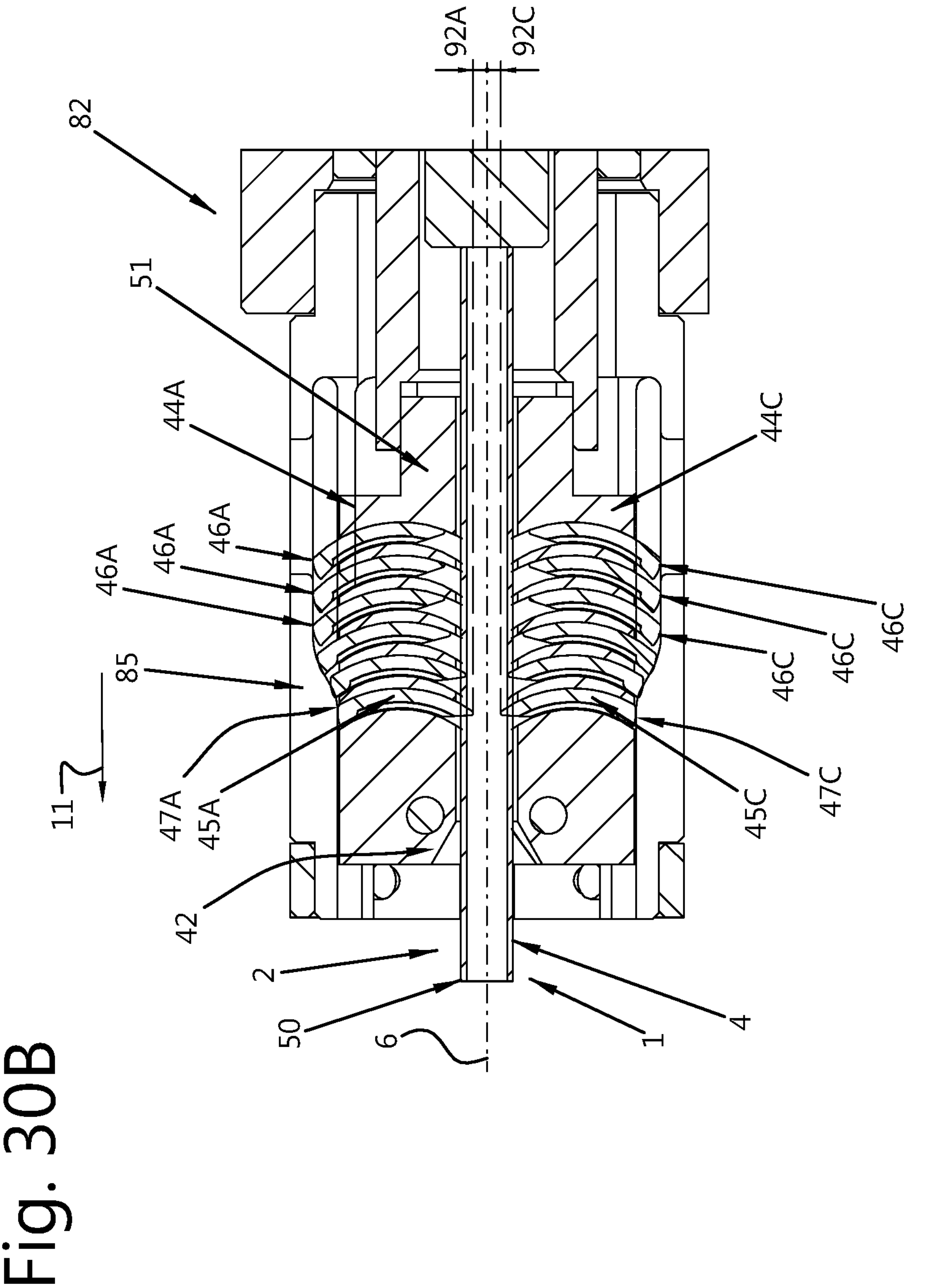
Figure 30C:
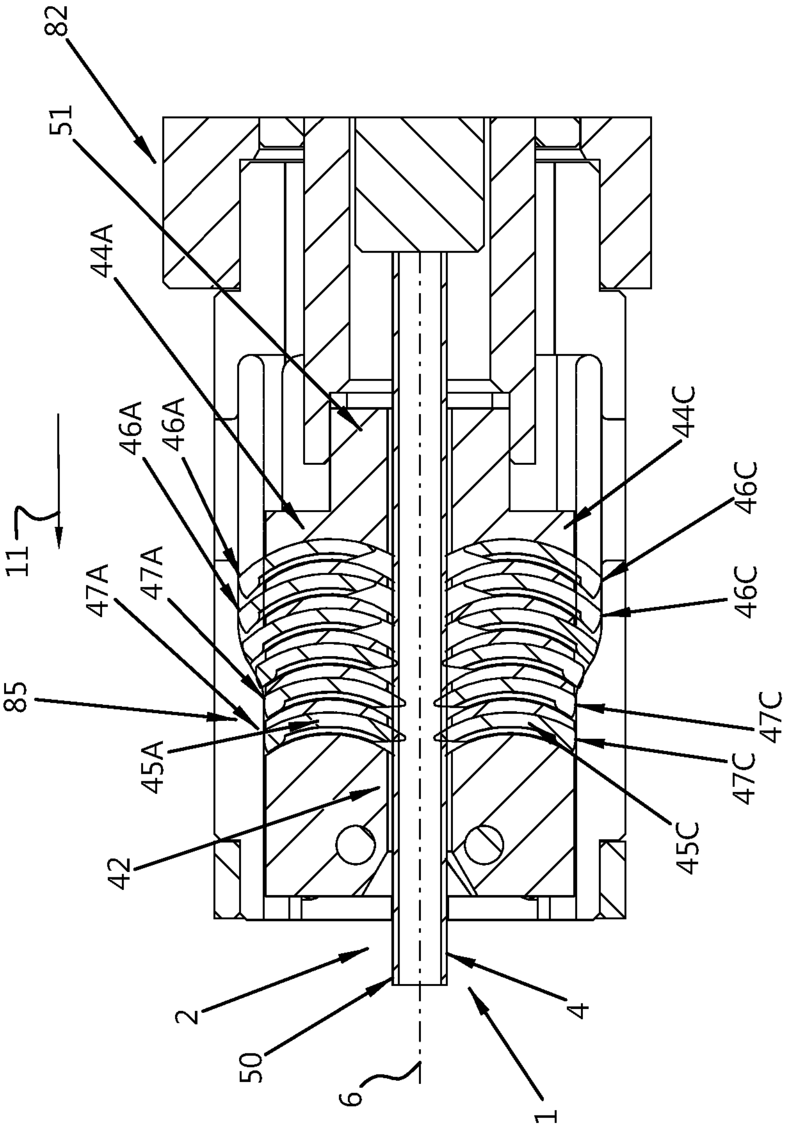
Figure 30D:
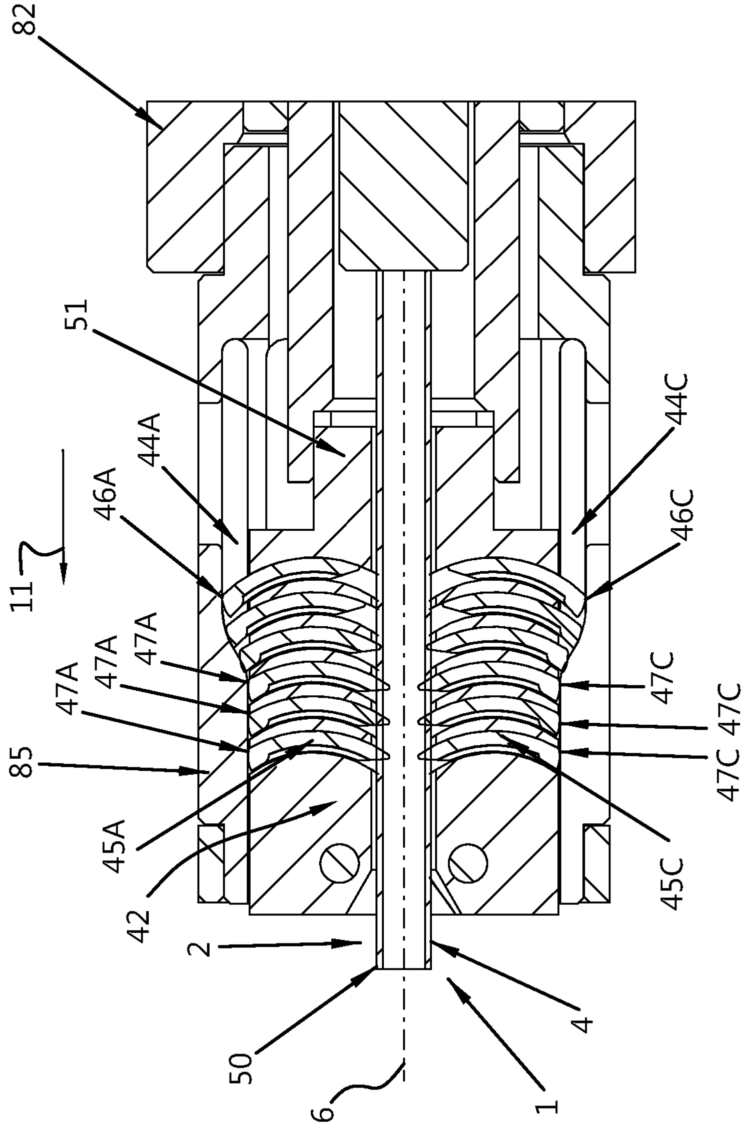
Figure 30E:
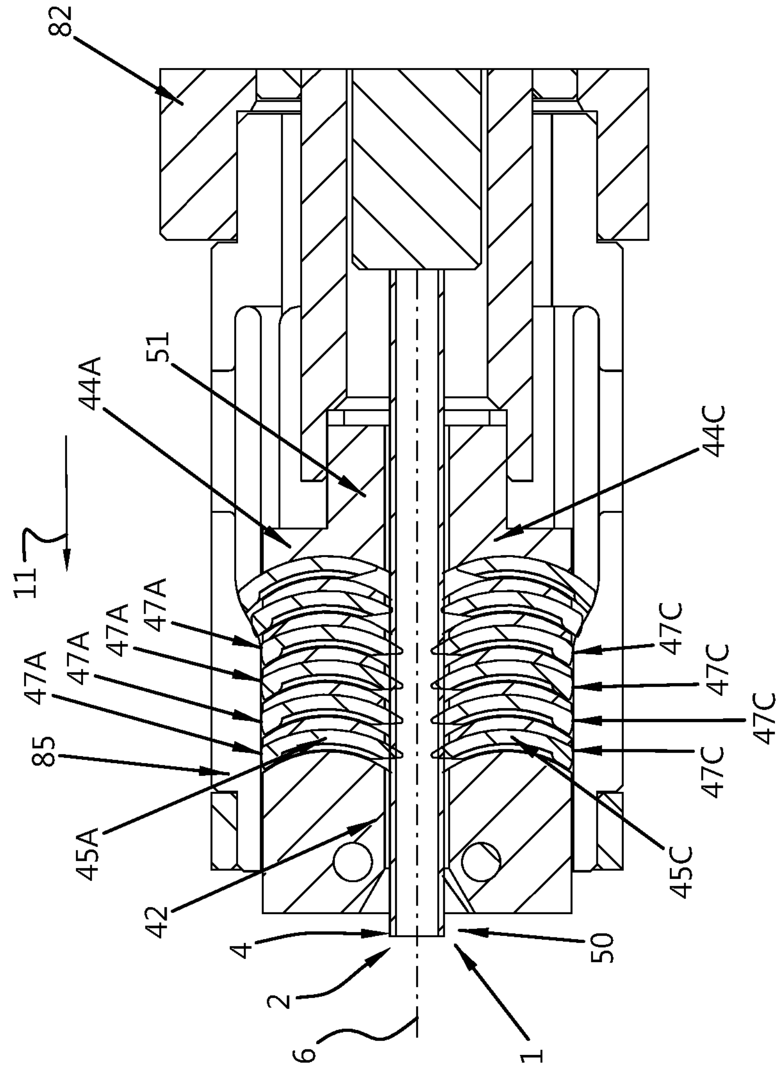
Figure 30F:
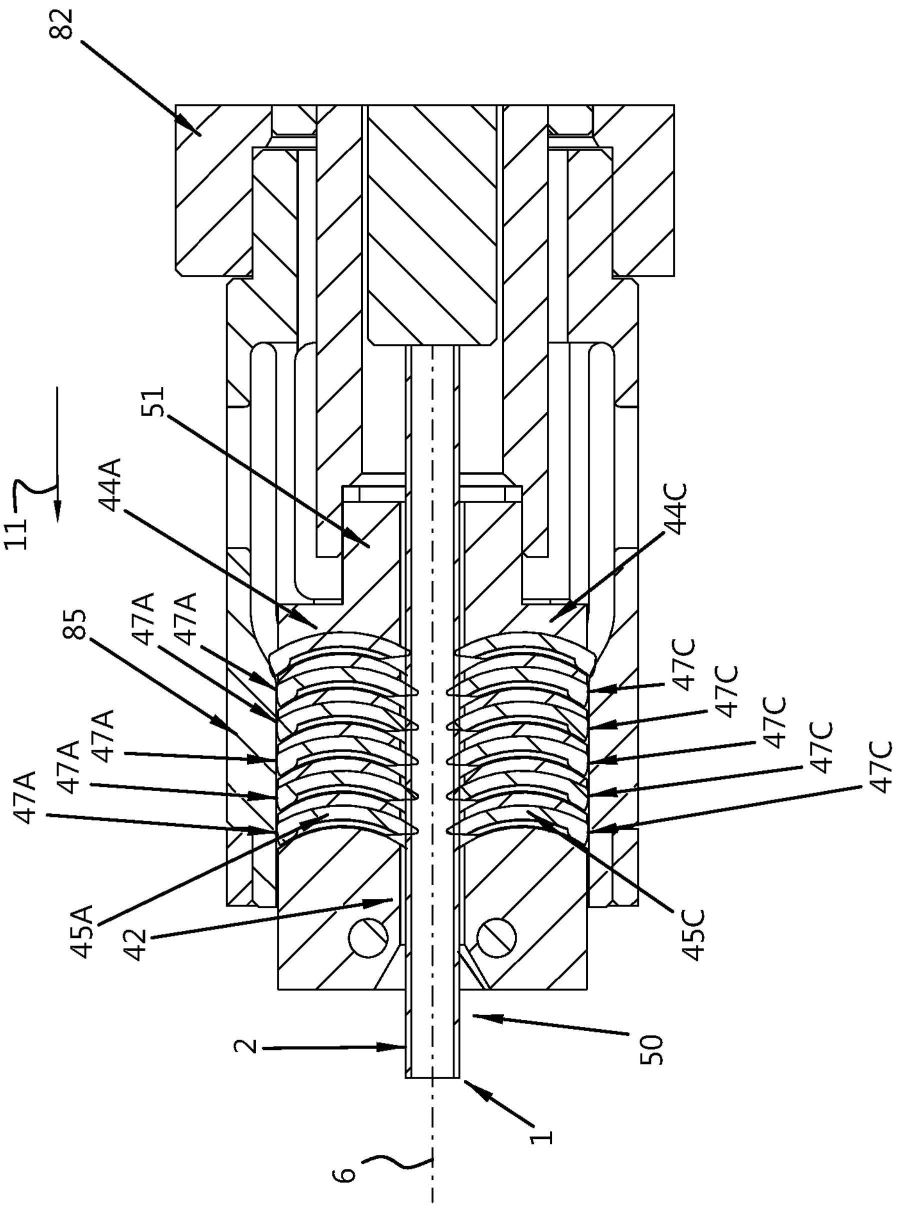
Figure 30G:
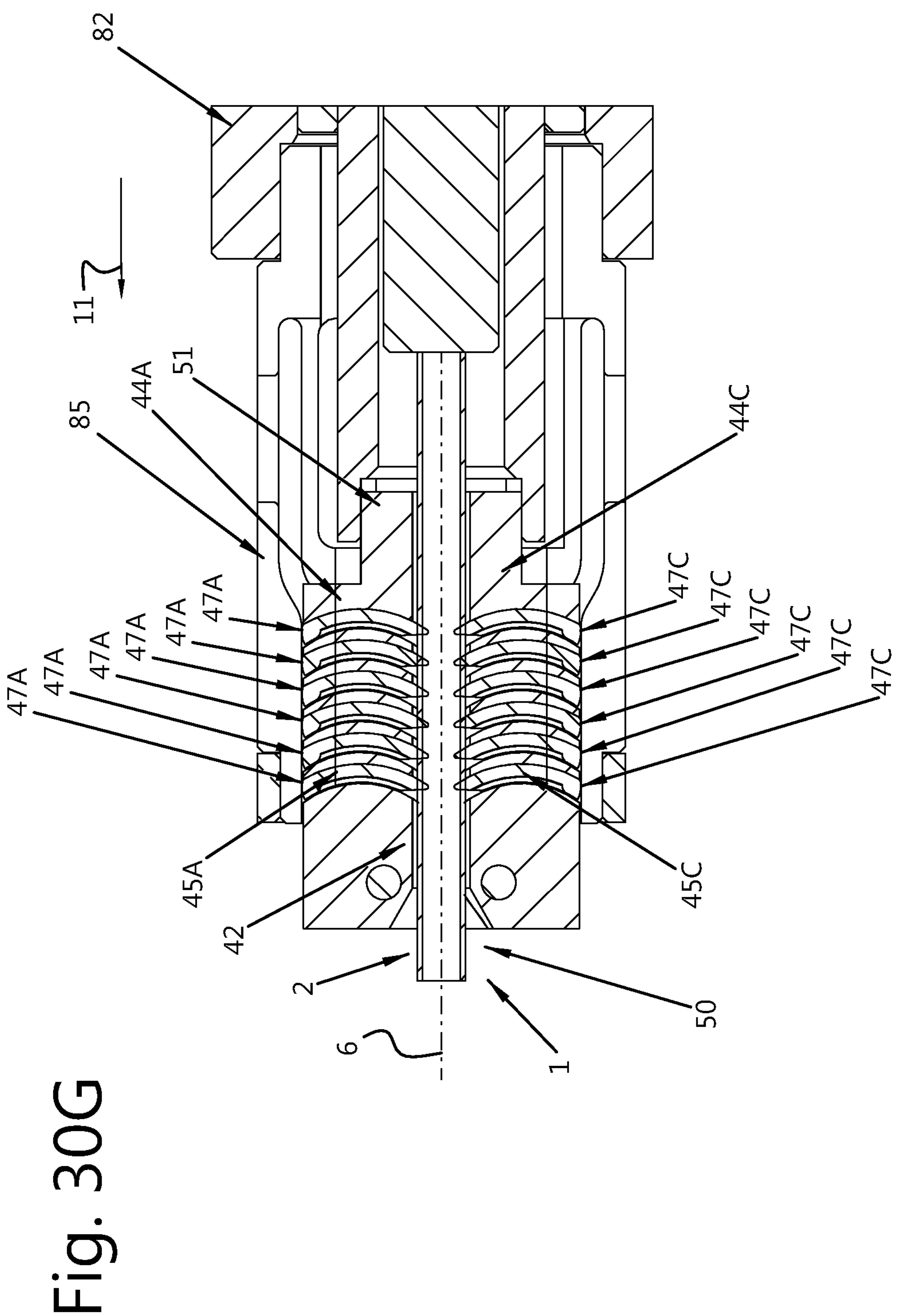
Figure 31A:
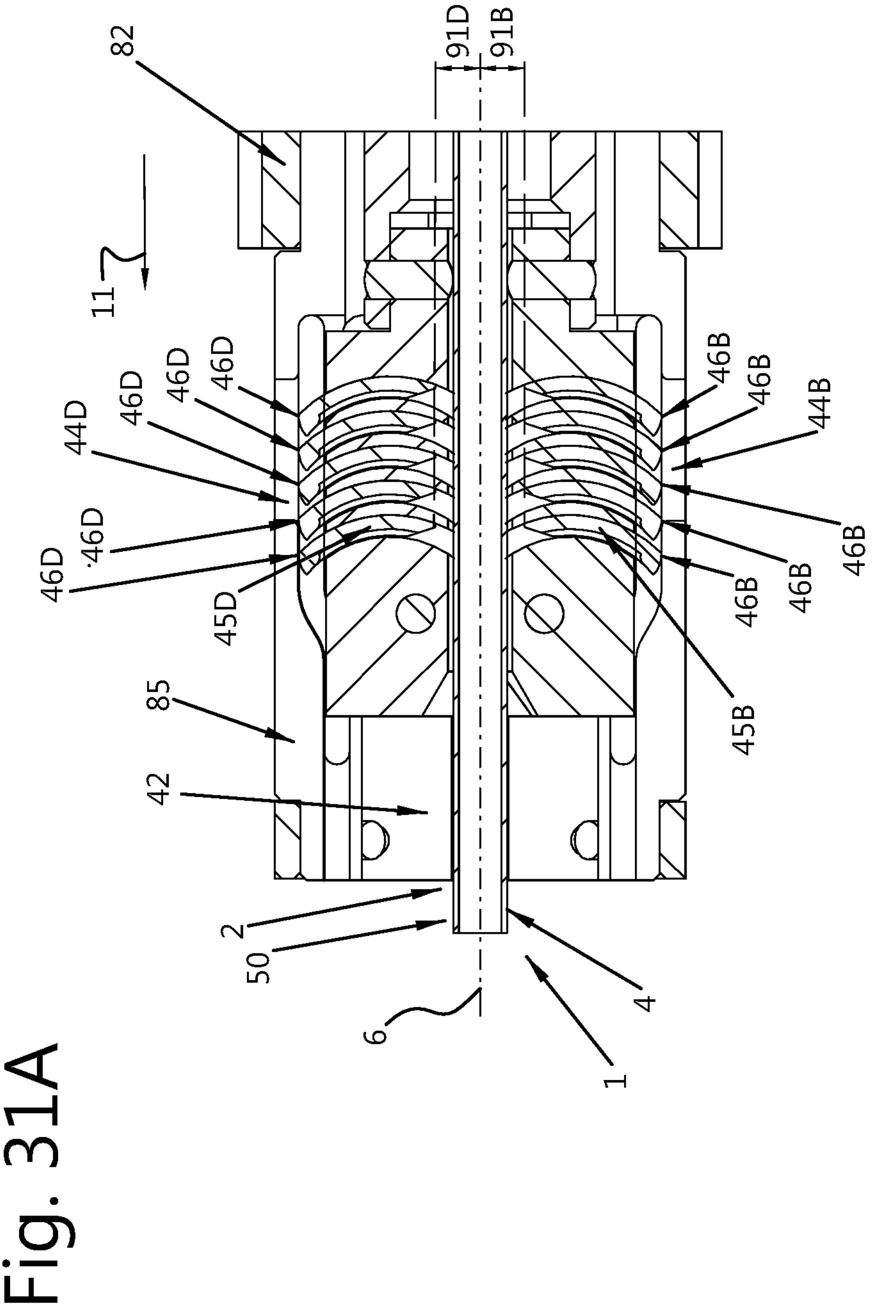
Figure 31B:
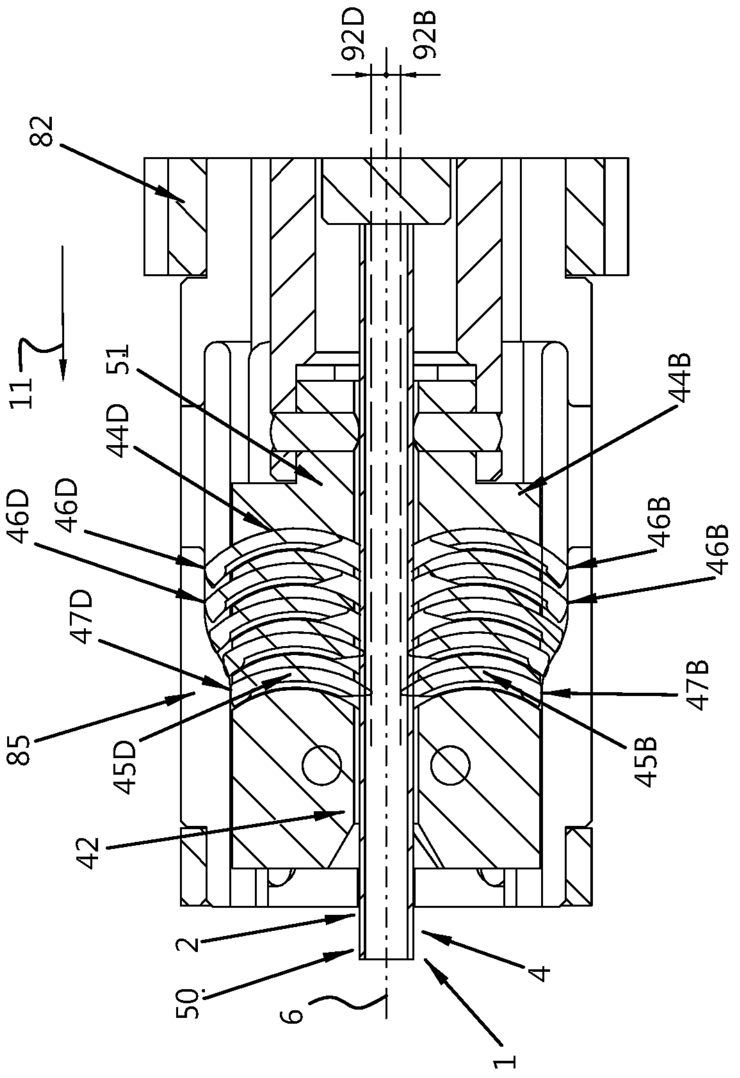
Figure 31C:
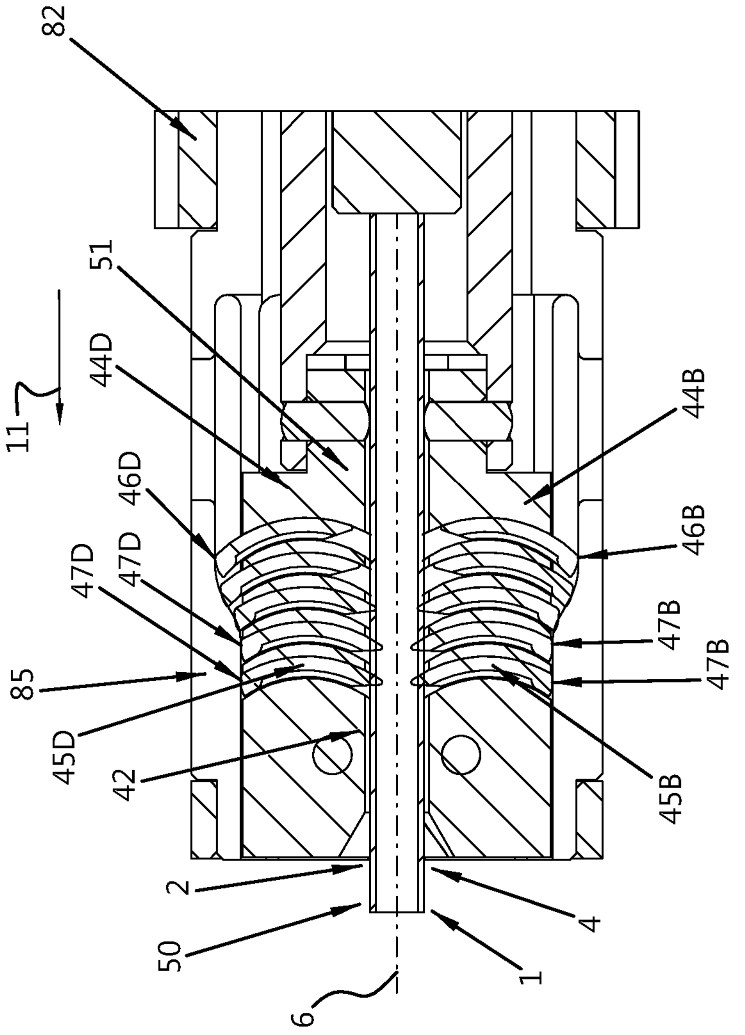
Figure 31D:
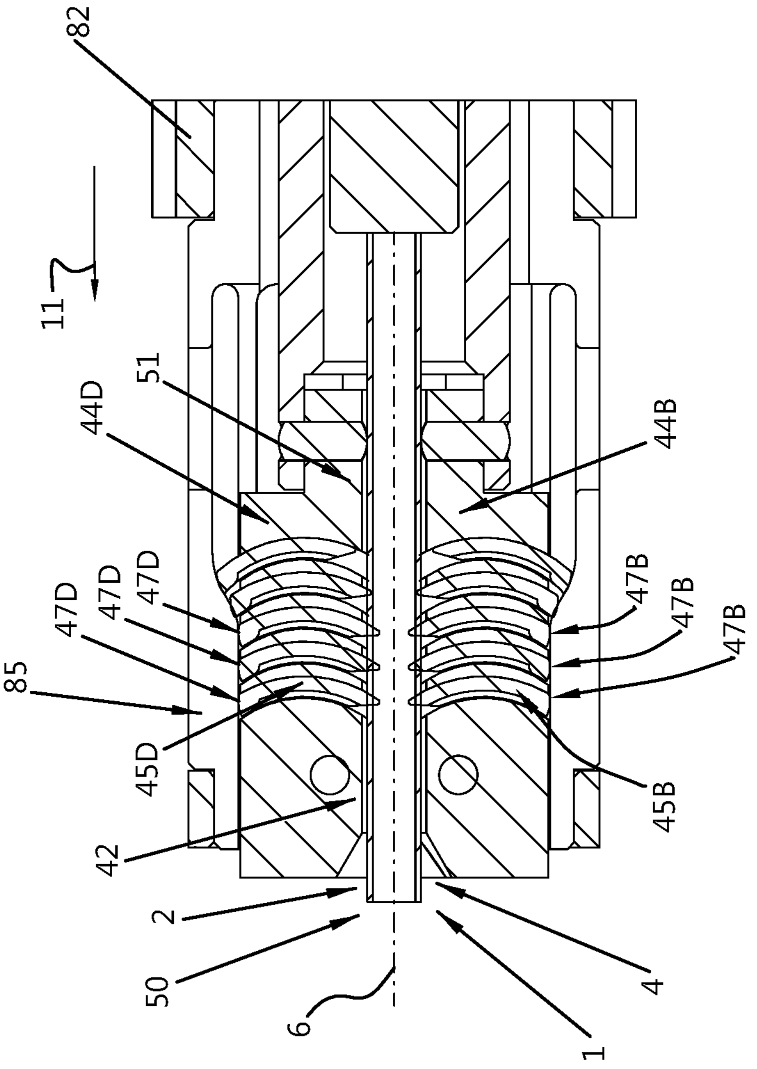
Figure 31E:
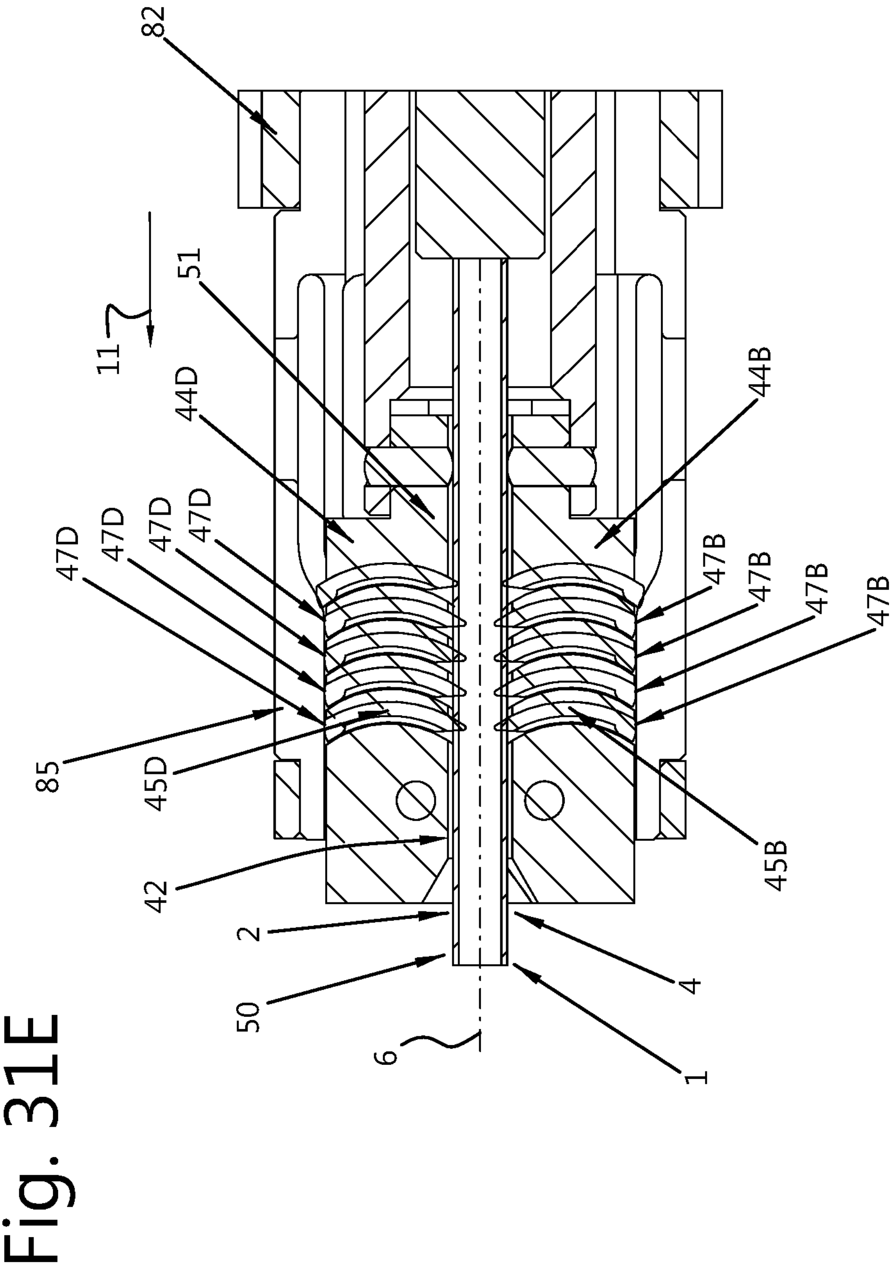
Figure 31F:
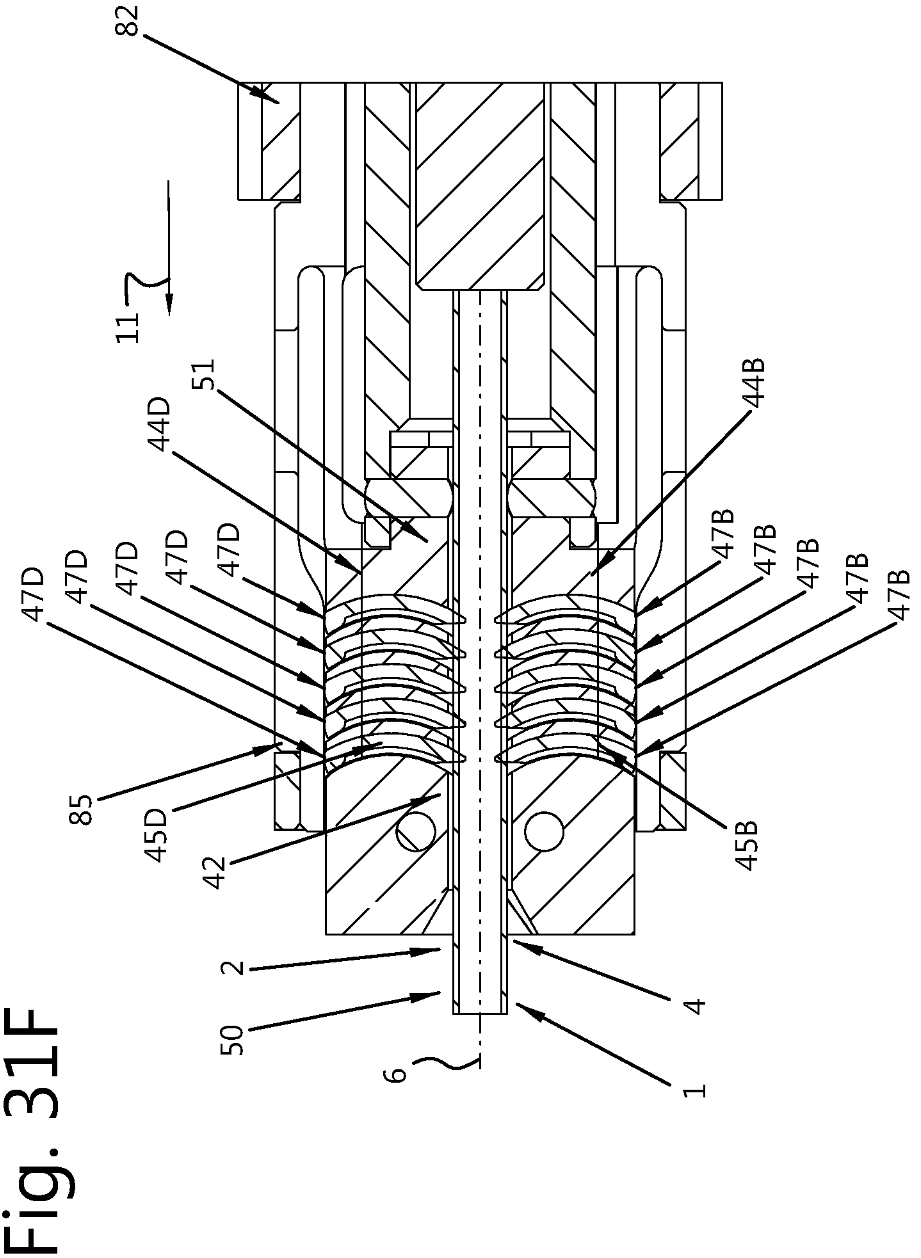

Each push member 45A-D is movable from a first member position 46A-D in which the push member 45A-D is spaced from the circumference 4 of the tubular body 3 (see the FIGS. 30A and 31A) into a second member position 47A-D located closer to the central axis 6 to push a contact part 48A-D of the circumference 4 of the tubular body 3 coming in contact with the push member 45A-D towards the central axis 6 in order to form an inward corrugation 9A-D extending along only part of the circumference 4 of the tubular body 3 (see the FIGS. 30G and 31F).

The push members 45A-D positioned in the first member position 46A-D are located at a first radial distance 91A-D from the central axis 6. The push members 45A-D positioned in the second member position 47A-D are located at a second radial distance 92A-D from the central axis 6. The second radial distance 92A-D is smaller than the first radial distance 91A-D.

In the shown system, the first radial distance 91A-D of the at least two series 44A-D of push members 45A-D are the same and the second radial distance 92A-D of the at least two series 44A-D of push members 45A-D are the same. In other examples of the method according to the invention, the first radial distance 91A-D of the at least two series 44A-D of push members 45A-D differ from each other and/or the second radial distance 92A-D of the at least two series 44A-D of push members 45A-D differ from each other.

At least one 44A,C of the at least two series 44A-D of push members 45A-D is positioned circumferentially offset in view of the tubular body 3 relative to at least one other 44B,D of the at least two series 44A-D of push members 45A-D. Said at least one 44A,C of the at least two series 44A-D of push members 45A-D comprises push members 45A,C which are located between two push members 45B,D of said at least one other 44B,D of the at least two series 44A-D of push members 45A-D when seen in axial direction 11 along the central axis 6 of the tubular body 3.

The profiling device 43 is configured to move the push members 45A-D of the at least two series 44A-D of push members 45A-D from the first member position 46A-D into the second member position 47A-D to form with each series 44A-D of push members 45A-D inward corrugations 9A-D being positioned one after the other in axial direction 11 along the central axis 6 and to move the inward corrugations 9A-D of each of the at least two series 44A-D of push members 45A-D towards each other in axial direction 11 along the central axis 6 to form outward corrugations 10A-D extending along only part of the circumference 4 of the tubular body 3 between subsequent inward corrugations 9A-D, thereby providing the bendable part 7 to the tubular body 3. The bendable part 7 comprises at least two corrugated profiles 8A-D provided in the wall 5, wherein each corrugated profile 8A-D comprises inward corrugations 9A-D and outward corrugations 10A-D being positioned one after the other in axial direction 11 along the central axis 6.

The profiling device 43 is configured to move the push members 45A-D from the first member position 46A-D into the second member position 47A-D by moving the second system part 82 towards the first system part 81.

The functioning of the system 40 is depicted in the FIGS. 30A-G and 31A-F. The FIGS. 30A-G show enlarged views of part XXX of FIG. 28B. The FIGS. 31A-F show enlarged views of part XXXI of FIG. 29B. The FIGS. 30A and 31A shown the system 40 at the start of the operation. The subsequent steps performed by the system 40 are shown in the subsequent FIGS. 30B, 31B, 30C, 31C, 30D, 31D, 30E, 31E, 30F, 31F, and 30G.

The holding unit 41 comprises a fixation member 49 to fixate a fixated part 50 of the tubular body 3 such that the tubular body 3 comprises a non-fixated part 51 having a free end 52 when held in the operation position 42. The profiling device 43 is configured to position the at least two series 44A-D of push members 45A-D along the non-fixated part 51 of the tubular body 3. The push members 45A-D moving from the first member position 46A-D into the second member position 47A-D also move in axial direction 11 along the central axis 6 towards the fixated part 50 of the tubular body 3 in order to form the outward corrugations 10A-D.

The profiling device 43 is configured to, when seen in axial direction 11 along the central axis 6, move subsequent push members 45A-D one after the other from the first member position 46A-D towards the second member position 47A-D and starting with the push members 45A,C nearest to the fixated part 50 of the tubular body 3. This applies to all the push members 45A-D of the least two series 44A-D of push members 45A-D.

When the push members 45A-D of the at least two series 44A-D of push members 45A-D are positioned in the second member position 47A-D, the push members 45A,C of said at least one 44A,C of the at least two series 44AA-D of push members 45A-D which are located between two push members 45B,D of said at least one other 44B,D of the at least two series 44A-D of push members 45A-D are located in the middle between said two push members 45B,D of said at least one other 44B,D of the at least two series 44A-D of push members 45A-D when seen in axial direction 11 along the central axis 6.

The profiling device 43 is configured to move the push members 45A-D along a curved trajectory, such as a trajectory 56A-D along part of a circle, towards the fixated part 50 of the tubular body 3 during the movement from the first member position 46A-D into the second member position 47A-D.

In other examples of the system 40 according to the invention, the profiling device 43 is configured to move the push members 45A-D along a trajectory 56A-D extending under an angle α larger than 90 degrees relative to the central axis 6 and towards the fixated part 50 of the tubular body 3 during the movement from the first member position 46A-D into the second member position 47A-D.

Said at least one 44A,C of the at least two series 44A-D of push members 45A-D comprises a first series 44A of push members 45A and a second series 44C of push members 45C. The first series 44A of push members 45A positioned in the second member position 47A and the second series 44C of push members 45C positioned in the second member position 47C are located at opposite sides of the circumference 4. Said at least one other 44B,D of the at least two series 44A-D of push members 45A-D comprises a third series 44B of push members 45B and a fourth series 44D of push members 45D. The third series 44B of push members 45B positioned in the second member position 47B and the fourth series 44D of push members 45D positioned in the second member position 47D are located at opposite sides of the circumference 4.

When the push members 45A-D of the at least two series 44A-D of push members 45A-D are positioned in the second member position 47A-D, the first series 44A of push members 45A and the third series 44B of push members 45B are circumferentially offset relative to each other over one quarter of the circumference 4, and the second series 44C of push members 45C and the fourth series 44D of push members 45D are circumferentially offset relative to each other over one quarter of the circumference 4.

When the push members 45A-D of the at least two series 44A-D of push members 45A-D are positioned in the second member position 47A-D, the first series 44A of push members 45A and the second series 44C of push members 45C are located at identical axial positions when seen in axial direction 11 along the central axis 6, and the third series 44B of push members 45B and the fourth series 44D of push members 45D are located at identical axial positions when seen in axial direction 11 along the central axis 6.

The at least two series 44A-D of push members 45A-D only comprise the first series 44A of push members 45A, the second series 44C of push members 45C, the third series 44C of push members 45C, and the fourth series 44D of push members 45D.

The push members 45A-D are configured to push the contact parts 48A-D of the circumference 4 of the tubular body 3 formed from at least one helically wound strip of paper 2 or paper-like material towards the central axis 6 in order to form the inward corrugations 9A-D. More specifically, the push members 45A-D are configured to push the contact parts 48A-D of the circumference 4 of the tubular body 3 formed from multiple helically wound strips of paper 2 or paper-like material towards the central axis 6 in order to form the inward corrugations 9A-D.

The system 40 may comprises a tubular body 3 supply to supply the tubular body 3 made from paper 2 or paper-like material.

The FIGS. 32A, 32B, 33A, 33B and 34A-C show an alternative embodiment of the method and system according to the invention.

Figure 32A:
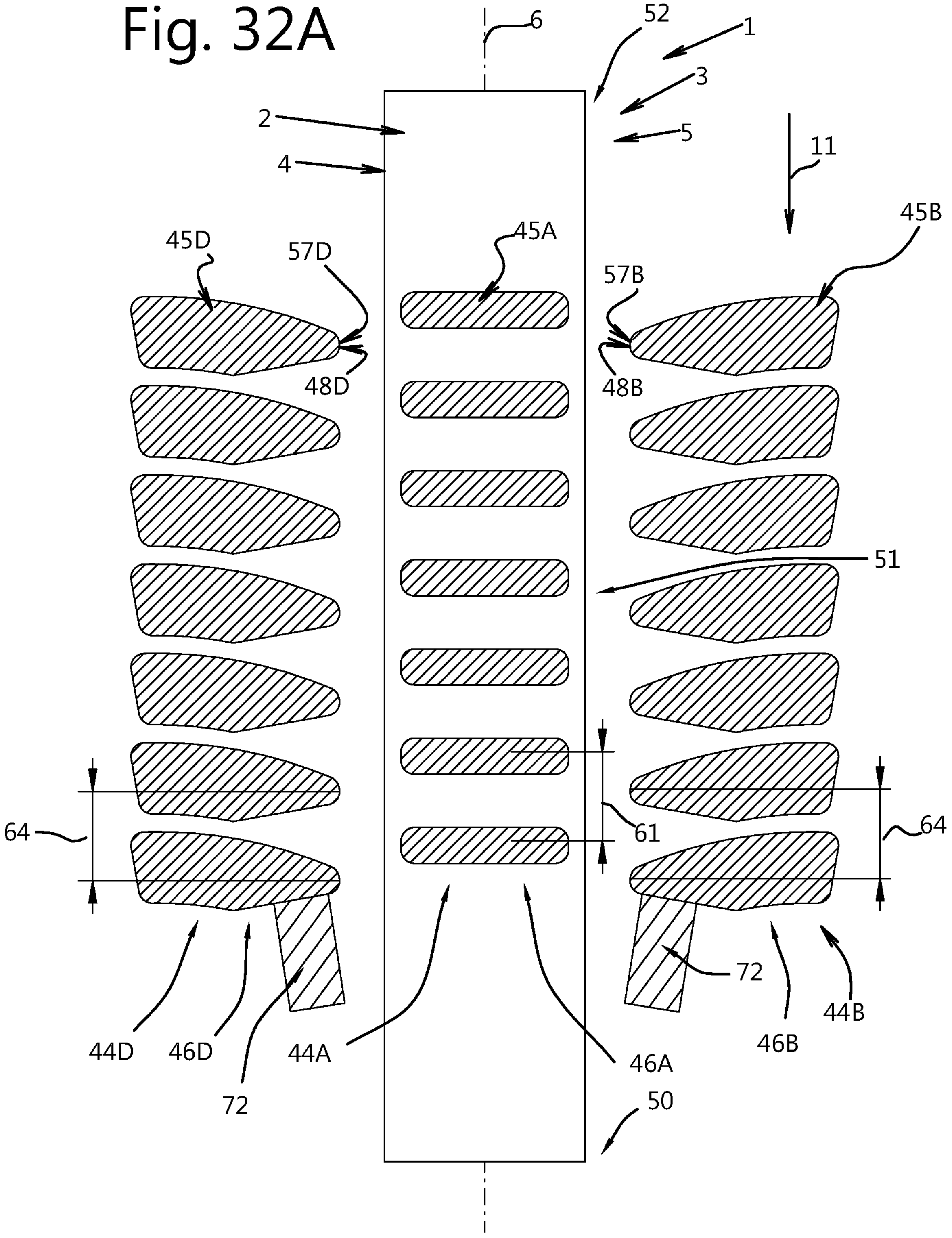
Figure 32B:
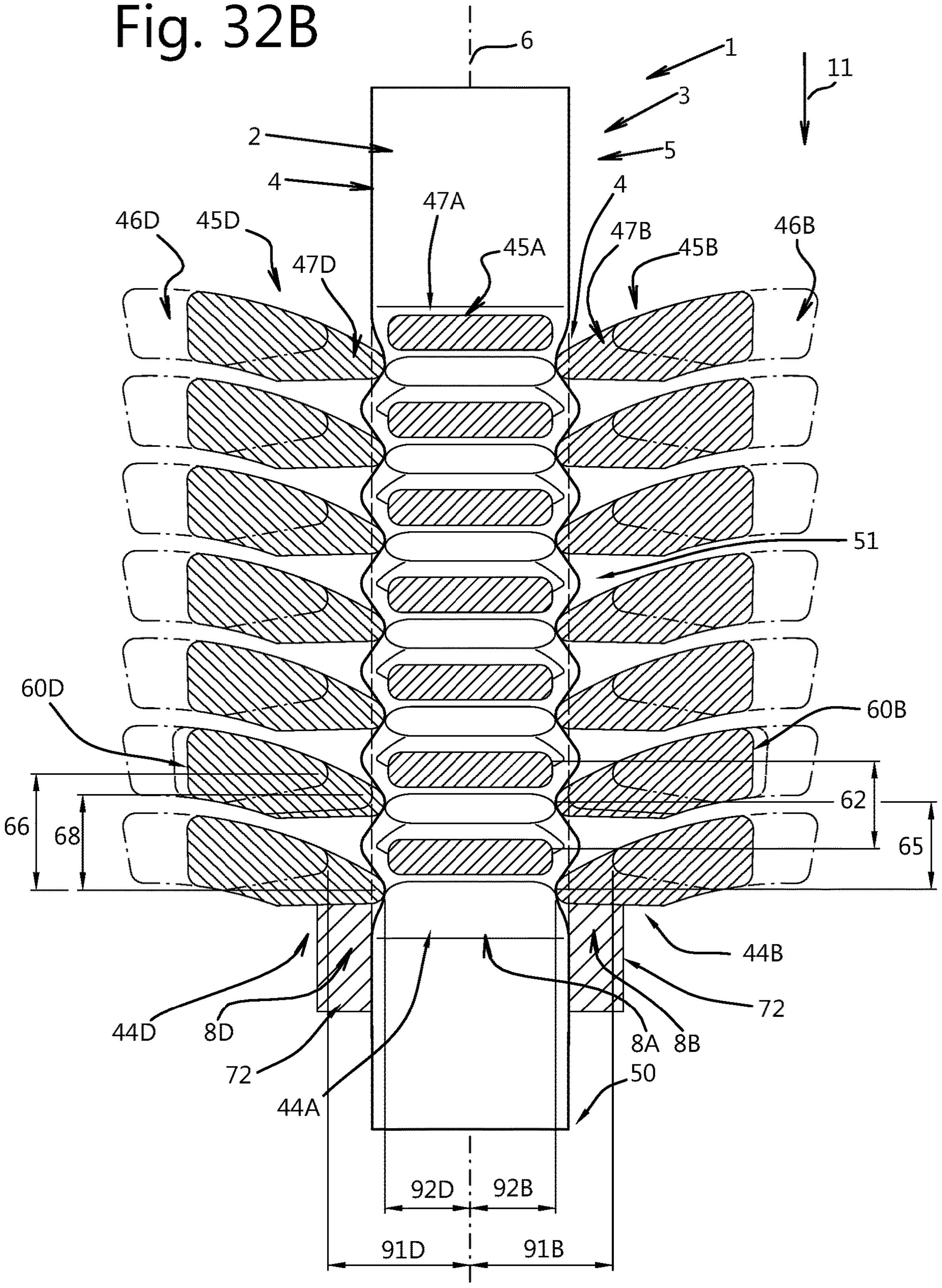
Figure 33A:
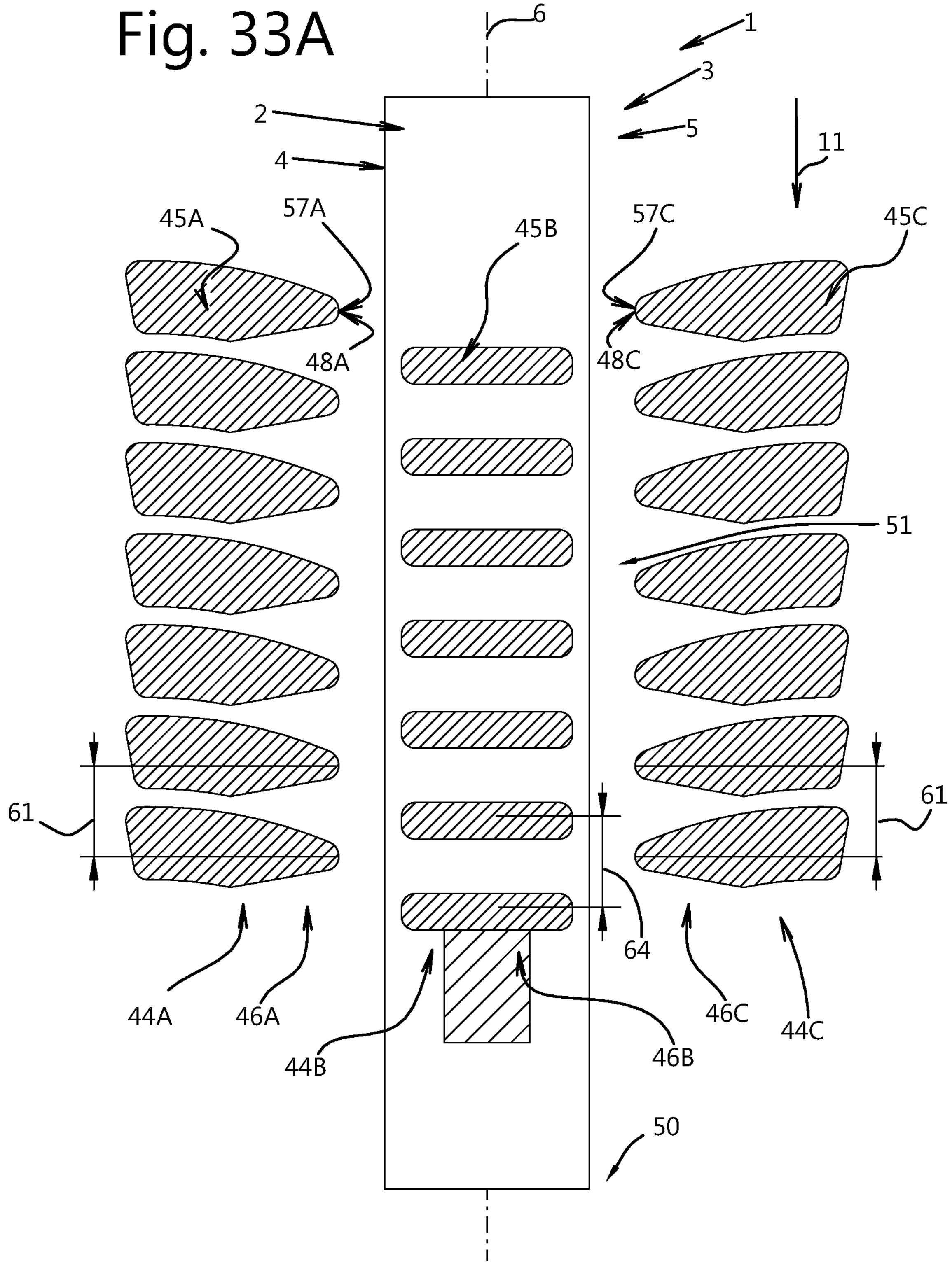
Figure 33B:
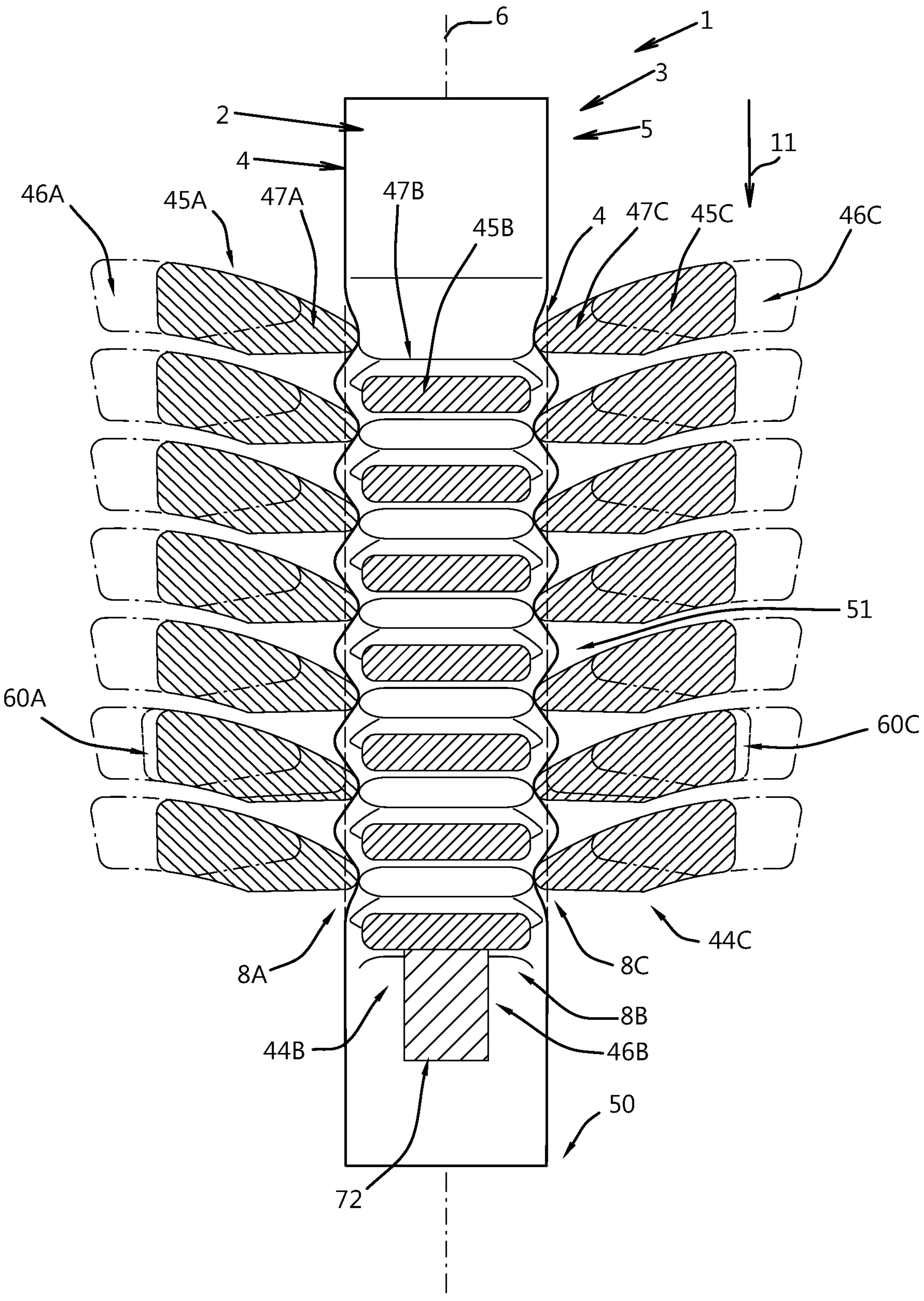

The FIGS. 32A and 32B show side views similar to the side views of the FIGS. 19A and 23A, respectively. The FIGS. 33A and 33B show side views similar to the side views of the FIGS. 20A and 24A, respectively. The push members 45A-D of the at least two series 44A-D of push members 45A-D are moved from the first member position 46A-D into the second member position 47A-D as shown in the FIGS. 25A-N.

Figure 32C:
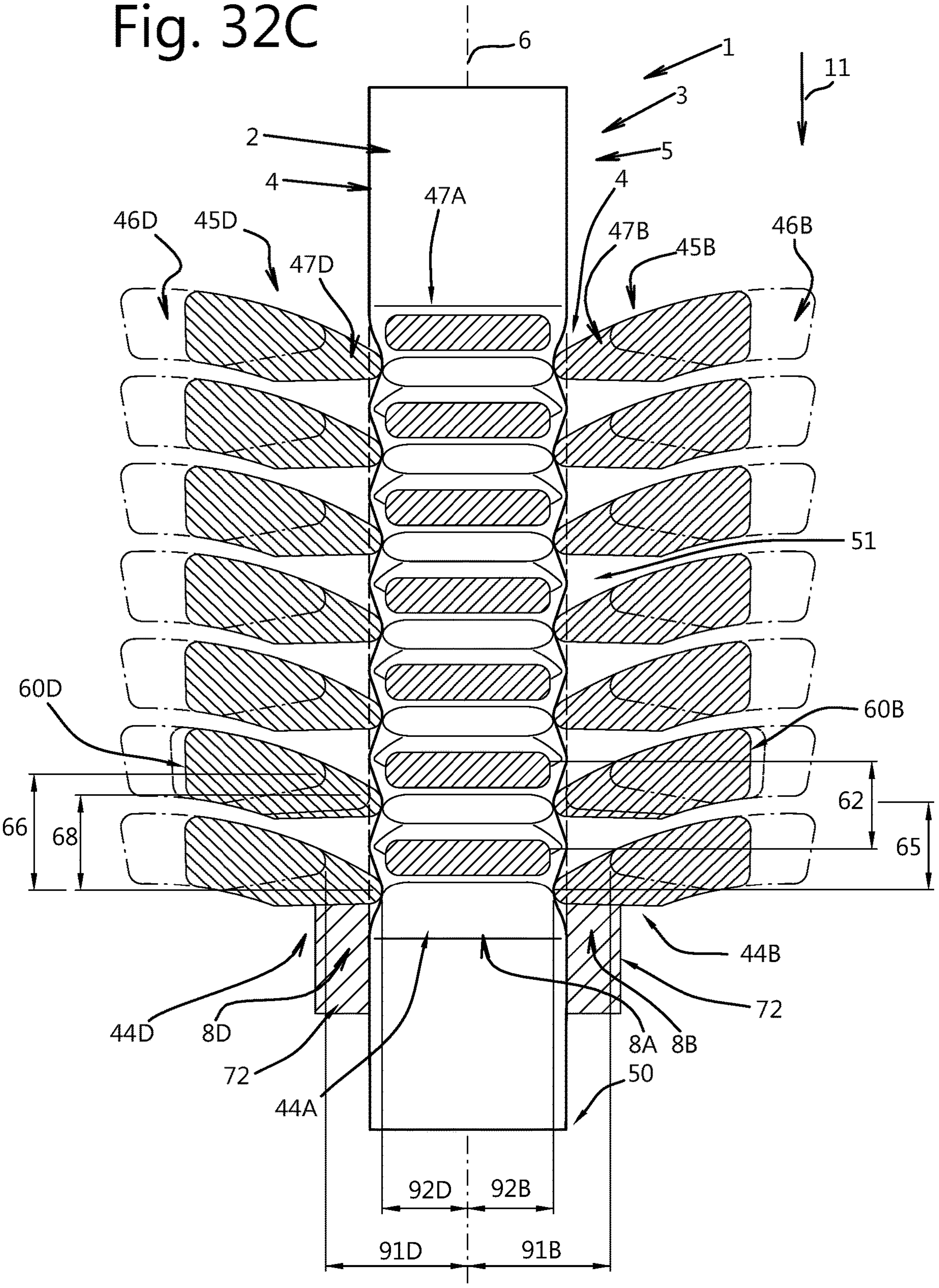
Figure 33C:
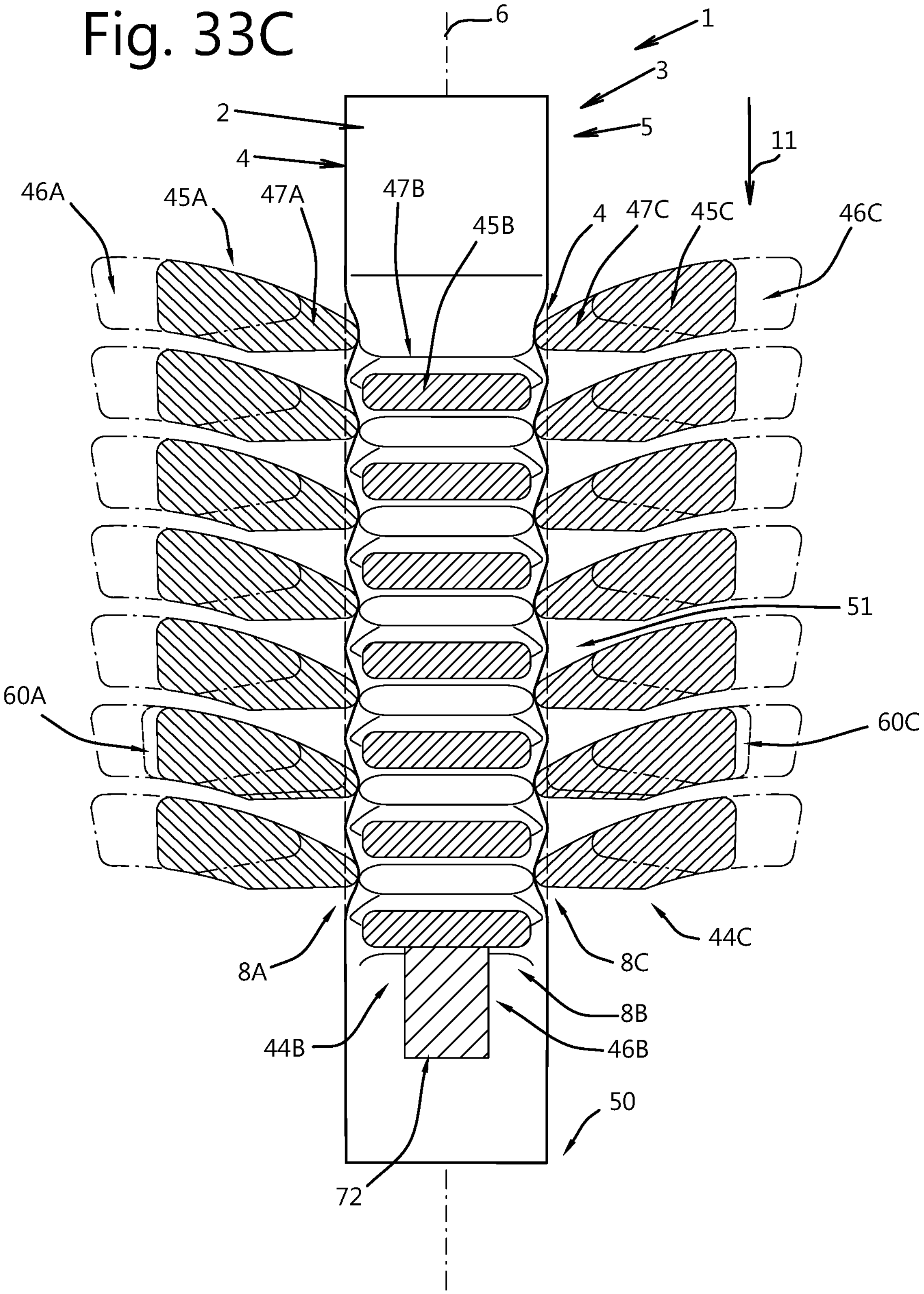

As shown in the FIGS. 32B and 33B, the push members 45A-D being moved from the first member position 46A-D into the second member position 47A-D also move in axial direction 11 along the central axis 6 towards the fixated part 50 of the tubular body 3 in order to initiate the forming of the outward corrugations 10A-D. The FIGS. 32C and 33C show a further alternative embodiment in which the forming of the outward corrugations 10A-D is initiated to a smaller degree.

Figure 34A:
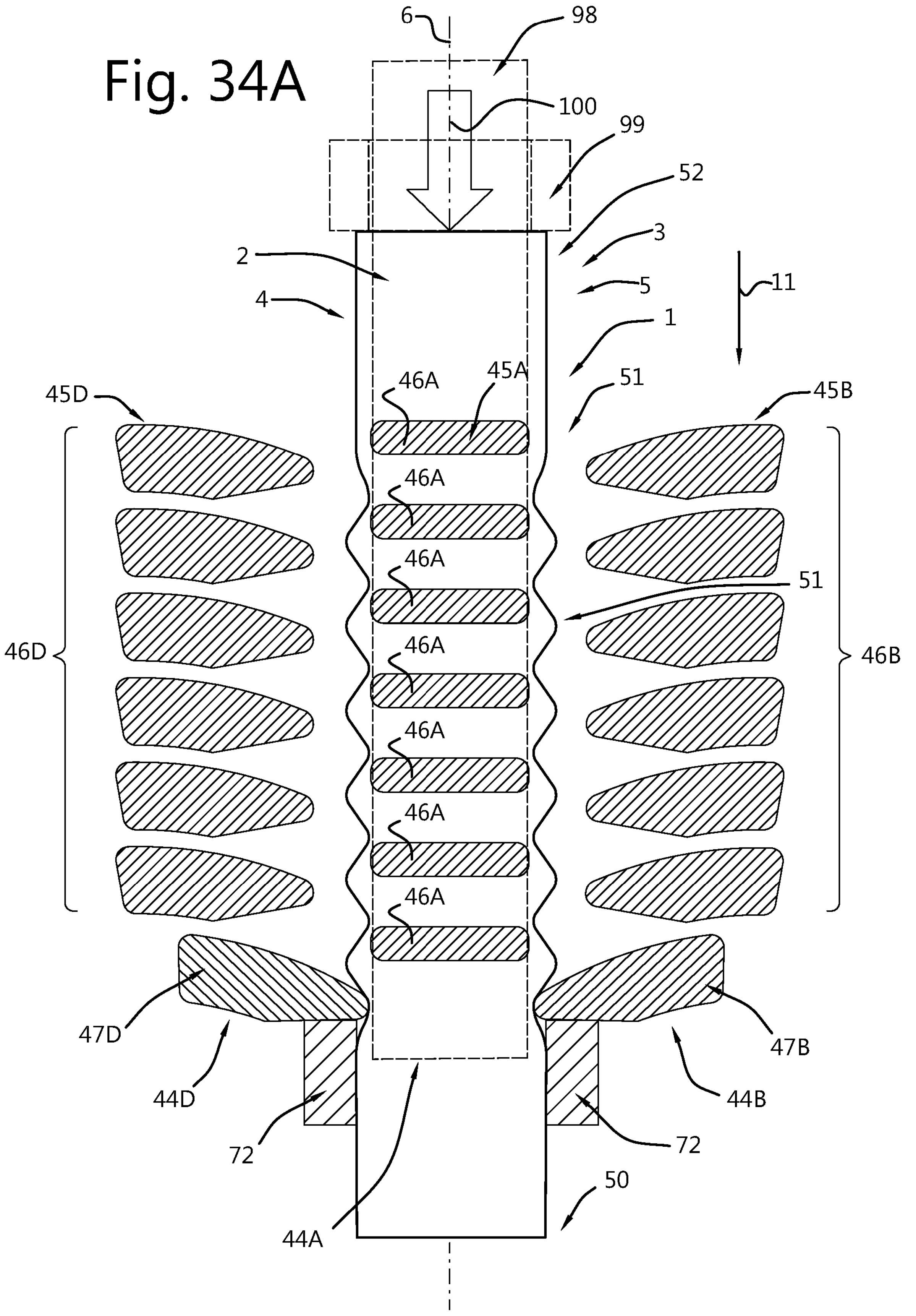
Figure 34B:
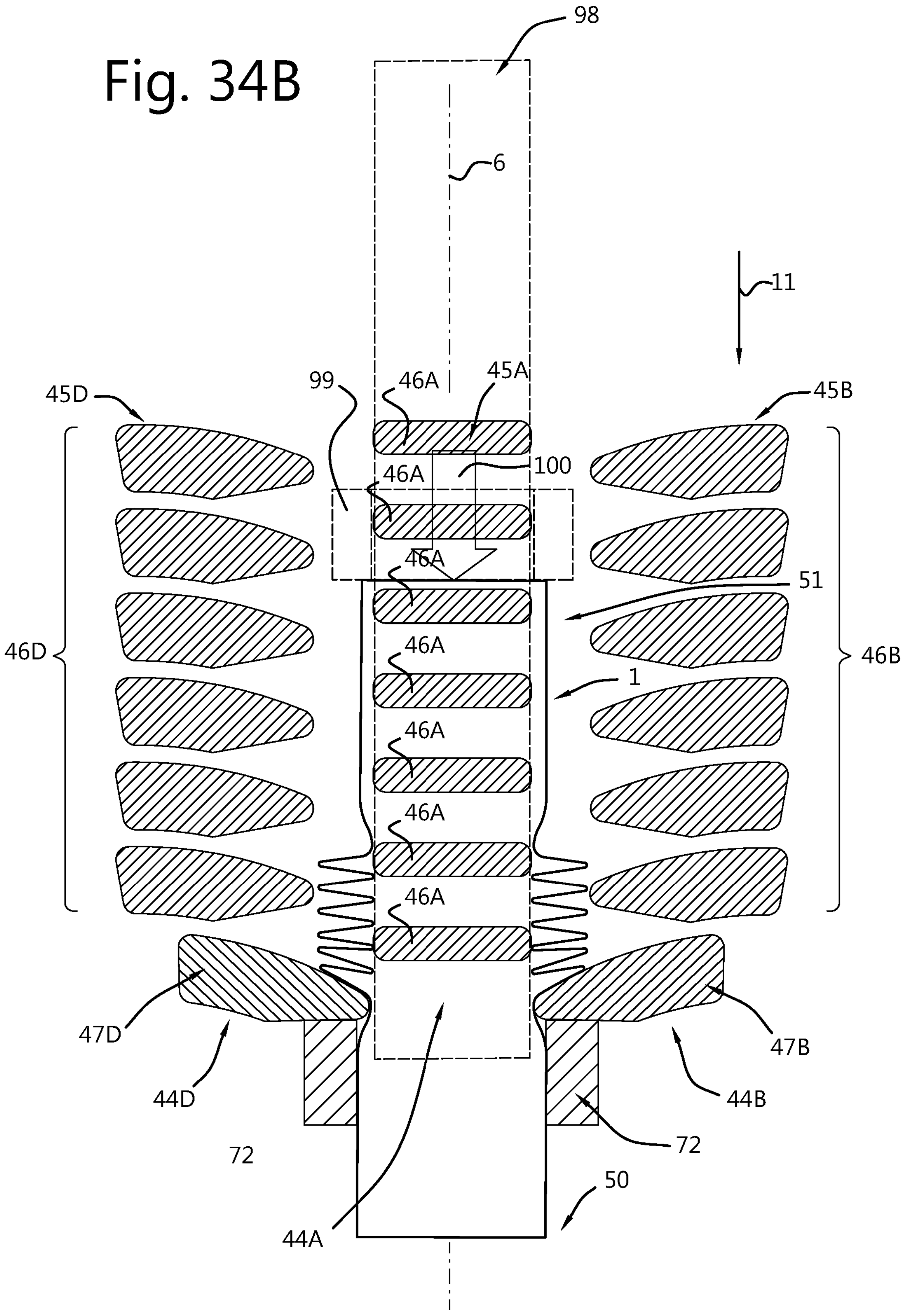
Figure 34C:
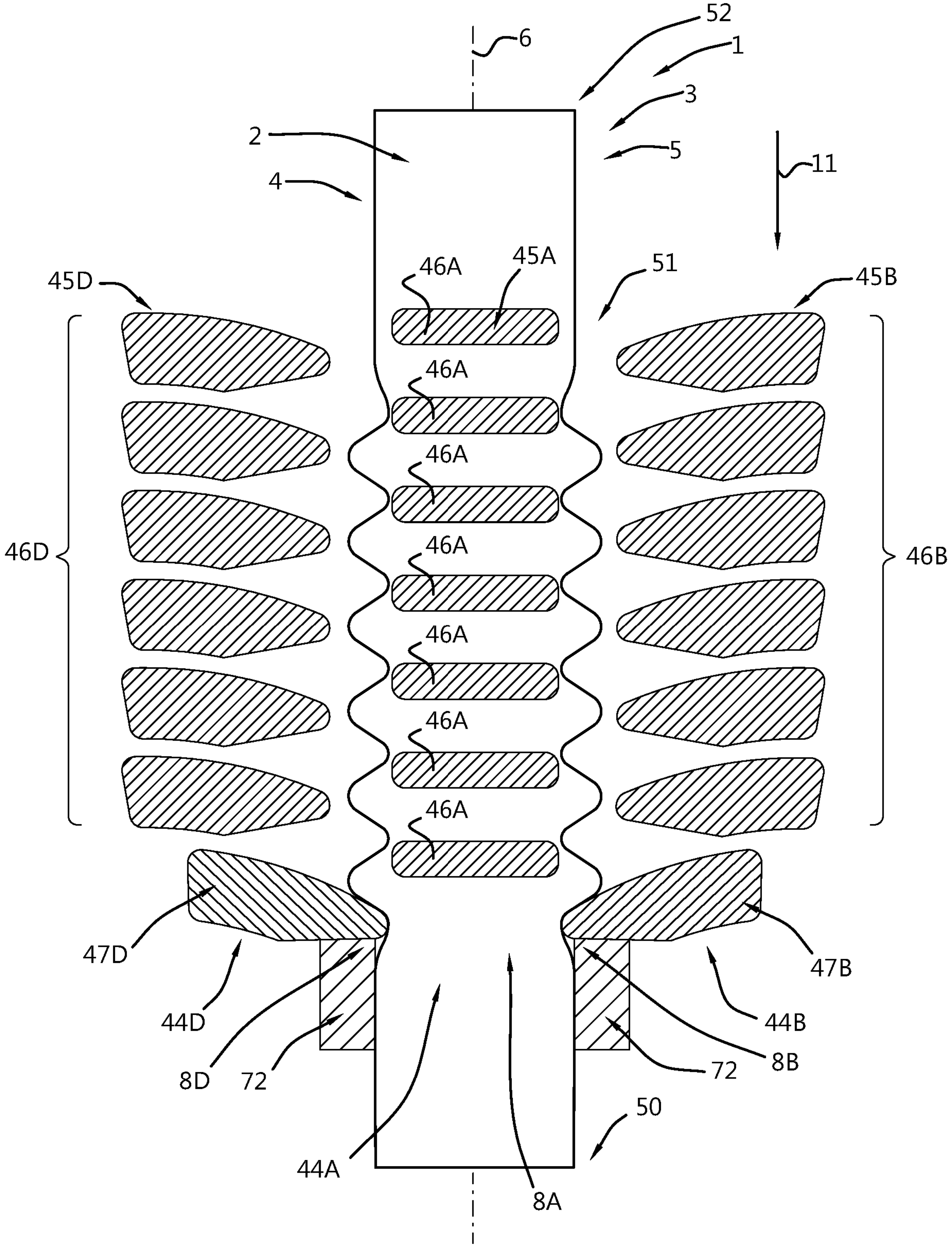

As shown in the FIGS. 34A-C, a compression force 100 is subsequently applied on the straw 1 in axial direction 11 along the central axis 6 in order to finalise the forming of the outward corrugations 10A-D.

After the push members 45A-D of the at least two series 44A-D of push members 45A-D are moved into the second member position 47A-D, the push members 45A-D are moved back into the first member position 46A-D except for the push members 45B, 45D located nearest to the fixated part 50 of the tubular body 3 when seen in axial direction 11 along the central axis 6. The compression force 100 is applied on the straw 1 while said push members 45B, 45D located nearest to the fixated part 50 of the tubular body 3 are maintained in the second member position 47B, 47D.

Support parts 72 of said push members 45B, 45D located nearest to the fixated part 50 of the tubular body 3 are pushed against the tubular body 3 when said push members 45B, 45D are located in the second member position 47B, 47D.

The compression force 100 is applied on the non-fixated part 51 of the tubular body 3, preferably on the free end 52 of the non-fixated part 51 of tubular body 3. A mandrel 98 may optionally be positioned inside the straw 1 when the compression force 100 is applied in order to reduce the risk of buckling.

The system according to the invention comprises a compression device 99 to apply the compression force 100 on the straw 1 in axial direction 11 along the central axis 6 in order to finalise the forming of the outward corrugations 10A-D. Said compression device 99 can for example be incorporated in the system 40 shown in the FIGS. 28A-B.

The profiling device 43 is configured to after the push members 45A-D of the at least two series 44A-D of push members 45A-D are moved into the second member position 47A-D move the push members 45A-D back into the first member position 46A-D except for the push members 45B, 45D located nearest to the fixated part 50 of the tubular body 3 when seen in axial direction 11 along the central axis 6. The compression device 99 is configured to apply the compression force 100 on the straw 1 while said push members 45B, 45D located nearest to the fixated part 50 of the tubular body 3 are maintained in the second member position 47B, 47D.

Said push members 45B, 45D located nearest to the fixated part 50 of the tubular body 3 comprise support parts 72 which are configured to push against the tubular body 3 when said push members 45B, 45D are located in the second member position 47B, 47D.

The compression device 99 is configured to apply the compression force 100 on the non-fixated part 51 of the tubular body 3, preferably on the free end 52 of the non-fixated part 51 of the tubular body 3. The compression device 99 optionally comprises a mandrel 98 located inside the straw 1 when the compression force 100 is applied in order to reduce the risk of buckling.

In a yet further alternative embodiment of the method and system according to the invention, a compression force 100 is applied on the straw 1 in axial direction 11 along the central axis 6 in order to form the outward corrugations 10A-D. In said situation, it may be possible that the push members 45A-D moving from the first member position 46A-D into the second member position 47A-D do not move in axial direction 11 along the central axis 6. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the straw, system and method without departing from the scope as defined in the claims.

The invention claimed is:

1. A method for producing a straw comprising a tubular body having a circumference formed by a wall surrounding a central axis and a bendable part extending axially along the central axis, said method comprising:
- providing the tubular body having the circumference formed by the wall surrounding the central axis,
- positioning at least two series of push members along the tubular body, wherein:
  - each of the at least two series of push members comprises multiple push members being spaced from each other in a first axial direction parallel to axial the central axis of the tubular body,
  - each push member is movable from a first member position in which the push member is spaced from the circumference of the tubular body into a second member position located closer to the central axis to push a contact part of the circumference of the tubular body that comes into contact with the push member towards the central axis in order to form an inward corrugation extending along only part of the circumference of the tubular body,
  - at least one of the at least two series of push members is positioned, in view of the tubular body, circumferentially offset relative to at least one other of the at least two series of push members, and
  - said at least one of the at least two series of push members comprises push members which are located between two push members of said at least one other of the at least two series of push members when seen in a second axial direction along the central axis of the tubular body,
- moving the push members of the at least two series of push members from the first member position into the second member position to form with each series of push members inward corrugations that are positioned one after the other in a third axial direction parallel to the central axis, and moving the inward corrugations closer to each other in the third axial direction parallel to the central axis to form outward corrugations extending along only part of the circumference of the tubular body and between subsequent inward corrugations, thereby providing the bendable part to the tubular body, which bendable part comprises at least two corrugated profiles provided in the wall, wherein each corrugated profile comprises the inward corrugations and the outward corrugations positioned one after the other in the third axial direction parallel to the central axis.

2. The method according to claim 1, wherein the method comprises:
- fixating a part of the tubular body such that the tubular body comprises a non-fixated part having a free end,
- positioning the at least two series of push members along the non-fixated part of the tubular body, and
- moving the push members being moved from the first member position into the second member position also in a fourth axial direction parallel to the central axis towards the part of the tubular body that is fixated in order to form the outward corrugations.

3. The method according to claim 1, wherein the method comprises:
- fixating a part of the tubular body such that the tubular body comprises a non-fixated part having a free end,
- positioning the at least two series of push members along the non-fixated part of the tubular body,
- moving the push members being moved from the first member position into the second member position also in a fourth axial direction parallel to the central axis towards the part of the tubular body that is fixated in order to initiate the forming of the outward corrugations, and
- subsequently applying a compression force on the straw in a fifth axial direction parallel to the central axis in order to finalize the forming of the outward corrugations.

4. The method according to claim 1, wherein the method comprises:
- fixating a part of the tubular body such that the tubular body comprises a non-fixated part having a free end,
- positioning the at least two series of push members along the non-fixated part of the tubular body, and
- applying a compression force on the straw in a fourth axial direction parallel to the central axis in order to form the outward corrugations after the inward corrugations are formed by the push members of the at least two series of push members, and wherein the push members moving from the first member position into the second member position do not move in any axial direction parallel to the central axis.

5. The method according to claim 1, wherein:

said at least one of the at least two series of push members comprises a first series of push members and a second series of push members, the first series of push members positioned in the second member position and the second series of push members positioned in the second member position are located at opposite sides of the circumference, said at least one other of the at least two series of push members comprises a third series of push members and a fourth series of push members, and the third series of push members positioned in the second member position and the fourth series of push members positioned in the second member position are located at opposite sides of the circumference.

6. The method according to claim 1, wherein:

said at least one of the at least two series of push members comprises a first number of N first series of push members, the N first series of push members positioned in the second member position surround the central axis, said at least one other of the at least two series of push members comprises a second number of N second series of push members, and the N second series of push members positioned in the second member position surround the central axis.

7. The method according to claim 1, wherein the straw is made from paper.

* * * * *